United States Patent
Linn et al.

(10) Patent No.: US 8,364,453 B2
(45) Date of Patent: Jan. 29, 2013

(54) METHOD AND APPARATUS FOR DESCRIBING THE STATISTICAL ORIENTATION DISTRIBUTION OF PARTICLES IN A SIMULATION OF A MOULD FILLING PROCESS

(75) Inventors: Joachim Linn, Kaiserslautern (DE); Matthias Moog, Aachen (DE)

(73) Assignee: Magma Giessereitechnologie GmbH, Aachen (DE)

( * ) Notice: Subject to any disclaimer, the term of this patent is extended or adjusted under 35 U.S.C. 154(b) by 375 days.

(21) Appl. No.: 12/643,967

(22) Filed: Dec. 21, 2009

(65) Prior Publication Data

US 2010/0169062 A1 Jul. 1, 2010

Related U.S. Application Data

(63) Continuation-in-part of application No. PCT/EP2008/005361, filed on Jul. 1, 2008.

(30) Foreign Application Priority Data

Jul. 2, 2007 (EP) ..................................... 07012899

(51) Int. Cl.
 *G06F 7/60* (2006.01)
 *G06F 7/50* (2006.01)
 *G06G 7/48* (2006.01)
(52) U.S. Cl. ..................................... 703/6; 703/2; 703/9
(58) Field of Classification Search .................. 703/2, 6, 703/9
 See application file for complete search history.

(56) References Cited

U.S. PATENT DOCUMENTS

| | | | |
|---|---|---|---|
| 5,097,431 A * | 3/1992 | Harada et al. ..................... 703/9 |
| 5,097,432 A * | 3/1992 | Harada et al. ..................... 703/9 |
| 5,227,979 A * | 7/1993 | Fukuhira et al. .............. 700/197 |
| 5,756,017 A * | 5/1998 | Togawa et al. ................ 264/40.1 |
| 5,871,676 A * | 2/1999 | Fujita et al. ................... 264/40.1 |
| 5,900,259 A * | 5/1999 | Miyoshi et al. ................ 425/145 |
| 6,214,279 B1 * | 4/2001 | Yang et al. ..................... 264/482 |
| 6,440,338 B1 * | 8/2002 | Kamiguchi et al. ......... 264/40.1 |
| 6,816,820 B1 * | 11/2004 | Friedl et al. ....................... 703/2 |
| 6,856,856 B1 * | 2/2005 | Kolavennu et al. ........... 700/197 |
| 7,096,083 B2 * | 8/2006 | Kaneto et al. .................... 700/97 |
| 7,292,958 B2 * | 11/2007 | Ceder et al. .................... 702/182 |
| 7,323,125 B2 * | 1/2008 | Uwaji et al. .................. 264/40.1 |
| 7,379,780 B2 * | 5/2008 | Kumano et al. ................. 700/97 |
| 7,415,398 B2 * | 8/2008 | Naito et al. ....................... 703/6 |
| 7,548,792 B2 * | 6/2009 | Kumano et al. ................. 700/98 |
| 8,014,980 B2 * | 9/2011 | Herbst et al. ..................... 703/2 |
| 2001/0028122 A1 * | 10/2001 | Narushima et al. .......... 264/40.1 |
| 2004/0093104 A1 * | 5/2004 | Kaneto et al. .................... 700/97 |
| 2004/0140579 A1 * | 7/2004 | Uwaji et al. ................. 264/40.1 |

(Continued)

OTHER PUBLICATIONS

Kim et al. "Developments of three-dimensional computer-aided engineering simulation for injection moulding", 2004 IOP Publishing Ltd.*

(Continued)

*Primary Examiner* — Shambhavi Patel
(74) *Attorney, Agent, or Firm* — K. David Crockett, Esq.; Paul J. Backofen, Esq.; Crockett & Crockett, PC

(57) ABSTRACT

A method and apparatus for describing the statistical orientation distribution of nonspherical particles in a simulation of a process wherein a mold cavity is filled with a suspension that contains a large number of nonspherical particles. The method and apparatus may be applied to the analysis of an injection molding process for producing a fiber reinforced molded polymer component or of a metal casting process for producing a fiber reinforced metal product. The results of these analyses may be used to determine tension and warping aspects of the component, and to optimize the process conditions used in the production process.

20 Claims, 8 Drawing Sheets

U.S. PATENT DOCUMENTS

| | | | | |
|---|---|---|---|---|
| 2004/0230411 | A1* | 11/2004 | Zheng et al. | 703/6 |
| 2005/0046060 | A1* | 3/2005 | Nagaoka et al. | 264/40.1 |
| 2005/0285855 | A1* | 12/2005 | Chien et al. | 345/419 |
| 2007/0097117 | A1* | 5/2007 | Chien et al. | 345/420 |
| 2008/0221845 | A1* | 9/2008 | Yu et al. | 703/2 |

OTHER PUBLICATIONS

Tucker, et al., Processing of Short-Fiber Systems, ch. 6, pp. 147 in S.G. Advani, Flow and Rheology in Polymer Composites Manufacturing.

S.G. Advani, Flow and Rheology in Polymer Composites Manufacturing, Elsevier, Amsterdam (1994).

G.B. Jeffrey, The Motion of Ellipsoidal Particles Immersed in a Viscous Fluid, Proc. R. Soc. A 102, 161-179 (1992).

Junk, et al., A New Derivation of Jeffery's Equation, J. Math. Fluid Mech. 8, 1-34 (2006).

Folgar, et al., Orientation Behaviour of Fibers in Concentrated Suspensions, J. Reinf. Plast. Compos. 3, 98-119 (1984).

Advani, et al., The Use of Tensors to Describe and Predict Fiber Orientation in Short Fiber Composites, J. Rheol., 751-784 (1987).

Advani, et al., Closure Approximations for Three-Dimensional Structure Tensors, J. Rheol., 367-386 (1990).

Cintra, et al., Orthotropic Closure Approximations for Flow-Induced Fiber Orientation, J. Rheol. 39, 1095-1122 (1995).

Hairer, et al., Geometric Numerical Integration, Springer, Berlin (2002).

Linn, et al., Calculation of the 3D Fiber Orientation in the Simulation of the Injection Molding Process for Short-Fiber Reinforced Thermoplasts, ECMI 2000 Conference, Palermo (2000).

J. Linn, Exploring the Phase Space of the Folgar-Tucker Equation, SIAM-EMS Conference, Berlin (2001).

J. Linn, On the Frame-Invariant Description of the Phase Space of the Folgar-Tucker Equation, p. 327-332, in Buikis, et al., Progress in Industrial Mathematics at ECMI 2002, Springer (2004).

S. Hess, Fokker-Planck Equation Approach to Flow Alignment in Liquid Crystals, Z. Naturforsch. 31A, 1034 ff. (1976).

M. Doi, Molecular Dynamics and Rheological Properties of Concentrated Solutions of Rodlike Polymers in Isotropic and Liquid Cristalline Phases, J. Polym. Sci., Polym. Phys. Ed. 19, 229-243 (1981).

Grosso, et al., A Closure Approximation for Nematic Liquid Crystals Based on the Canonical Distribution Subspace Theory, Rheol. Acta 39, 201-310 (2000).

M. Kroger, Simple Models for Complex Nonequilibrium Fluids, Phys. Rep. 390, 453-551 (2004).

J. Linn, The Folgar-Tucker Model as a Differential Algebraic Systems for Fiber Orientation Calculation, pp. 215-224 in Wang, et al., Trends in Applications of Mathematics to Mechanics, Proceedings of the STAMM 2004 Conference in Seeheim (Germany), Shaker (2005).

U. Strautins, Investigation of Fiber Orientation Dynamics Within the Folgar-Tucker Model with Hybrid Closure, Master Thesis, Dept. of Mathematics, University of Kaiserslautern (2004).

VerWeyst, et al., Fiber Orientation in 3D Injection Moulded Features; Prediction and Experiment, Internat. Polymer Processing 14, 409-420 (1999).

B.E. VerWeyst, Numerical Predictions of Flow-Induced Fiber Orientation in Three-Dimensional Geometries, Ph.D Thesis, Univ of Illinois at Urbana Champaign (1998).

G.I. Marchuk, Splitting and Alternating Direction Methods, pp. 197-462 in Ciaret, et al., Handbook of Numerical Analysis, vol. I, North-Holland, Elsevier (1990).

K. W. Morton, Numerical Solution of Convection-Diffusion Problems, Chapman & Hall, London (1996).

R.J. LeVeque, Numerical Methods for Conservation Laws, Birkäuser (1992).

G. Stang, On the Construction and Comparison of Difference Schemes, SIAM Journ. Num. Anal. 5, 506-517 (1968).

Crandall, et al., The Method of Fractional Steps for Conservation Laws, Math. Comp. 34, 285-314 (1980).

Kojouharov, et al., Nonstandard Methods for the Convective Transport Equation with Nonlinear Reactions, Numer. Meth. Partial Diff. Eq. 14, 467-485 (1998); Nonstandard Methods for the Convective-Dispersive Transport Equation with Nonlinear Reactions, in R.E. Mickens, Applications of Non-Standard Finite Difference Schemes, Minisymposium on Non-Standard Finite Difference Schemes: Theory and Applications, SIAM Annual Meeting, Atlanta Georgia, 1999.

Wang, et al., An ELLEM Scheme for Multidimensional Advection-Reaction Equations and its Optimal-Order Error Estimate, SIAM J. Numer. Anal. 38, 1846-1885 (2001).

P.J. van der Houwen, Note on the Time Integration of 3D Advection-Reaction Equations, J. Comput. Appl. Math. 116, 275-278 (2000).

Hunsdorfer, et al., A Note on Splitting Errors for Advection-Reaction Equations, Appl. Numer. Math. 18, 191-199 (1995).

S.V. Patankar, Numerical Heat Transfer and Fluid Flow, Hemisphere Publ. Corp. (1980).

C.A.J. Fletcher, Computational Techniques for Fluid Dynamics, vol. I: Fundamental and General Techniques (2nd Edition), Springer (1991).

L.F. Shampine, Conservation Laws and the Numerical Solution of ODEs, Comp. Math. Applic. 12B, 1287-1296 (1986).

L.F. Shampine, Linear Conservation Laws for ODEs, Comp. Math. Applic. 35, 45-53 (1998).

L.F. Shampine, Conservation Laws and the Numerical Solution of ODEs, Part II, Comp. Math. Applic. 38, 61-72 (1999).

Stoer, et al., Introduction to Numerical Analysis (3rd Edition), Springer (2002).

Chung, et al., An Invariant-Based Optimal Fitting Closure Approximation for the Numerical Prediction of Flow-Induced Fibre Orientation, J. Rheol. 46, 169-194 (2002).

Dupret, et al., Numerical Prediction of Moulding of Short-Fibre Composite Parts, Proc. 1st ESAFORM Conf., 291-294 (1998).

Golub, et al., Eigenvalue Computation in the 20th Century, J. Comp. Appl. Math. 123, 35-65 (2000).

Press, et al., Numerical Recipes in Fortran 77: The Art of Scientific Computing (2nd Edition), Cambridge University Press (1992).

* cited by examiner

METHOD AND APPARATUS FOR DESCRIBING THE STATISTICAL ORIENTATION DISTRIBUTION OF PARTICLES IN A SIMULATION OF A MOULD FILLING PROCESS

RELATED APPLICATIONS

This application is a continuation-in-part of PCT Application PCT/EP2008/005361 filed Jul. 1, 2008 which claims priority from European patent application EP07012899.6 filed Jul. 2, 2007.

The present invention relates to the field of three-dimensional modelling of a flow of a particle containing suspension into a mould cavity, and more specifically to a method and apparatus for describing the statistical orientation distribution of nonspherical particles in a simulation of a process wherein a mould cavity is filled with a suspension that contains a large number of nonspherical particles.

BACKGROUND ART

A true 3-D simulation of an injection moulding process or a metal casting process involves a system of up to several hundred thousands of equations. Progress has been made in the past to improve the efficiency of the simulation methods to cope with these complex calculations. With optimized software and the processing power of modern workstations such simulations can be performed in a workplace, i.e. the results are obtained fast enough to be suitable outside the purely scientific research area and can be applied by engineers in research and development departments, foundries and manufacturers of injection moulded articles.

When particles, such as fibres, are added to the polymer composition, and the orientation distribution of the fibres needs to be described, the simulation and belonging equation set becomes significantly more complex. True 3-D simulation of such a process has hitherto not been introduced successfully on the workplace since the complexity of the simulation would not allow acceptable results on present day workstations, since either the computation time would be too long, or the accuracy of the simulation would be inadequate.

In fibre reinforced parts it is often crucial for development engineers to have a description of the fibre orientation distribution to be able to predict tension and warping aspects of the component. Typically fibres are used to improve the mechanical properties of plastic parts. But then the (thermo-) mechanical properties (like thermal expansion, strength and stiffness) depend on the orientation of the fibres.

The use of injection moulded plastic components has steadily increased in many industries in recent years. Manufacturers of electronic equipment, consumer goods, medical equipment, and automotive parts are producing more and more of their products and components used in their products out of plastics than ever before.

Injection moulded fibre reinforced parts are replacing structural metallic components because they offer an improved strength/weight ratio, durability, component integration and lower costs.

At the same time, competitive pressures are driving manufacturers in the plastic injection moulding industry to find new methods to optimize the designs in order to better match the designs to the production process. When the need for component or mould configuration modifications are discovered late in the design development process, the delay and associated costs to implement the necessary changes are significantly higher than in earlier stages of the design development stages.

Companies that want to ensure that their components are producible and will perform optimally would like to use computer aided engineering techniques to simulate or model the complex flows and resulting fibre orientation in an injection mould, in order to understand better the manufacturing process and integrate this knowledge into component design, early in the design phase.

There are a number of factors that should be considered when designing an injection mould for a fibre reinforced component and for the fibre reinforced component which is to be produced therein. Parameters such as the overall component geometry, minimum and maximum wall thicknesses, number and location of gates in the mould through which the liquid polymer and fibre suspension is injected, number and location of vents in the mould through which gas in the cavity escapes, polymer composition and properties, fibre properties and quantity, shrinkage, allowances and fibre orientation distribution are a few. Due to the closely interrelated relationship, component and mould design cannot reliably be based purely on form and function of the end component, but should also consider the effects of the manufacturing process.

Computer aided engineering simulation can be used advantageously to provide design and manufacturing engineers with visual and numerical feedback as to what is likely to happen inside the mould cavity during the injection moulding process, allowing them to better understand and predict the behaviour of contemplated component designs so that the traditional, costly trial and error approach to manufacturing can be eliminated substantially. The use of computer aided engineering simulation facilitates optimizing component designs, mould designs, and manufacturing processing parameters during the design phase, where necessary changes can be implemented readily, with the least cost and impact on schedule.

The application of CAE simulation techniques within the engineering process for fibre reinforced components encompasses (i) a simulation of the "injection moulding" manufacturing process including the computation of fluid flow and heat transfer and (ii) stress & strength (and possibly durability) calculations, all performed on the macroscopic level, for these components to determine their functional mechanical properties under external loads. Both types of simulation require suitable material models describing the properties of the polymer material containing the immersed fibres in liquid as well as in the solid state.

The length scale on the macroscopic level are determined by the linear dimensions (overall size, wall thicknesses etc.) of the component geometry typically varying in the range of a few mm up to cm. The dimensions of the computational cells have to resolve the macroscopic length scales with sufficient accuracy, therefore they are typically up to one order of magnitude smaller than the smallest macroscopic dimension. As the typical dimensions of the immersed fibres in short-fibre reinforced parts are one or two orders of magnitude below the typical dimensions of the macroscopic computational cells, the fibre properties, which are relevant to the modelling of the macroscopic material behaviour are described by a statistical approach. For short-fibre reinforced materials relevant macroscopic properties are: (a) the volume concentration, which is typically (approximately) constant over the whole part, and (b) the local distribution of the fibre orientation (FO) within each computational cell, which typically varies significantly across the part geometry. (Further details of this topic are discussed in the sections 1.1 and 1.2 of the detailed description.)

A simplified and for practical purposes appropriate description of the statistical distribution of the local FO is provided by means of the low (i.e. $2^{nd}$ and $4^{th}$) order moments of the corresponding distribution function. Because of their mathematical structure these moments are denoted as orientation tensors (of $2^{nd}$ and $4^{th}$ order respectively). Within the framework of CAE simulation for fibre reinforced components the $4^{th}$ order tensors are needed to predict the rheological as well as the mechanical properties of the fibre reinforced material on the macroscopic level, as these are $4^{th}$ order tensor properties. The $2^{nd}$ order FO tensor is a real-valued symmetric 3×3 matrix having unit trace, therefore only 5 of its 9 components are independent. The number of independent components of the $4^{th}$ order FO tensor is reduced from $3^4=81$ to 15 by means of (total) symmetry.

The mathematical model describing the FO distribution in terms of its moments is significantly simplified by means of an approximate computation of the $4^{th}$ order orientation tensor in terms of the $2^{nd}$ order tensor in terms of a closure relation. A closure relation provides the mathematical description of such a computational scheme in terms of a function, and the related computational procedure is denoted as "closure approximation" if a closure relation is only approximately valid under specific assumptions. The approach using only the $2^{nd}$ order FO tensor together with some closure approximation leads to a model of "Folgar-Tucker" type to simulate the evolution of the $2^{nd}$ order FO tensor in time and space during the mould filling process (see sections 2.2 to 2.5 of the detailed description for details).

The document "Glass fibre orientation within injection moulded automotive pedal—Simulation and experimental studies, B. R. Whiteside et Al, Plastics, Rubber and Composites, 2000, Volume 29, No. 1" discloses a method for modelling the fibre orientation distribution within a reinforced thermoplastic article using on the asymmetric thermoplastic flow and analysis containing a fibre orientation prediction algorithm. The software approximated a three-dimensional model using a two-dimensional finite element mesh consisting of linear triangular elements. Flow fields were calculated using the generalized Hele-Shaw approximation and a variation of the Folgar-Tucker equation to calculate fibre orientation. Fibre orientation, temperature and viscosity calculations were performed using a finite difference technique over 19 laminates through the "thickness" of each element in order to produce a three dimensional solution. However, it is important to note that this system could not be described as truly three-dimensional because the model cannot simulate velocity components in the out of plane direction (a limitation of the Hele-Shaw approximation). The method described in this document would, when adapted to true three-dimensional simulation, result in a unstable and too much processing power consuming simulation that could not be used in the workplace of e.g. development engineers.

DISCLOSURE OF THE INVENTION

On this background, it is an object of the present invention to provide a method for determining the orientation distribution of nonspherical particles in a simulation of a process wherein a mould cavity is filled with a suspension that contains a large number of nonspherical particles that is more stable and less computation intensive than the prior art methods.

This object is achieved in accordance with claim 1 by providing a computer implemented method for calculating orientation statistics of nonspherical particles on a macroscopic level by use of a simulation model for simulating an injection moulding process in which a mold cavity, which forms at least part of the geometry of a simulation domain, is filled or partly filled with a suspension that is formed by a solvent containing a large number of nonspherical particles, wherein a digital representation or computer model of the geometry of the simulation domain is provided, and wherein a mesh with a plurality of computational cells is formed by subdividing or discretizing at least part of the simulation domain, the method comprising the steps of a) specifying boundary conditions; b) setting initial conditions; c) solving the balance equations for mass, momentum and energy for at least a portion of the cells of the simulation domain to obtain fluid flow, heat flow and mass transfer at a macroscopic level; and d) solving nonspherical particle orientation dynamic equations based at least partly on the results of the solved balance equations to thereby determine changes in the nonspherical particle orientation at a macroscopic level as function of space and time. The results of the simulation are then provided in human readable form with data corresponding to the characteristics of the simulated molded component part. Here, for step d), the particle orientation equations may only be solved for computational cells containing suspension.

It is preferred that step c) further comprises (cc) determining an updated free surface or flow front of the fluid or suspension, which free surface separates cells filled with the suspension from the empty cells of the cavity, based at least partly on the results of the solved balance equations. Preferably, step (cc) further comprises updating the boundary conditions in accordance with the updated flow front. It is also preferred that the method of the invention further comprises the steps of e) determining if the simulated injection moulding process is finished by determining if the mold cavity is filled by the simulated injection of the suspension; and f) repeating steps c), cc) and d) until the simulated injection moulding process is finished.

This object of the present invention is also achieved by providing a method for describing the statistical distribution orientation of nonspherical particles in a simulation of a process wherein a mold cavity is filled with a suspension that is formed by a solvent that contains a large number of nonspherical particles, the method comprising (1) providing a three dimensional computer model defining the geometry of the cavity; (2) specifying the boundary conditions; (3) discretizing a solution domain based on the model to form a mesh with a plurality of cells; (4) solving the energy and flow equations for at least a portion of the solution domain; (5) computing flow and temperature conditions in the respective cells as a function of time; (6) compute the changes in nonspherical particle orientation; and (7) describing the statistical distribution of the orientation of the nonspherical particles in the respective cells as a function of time.

The methods of the invention utilize the suspension flow to predict the fibre orientation distribution and thermo-mechanical properties throughout the part at a substantially reduced computational effort. The data resulting from the simulation may be provided in human readable form to a development engineer, who can thereby optimize the products in relation to the fiber orientation and thus improve the strength and shape stability of the article.

Further objects, features, advantages and properties of the method and apparatus for determining the orientation distribution of nonspherical particles in a simulation of a process wherein a mould cavity is filled with a suspension that contains a large number of nonspherical particles according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION

Figure 1:
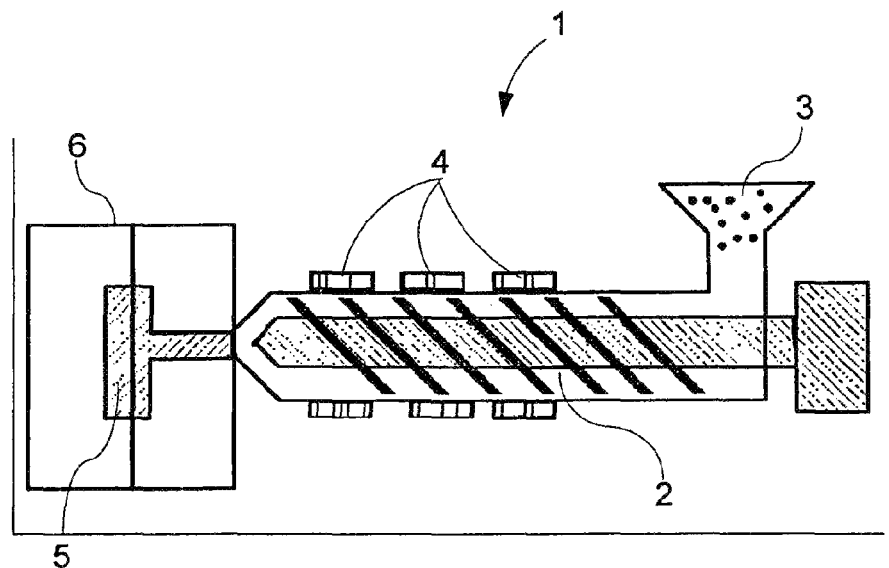
FIG. 1 a cross sectional view through a diagrammatic representation of an injection moulding machine including a mould.

FIG. 1 shows diagrammatically an injection moulding machine 1. The injection moulding machine is provided with a screw 2 that is fed with polymer pellets disposed in a hopper 3. The polymer pellets are by the action of the screw 2 and heating elements 4 transformed to a viscous mass that is urged under high pressure into a mould cavity 5 in the mould 6. And moulding machine and the injection moulding manufacturing cycle are well-known in the art and not explained in the detail here. With the moulding machine 1 both non-fibre reinforced and fibre reinforced plastic parts can be manufactured.

Figure 2:
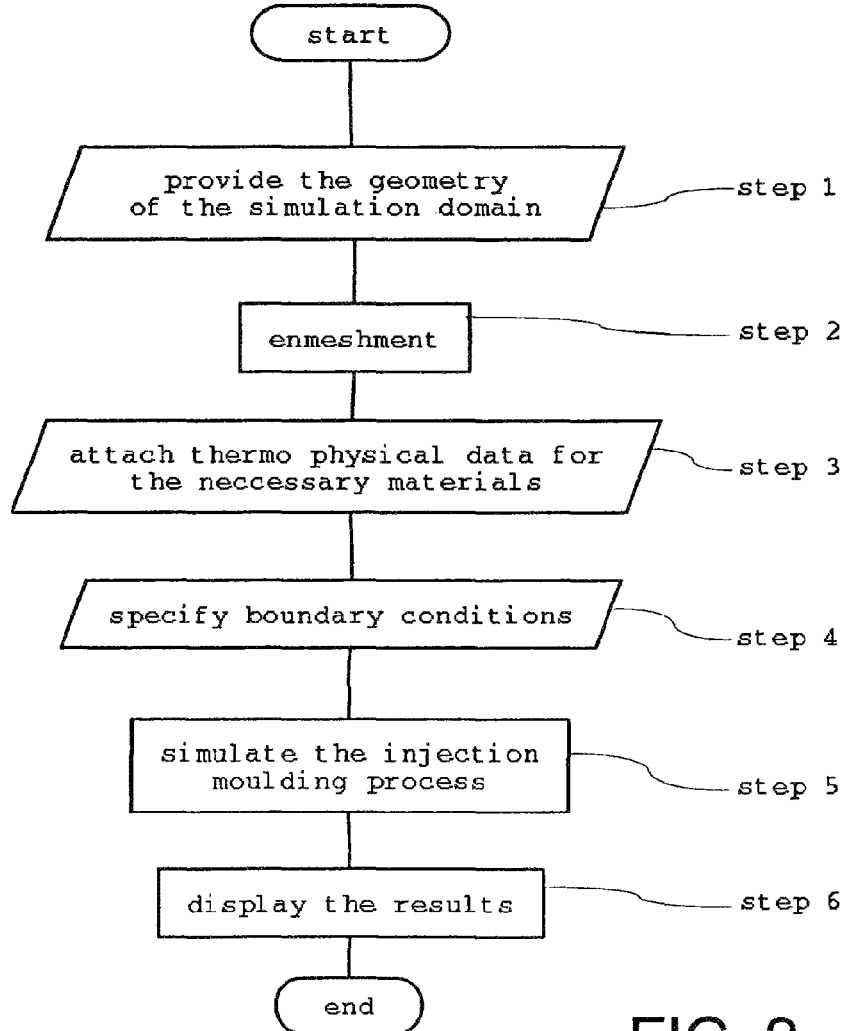
FIG. 2 is a top level flow chart summarizing basic process steps of an injection moulding process according to an embodiment of the invention.

Numerical simulation of the injection moulding process on a computer can be carried out in accordance with the process illustrated in FIG. 2.

The main steps of a simulation identified generally are the following:

step 1, providing a digital representation of the geometry of the simulation domain;

step 2, enmeshment, which is subdivision of the calculation domain into many small elements, which are the bases for discretizing the differential equations (utilizing different solution algorithms) and in this way finding the solutions to the physical phenomena to be simulated;

step 3, attaching the necessary physical data for the different materials domains into the simulation model (data base or data bank);

step 4, specifying the boundary conditions for the simulation project, step 5, simulate injection moulding process (this step will be a claimed in greater detail below); and step 6, displaying the results as a graphical or numerical presentation on the display of a computer such as a workstation.

Figure 3:
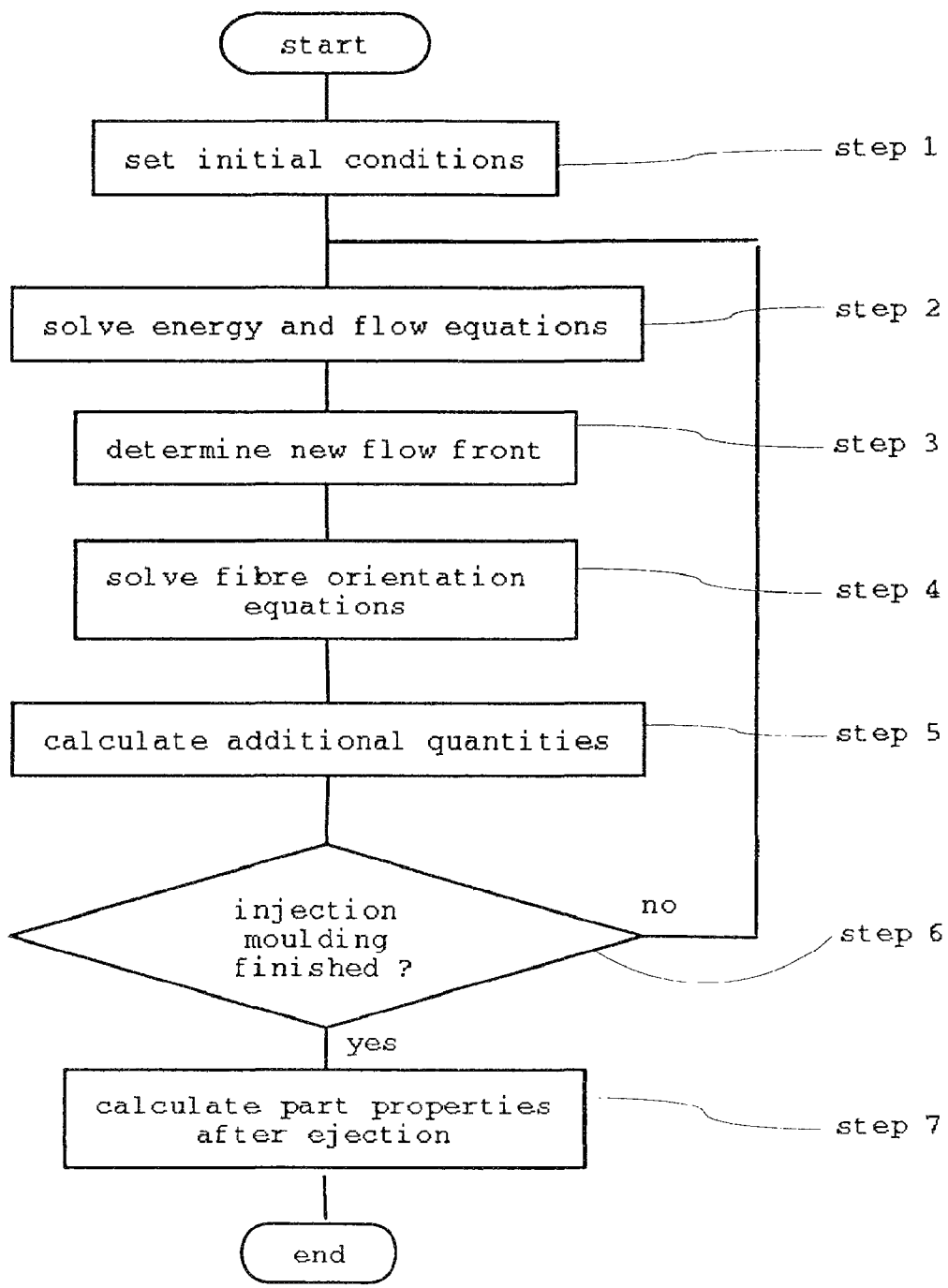
FIG. 3 is a flowchart illustrating in further detail step 5 of the flowchart of FIG. 2.

The details of step five when simulating the injection moulding process of a fibre reinforced article are illustrated in the flowchart of FIG. 3. In this part of the process the differential equations for heat flow, fluid flow and stresses and strains are solved using numerical algorithms:

step 1 the initial conditions for the thermophysical material properties and the flow front are set;

step 2 the thermal equations for the whole domain and flow equations on all fluid cells are solved using the conservation of mass, energy and momentum equations;

step 3, in this step the flow front is moved and the boundary conditions are adopted according to new flow front;

in step 4 the fibre orientation and transport is calculated from the flow velocity obtained in the previous steps. This step will be explained in greater detail below. Initial conditions are applied to the newly filled cells. Only cells containing fluid material are considered;

in step 5 additional quantities like chemical reactions are calculated, and it is verified if cells solidify;

in step 6 it is verified if the in mould injection moulding process is finished; if not the simulation continues with the next time step and the process returns to step 2;

in step 7 the properties of the article after ejection from mould are calculated.

The thermo-physical material temperatures outside the mould i.e. temperature, shrinkage, warpage etc. are calculated using the information obtained from the injection moulding simulation.

Figure 4:
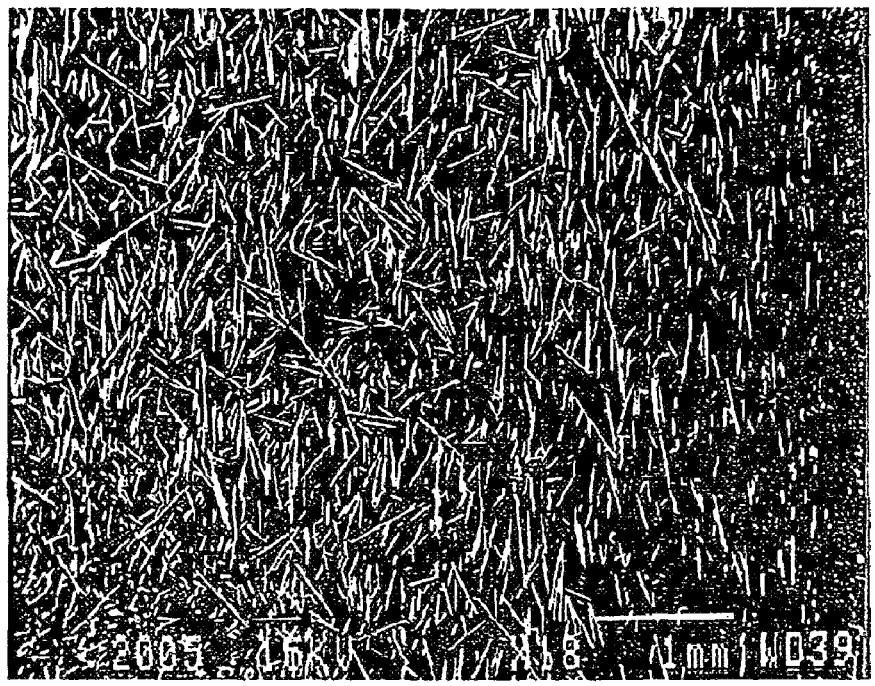
FIG. 4 is a micrograph of a fibre reinforced plastic article.

FIG. 4 is a micrograph of a fibre reinforced plastic article, in which the orientation of the fibres after the injection moulding process has finished can be seen. The orientation of the fibres in the final product is largely dependent on the flow pattern of the thermoplastic mass during the injection moulding process. The fibre orientation is not determined exactly for each single fibre, but rather described by a distribution function.

Before going into detail about the calculation of the fibre orientation, an overview of the basic fluid mechanical aspect of short-fibre thermoplastic melts is provided.

1. Basic Fluid Mechanical Aspects of Short-Fibre Thermoplast Melts

A polymer mass includes a large number of short fibres dispersed therein so that the component produced will be made of a short-fibre reinforced thermoplast. In the molten state, i.e. when the temperature is sufficiently high such that thermoplast matrix is liquid, the mixture of the plastic melt and the dispersed fibres constitutes a complex fluid which is commonly denoted as particle suspension in the terminology of fluid dynamics and physics. In general such a suspension is composed out of two different phases: (i) the solvent, which in our case corresponds to the molten plastic material without the dispersed fibres, and (ii) the particle phase, which consists of all the fibres immersed in the solvent.

1.1 Fibre Geometry and Material Properties

Figure 5:
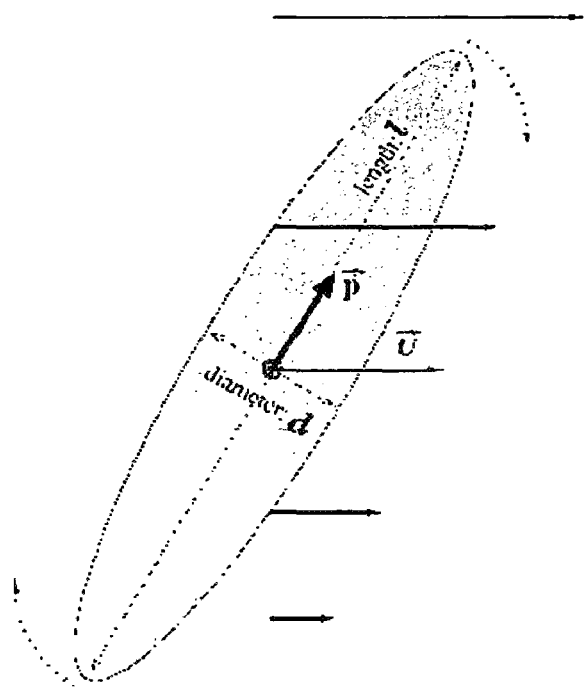
FIG. 5 illustrates a model of a fibre used in an embodiment of the invention.

Spherical particles possessing an axis of rotational symmetry (as shown in FIG. 5) are hereinafter denoted as fibres, and the terms particle and fibre are used synonymously except were explicitly indicated otherwise. The geometry of fibres is characterized by their length $\ell$ and diameter d as well as the aspect ratio $r_a = \ell/d$ resulting from both quantities. Typical values of these quantities for fibres (e.g. of carbon or glass type) dispersed in short-fibre reinforced thermoplast materials are for example $\ell \approx 0.5$ mm, $d \approx 5$ µm and $r_a \approx 100$. Typically these values vary in the range of $\ell = 0.1$ to 1. mm, $d = 1$ to 10 µm with correspondingly large aspect ratio values.

For most types of fibres immersed in fibre-reinforced plastics, the mass density of the fibre material is comparable to the density of the suspending plastic melt. The plastic melt itself has a rather high viscosity at typical temperatures occurring during the mould filling phase. By combining these two aspects buoyancy effects as well as inertial effects are neglected when describing the motion of the fibres within the plastic melt in the method according to the preferred embodiment.

Concerning the fibre concentration, a spatially homogeneous distribution of the fibres throughout the suspension is assumed and thus to take the concentration to be constant. Effects that could alter may be (i) a purely convective transport of an inhomogeneous distribution already present at the inlet or (ii) the occurrence of shear induced particle migration effects in the course of the mould filling phase.

If either (i) or (ii) constitute a significant effect, the model used to describe the suspension flow of short fibres immersed in a thermoplast melt necessarily has to be a "two phase flow" model that mutually couples the flow of both the particles and the solvent phase and allows for an inhomogeneous particle concentration However, this is not the case. The phenomenon (ii) can be understood as a kind of diffusion process, where the diffusion constant scales like the square of the relative particle size, which is defined as the ratio of the actual size of the suspended particles (i.e. the fibre length, or the radius in the case of spherical particles) to a typical dimension of the flow cavity (e.g. the wall thickness). As the relative particle size is typically of the order of 0.1 to 0.01 even for thin walled parts manufactured by injection moulding out of fibre-reinforced plastics, it is perfectly plausible that (ii) is completely negligible in this case. Concerning (i) one could imagine that there might be an inhomogeneous concentration profile at the inlet due to the preparation process of the melt in the screw. However, the fibre concentration experimentally observed in practice for typical short-fibre reinforced plastic parts shows only very small deviations from a constant value almost everywhere within the parts, which is maybe the best argument for the assumption of a homogeneous fibre distribution [20].

1.2 Influence of the Fibres on Rheological Properties

Thermoplast materials display non-Newtonian flow behaviour. In the case of a pure plastic melt without fibres, the rheological properties of the material may be modelled by a scalar viscosity function which depends on temperature as well as on state variables of the flow (generalized Newtonian fluids). Although it is known that they cover only a limited range of non-Newtonian flow properties (like e.g. shear thinning), they have proven to be useful and satisfactorily accurate for the purposes of injection moulding simulation. Models of this type are used also in the method according to the preferred embodiment of the invention.

The addition of fibres to the thermoplast matrix material yields mechanical properties which in the solid state are strongly anisotropic and heavily depend on the local distribution of the directions in which the embedded fibres are pointing into. In principle the anisotropic material behaviour is present also if the material is in a liquid (i.e. molten) state. To account for this anisotropy one would have to replace the scalar viscosity mentioned above by a viscosity tensor. There have been a number of investigations that compare both ways of modelling the material behaviour of fibre suspensions. For most flow situations like the ones encountered in mould filling it has been found that the filling pattern predicted by both types of models (i.e. the scalar and the tensor ones) shows little difference (see e.g. [21], [22]). Therefore anisotropic viscosity effects are neglected and a simple generalized Newtonian model is used here also when the thermoplast melt contains fibres. This is equivalent to the neglect of the influence of the orientation of the dispersed fibres on the rheological properties of the melt. The viscosity depends on fibre concentration, but since this is assumed to be constant (see above), this aspect enters only as an a priori known material parameter which contributes to the effective material properties of the thermoplast melt.

Due to this approach the method according to the preferred embodiment uses a partial decoupling of the calculations of the flow and those of the fibre orientation: while the flow velocity locally influences the orientation of the dispersed fibres, there's negligible influence from the fibre orientation on the flow. Therefore the computation of the flow is carried out independently from the computation of fibre orientation. In this way the local flow velocity of the melt enters the model used for the computation of fibre orientation as a set of external coefficients.

2. The Folgar-Tucker Model 2.1 Jeffery's Equation

Although the fibres suspended in the polymer melt are slender particles in the sense that their aspect ratio $r_a = \ell / d$ is large, they are short enough such that the mechanical forces acting upon them in the local flow field of the solvent are not able to cause any substantial deformation. Therefore an individual fibre is here modelled as a slender, rotationally symmetric rigid body whose orientation is given by a unit vector p directed along the axes of rotational symmetry. The two vectors $\pm p$ both represent the same orientation state of the particle.

FIG. 5 illustrates a rigid particle of rotationally elliptic shape whose motion is influenced by the velocity vector field U in the vicinity of the particle. In addition to the quantities (length $\ell$ and diameter d) characterizing the geometry of the particle, the orientation vector p is shown. The direction and size of the flow velocity U is indicated by the direction and length of the corresponding arrows. Although the directions of the velocity vectors are all the same, their length is not, indicating that the flow velocity in the vicinity of the particle is not constant. However, the local amount of change of the flow velocity, i.e. the velocity gradient, seems to be the same, as there is a constant increase in the length of the vectors from bottom to top. At every point of the particle surface, the particle is supposed to move exactly with the local flow velocity ("no slip" boundary condition). If the flow velocity were constant around the particle, this would result in a simple translational motion, i.e. a purely convective transport. Otherwise, in the presence of a velocity gradient, the particle also performs a rotational motion, as indicated by the dashed arrows. Altogether, the most general type of motion performed by the rigid particle is a translation with the "average velocity" around the particle, combined with a rotation around its centre of mass that is driven by the velocity gradient describing the local deviation of the flow velocity from its average value in the vicinity of the particle.

The qualitative description given above has been cast into a mathematical model by Jeffery [2], assuming that viscous forces are dominant, inertial forces therefore negligible and the variation of the local flow is small over the region swept by a single fibre during its motion.

As explained above, all these assumptions are fulfilled in the case of short fibres dispersed in a thermoplast melt. The assumed smallness of the variation of the flow velocity around the fibre implies that the local velocity gradient tensor $\nabla \otimes U$ is sufficient to describe this variation accurately. This tensor is a 3×3 matrix whose elements are computed from the partial derivatives of the components $U_j$ of flow velocity vector with respect to the Cartesian coordinates $x_i$ of a point $r=(x_1,x_2,x_3)^T$ in space, i.e.: $(\nabla \otimes U)_{ij}=\partial U_j/\partial x_i$. So if $r_0$ is the spatial coordinate of the particle centre of mass, the values of the flow velocity U at points r near the particle and time t are well approximated by a first order Taylor expansion $U(r,t) \approx U(r_0,t)+(\nabla \otimes U(r_0,t))^T \cdot (r-r_0)$ with negligible error, and the velocity gradient can be regarded as a locally constant quantity, i.e. it may be assumed that $\nabla \otimes U(r,t) \approx \nabla \otimes U(r_0,t)$ holds for all points r near $r_0$.

In this case, the transient orientation state of a fibre, which is given by its orientation vector p(r,t) as a function of the space and time coordinates, is computed using Jeffery's equation $$\frac{D}{Dt}p = \hat{M}^T \cdot p - (p^T \cdot \hat{M} \cdot p)p, \quad (1)$$

which is written here in compact Eulerian form. While the convective (or material) derivative $$\frac{D}{Dt}p = \left\{\frac{\partial}{\partial t} + U \cdot \nabla\right\}p$$

on the left hand side (l.h.s.) of eqn. (1) describes pure fibre orientation, FO, transport in the local velocity field U(r,t) of the flow, the right hand side (r.h.s.) models the rotational motion of the particle driven by the effective local velocity gradient tensor $\hat{M}$. In the ideal special case of infinitely slender fibres (i.e. aspect ratio $r_a \to \infty$) the tensor $\hat{M}$ is identical to the velocity gradient tensor $\nabla \otimes U$, in the general case of fibres having finite aspect ratio ($0 < r_a < \infty$) it is defined by the term $$\hat{M} = \frac{\lambda+1}{2}(\nabla \otimes U) + \frac{\lambda-1}{2}(\nabla \otimes U)^T \quad (1a)$$

containing the fibre geometry parameter $\lambda = (r_a^2-1)/(r_a^2+1)$. This parameter encodes how particle geometry affects the rotational motion of the fibres in the case of rotationally symmetric ellipsoidal particles.

Alternative ways to write Jeffery's equation make use of the uniquely defined decomposition of the velocity gradient tensor into its symmetric and antisymmetric parts given by the shear rate and vorticity tensors given by $$\hat{G} = \frac{1}{2}[(\nabla \otimes U) + (\nabla \otimes U)^T] \text{ ("shear rate")}, \quad (1b)$$

$$\hat{W} = \frac{1}{2}[(\nabla \otimes U) - (\nabla \otimes U)^T] \text{ ("vorticity")}.$$

The shear rate and vorticity tensors are related to the effective velocity gradient tensor via the identities $$\hat{M} = \hat{W} + \lambda \hat{G} \Leftrightarrow \hat{G} = \frac{1}{2\lambda}(\hat{M}+\hat{M}^T) \hat{W} = \frac{1}{2}(\hat{M}-\hat{M}^T) \quad (1c)$$

Inserting these identities into (1) and taking into account that $p^T \cdot \hat{W} \cdot p = 0$ yields Jeffery's equation in the alternative form $$\frac{D}{Dt}p = -\hat{W} \cdot p + \lambda[\hat{G} \cdot p - (p^T \cdot \hat{G} \cdot p)p]. \quad (1d)$$

Yet another form of Jeffery's equation may be obtained by rewriting the first term on the r.h.s. of (1d) using the identity $-\hat{W} \cdot p = \hat{W}^T \cdot p = \frac{1}{2} \mathrm{rot}\, U \times p$, which relates the vorticity tensor to the rotation rot U of the flow velocity vector field (see e.g. [3]).

In the case of particles whose geometry is rotationally symmetric but not ellipsoidal, the form of eqn. (1) as well as the definition of the effective velocity gradient remain the same, but the formula of the geometry parameter $\lambda$ has to be altered, such that the "geometric" aspect ratio $r_a = \ell/d$ as defined above is replaced by an effective aspect ratio $r^*_a \approx r_a$, the appropriate value of which has to be determined from experiment. In this sense, the geometry parameter $\lambda$ can be regarded as a material parameter.

In the case of asymmetric aspherical particles eqn. (1) has to be replaced by a coupled system of three Jeffery type equations containing three geometry parameters [3].

2.2 Macroscopic Distribution of Fibre Orientation

In the case of an injection moulding simulation for short-fibre reinforced plastics performed on the macroscopic level, the number of fibres contained in a single computational cell (i.e. a volume element of the computational domain) is very large because of the small dimensions of the individual fibres. This point is illustrated by the micrograph shown in FIG. 4, which represents a typical sample taken from a part made of short-fibre reinforced plastic. Therefore the local FO state of the material contained in a computational cell is described by means of a macroscopic model, i.e. a distribution function $\Psi(p,r,t)$ of the FO vector p (see [5]). We note that although fibre concentration is assumed to be homogeneous, the distribution function $\Psi$ still depends on the (r,t) coordinates parametrically via the local flow velocity field U(r,t) and its gradient $\nabla \otimes U$. As an additional point, a term that accounts for the mutual interaction of the fibres, influencing their orientation, has to be included in the model on the macro level. The transition from Jeffery's equation as a micro model of individual, noninteracting fibres to a macro model which yields FO statistics of many interacting fibres is achieved via a corresponding Fokker-Planck equation $$\frac{D}{Dt}\Psi = -\nabla_p \cdot \left[\Psi \frac{D}{Dt}p - D_r \nabla_p \Psi\right] \quad (2)$$

with the FO distribution function $\Psi$ as dependent variable. Here $$\frac{D}{Dt}p$$

serves as a shorthand for the r.h.s. of Jeffery's equation (1), and $\nabla_p \ldots$ and $\nabla_p \bullet \ldots$ symbolize the gradient and divergence operators defined on the unit sphere $S^2$ of three dimensional Euclidian space $\mathbb{R}^3$. According to the approach of Folgar and Tucker [4], the introduction of a diffusion coefficient $D_r = C_i \gamma_{\mathit{eff}}$ proportional to the effective shear rate $\gamma_{\mathit{eff}} = \sqrt{2G_{ij}G_{ij}}$ of the local velocity gradient yields a simple model of fibre-fibre interaction in concentrated suspensions. Here the $G_{ij}$ are the components of the shear rate tensor $\hat{G}$ as defined in (1b), and the term under the square root—using the Einstein summation convention—is a short hand for its self-contraction $G_{ij}G_{ij}=\Sigma_{i,j}G_{ij}^2=\hat{G}:\hat{G}$. The dimensionless, nonnegative interaction coefficient $C_I$ is a material parameter of the suspension. Typically it has a small (positive) value in the range of $10^{-3} \ldots 10^{-2}$ for short-fibre reinforced plastics. We note that in incompressible (as well as nearly incompressible) flows, the relative weakness of the "stochastic" diffusion term—compared to the term representing the "deterministic" Jeffery dynamics—can be the source of stability problems.

2.3 Fibre Orientation Tensors and the Folgar-Tucker Equation

Computing the local FO distribution by means of the FokkerPlanck equation (2) requires the numerical solution of a PDE defined on the unit sphere $S^2$ for each computational cell of the flow simulation domain, which is a prohibitively expensive task for "industrial size" 3D problems. Therefore, Advani and Tucker [6] proposed the usage of fibre orientation tensors, which are defined as moments of the distribution function, and thus to replace the Fokker-Planck equation by a hierarchy of moment equations for the FO tensors. Because of the inversion symmetry $\Psi(-p, \ldots)=\Psi(p, \ldots)$ of the FO distribution w.r.t. the variable p, which reflects the fact that the directions ±p correspond to the same orientation state, all odd order moments vanish identically, such that the moment expansion of $\Psi$ contains only elements of even order. The first nontrivial moment of this expansion is therefore the second one given by $$\hat{a}^{(2)}(r,t) = \oint_{S^2} dS(p) (p \otimes p) \Psi(p,r,t) \quad (3)$$

(in index notation: $a_{ij}^{(2)}(r,t)=\oint_{S^2} dS(p) \ p_i p_j \ \Psi(p,r,t)$). The notation $\oint_{S^2} dS(p) \ldots$ means that the integral is performed over the surface of the sphere $S^2$, where $dS(p)$ is the integration measure. The second moment $\hat{a}^{(2)}(r,t)$ is named 2nd order FO tensor (or FO matrix) and is, by definition, a real symmetric 3×3 matrix. As the FO distribution (also by definition) is normalized according to $\oint_{S^2} \Psi dS=1$, the FO matrix $\hat{a}^{(2)}$ has the obvious property that its trace $\mathrm{Tr}(\hat{a}^{(2)})=\Sigma_k a_{kk}^{(2)}$ equals 1, as $p^2=\Sigma_{i=1}^3 p_i^2=1$ holds. The next nontrivial moment in the expansion hierarchy is the 4th order FO tensor $\hat{a}^{(4)}$ defined as $$\hat{a}^{(4)}(r,t) = \oint_{S^2} dS(p) (p \otimes p \otimes p \otimes p) \Psi(p,r,t) \quad (4)$$

(in index notation: $a_{ijkl}^{(4)}(r,t)=\oint_{S^2} dS(p)\ p_i p_j p_k p_l \Psi(p,r,t)$). The tensor $\hat{a}^{(4)}$ is totally symmetric and additionally possesses various normalization properties: due to $p^2=1$, the sum over an arbitrary pair of equal indices always yields a corresponding element of $\hat{a}^{(2)}$ (e.g. $\Sigma_k a_{ijkk}^{(4)}=a_{ij}^{(2)}$), and the sum over two equal index pairs always equals 1 (e.g. $\Sigma_{j,k} a_{jjkk}^{(4)}=1$), so $\hat{a}^{(4)}$ contains complete information about $\hat{a}^{(2)}$.

The hierarchy of moment equations mentioned above is obtained for the moments of each order by interchanging the derivative and integration operations, i.e.

$$\frac{D}{Dt} \oint_{S^2} dS(p)(p \otimes \ldots \otimes p) \Psi = \oint_{S^2} dS(p)(p \otimes \ldots \otimes p) \frac{D}{Dt}\Psi$$

replace $$\frac{D}{Dt}\Psi$$

by the terms on the r.h.s. of the Fokker-Planck equation (2) and evaluate the corresponding integrals analytically. If this procedure is applied to the FO matrix $\hat{a}^{(2)}$, the so called Folgar-Tucker equation (FTE) is obtained as the first nontrivial in the hierarchically organized series of moment equations:

$$\frac{D}{Dt}\hat{a}^{(2)} = \hat{a}^{(2)} \cdot \hat{M} + \hat{M}^T \cdot \hat{a}^{(2)} - (\hat{M}+\hat{M}^T) : \hat{a}^{(4)} + 2D_r[\hat{1}-3\hat{a}^{(2)}] \quad (5)$$

As in Jeffery's equation, the convective derivative on the l.h.s. of (5) describes the pure transport of the local FO state (represented by the FO matrix $\hat{a}^{(2)}$ in this order of the moment expansion) due to the translational motion of the fibres in an Eulerian reference frame, while the first two terms on the r.h.s. of (5) model their rotational motion driven by the local effective velocity gradient $\hat{M}$. The $3^{rd}$ term on the r.h.s. of (5) results from the presence of the diffusion term in the Fokker-Planck eqn. (2). At the level of the FTE it yields a damping effect that drags the FO matrix towards the isotropic state $\hat{a}^{(2)}=\frac{1}{3}\hat{1}$.

In its Eulerian form (5) the FTE is a coupled system of $1^{st}$ order PDEs of convection-reaction type. From the Lagrangean viewpoint (5) is a coupled system of ODEs for the components of $\hat{a}^{(2)}$.

2.4 Basic Properties of the FO Matrix

As a real symmetric 3×3 matrix the FO matrix $\hat{a}^{(2)}$ possesses 3 real eigenvalues $\mu_k$ with corresponding eigenvectors $E_k$ that form an orthonormal basis of $\mathbb{R}^3$, i.e.: $\hat{a}^{(2)} \cdot E_k = \mu_k E_k$ with $E_k \cdot E_l = \delta_{kl}$, where δkl is Kronecker's symbol which is equal to 1 for k=l and zero otherwise. It is straightforward to show that, by construction, the eigenvalues $\mu_k$ of the FO matrix $\hat{a}^{(2)}$ are nonnegative and—as $p^2=1$ holds—their sum, which is identical to the trace of $\hat{a}^{(2)}$ (see above), always equals one (i.e.: $\Sigma_{k=1}^3 \mu_k = \Sigma_{k=1}^3 a_{kk}^{(2)}=1$).

For any unit vector $p_0$, the special FO matrix $\hat{a}_0=p_0 \otimes p_0$ represents a so called uniaxial orientation state where 100% of the fibres are oriented in the direction given by $\pm p_0$. Thus, the sign of $p_0$ drops out of the dyadic product defining this special FO matrix. The vector $p_0$ is an eigenvector of $\hat{a}_0$ with eigenvalue 1, and the remaining two eigenvalues are zero with corresponding eigenvectors that lie in the plane orthogonal to $p_0$ and are arbitrary otherwise.

The FO matrix may be written in terms of its spectral representation $\hat{a}^{(2)}=\Sigma_{k=1}^3 \mu_k E_k \otimes E_k$, which has the form a weighted sum of the uniaxial orientation states $E_k \otimes E_k$ formed by the eigenvectors of the FO matrix, with the weights given by the eigenvalues. This allows for an interpretation of an eigenvalue $\mu_k$ as the local fraction of fibres oriented along the direction of the corresponding eigenvector $E_k$. In this sense the spectral data $\{\mu_k, E_k\}_{k=1,2,3}$ of the FO matrix represent the local macroscopic orientation state of the fibres within a small volume of the suspension.

This serves as a motivation for the following (mathematically formal) definition of a FO matrix and the phase space of the FTE [12]:

Definition: A real symmetric 3×3 matrix â is a FO matrix if and only if it is positive semidefinite and its trace equals 1. The phase space $M_{FT}$ of the FTE is the set of all FO matrices.

It can be shown that the set $M_{FT}$ is equivalent to the set of all real, symmetric 3×3 matrices that result from moment integrals of the type (3) using properly normalized, but otherwise arbitrary distribution functions. A mathematical characterization of the phase space $M_{FT}$ by means of its topological and geometrical properties has been given recently by one of the authors (see [12]). It is of great practical importance to know exactly whether a matrix belongs to the set $M_{FT}$, as the interpretability of the results of a numerical integration of the FTE requires the dependent variable $\hat{a}^{(2)}$ to have the special spectral properties as described above during all steps (i.e. also the intermediate ones) of the FO calculation.

2.5 The Closure Problem

The so called closure problem originates from the fact that at each order of the moment expansion, the DE for the moment $\hat{a}^{(2n)}$ contains the moment $\hat{a}^{(2n+2)}$ of the next higher order as a variable. While $\hat{a}^{(2n)}$ may be expressed in terms of $\hat{a}^{(2n+2)}$ by means of a simple algebraic identity (i.e. a sum over a pair of two equal indices, see above), the reverse is not possible, so $\hat{a}^{(2n+2)}$ has to be treated as an unknown. In the FTE this closure problem manifests itself by the appearance of $\hat{a}^{(4)}$ on the r.h.s. of (5), which prevents the system from being solvable unless it is closed by expressing $\hat{a}^{(4)}$ as a function of $\hat{a}^{(2)}$ by means of a closure approximation. Applying a closure approximation to the FTE means replacing the exact—but unknown—4th order FO tensor $\hat{a}^{(4)}$ on the r.h.s. of (5) by some appropriate (in general nonlinear) tensor function $\hat{A}^{(4)}[\hat{a}^{(2)}]$ of the FO matrix [8].

A known example is the hybrid closure [7] defined by the formula $$\hat{A}_{hyb}^{(4)}[\hat{a}^{(2)}] := f_s(\hat{a}^{(2)}) \cdot \hat{A}_{qu}^{(4)}[\hat{a}^{(2)}] + (1 - f_s(\hat{a}^{(2)})) \cdot \hat{A}_{lin}^{(4)}[\hat{a}^{(2)}] \quad (6)$$

which, despite some well known drawbacks, is an accepted choice because of its algebraic simplicity and numerical robustness [7]. The closure $\hat{A}_{hyb}^{(4)}$ is defined as a (convex) interpolation between two closures of simpler type: the quadratic closure defined as $$\hat{A}_{qu}^{(4)}[\hat{a}^{(2)}] := \hat{a}^{(2)} \otimes \hat{a}^{(2)} \text{ (i.e. } (\hat{A}_{qu}^{(4)}[\hat{a}^{(2)}])_{ijkl} := a_{ij}^{(2)} a_{kl}^{(2)} \text{ in index notation)} \quad (6a)$$

which yields exact results in the special case of an uniaxial orientation distribution, and the linear closure given by $$(\hat{A}_{lin}^{(4)}[\hat{a}^{(2)}])_{ijkl} := -\frac{1}{35}(\delta_{ij}\delta_{kl} + \delta_{ik}\delta_{jl} + \delta_{il}\delta_{jk}) + \frac{1}{7}(\delta_{ij}a_{kl}^{(2)} + \delta_{kl}a_{ij}^{(2)} + \delta_{ik}a_{jl}^{(2)} + \delta_{jl}a_{ik}^{(2)} + \delta_{il}a_{jk}^{(2)} + \delta_{jk}a_{il}^{(2)}) \quad (6b)$$

which is exact in the isotropic case. The interpolation weight between these extreme cases is provided by the scalar orientation factor $$f_s(\hat{a}^{(2)}) := 1 - 27\det(\hat{a}^{(2)}). \quad (6c)$$

As the determinant $\det(\hat{a}^{(2)})$ is an invariant of the FO matrix, the same is true for the scalar orientation factor.

We denote the special variant of the FTE (5) combined with the hybrid closure approximation (6) by the acronym FTE-hyb. This variant is of great practical interest, The preferred embodiment of the invention is also based on the FTE-hyb variant of the Folgar-Tucker model.

2.6 The FTE as a Differential Algebraic System

The r.h.s. of (5) is formally well defined for arbitrary real symmetric matrices. The question whether the properties of the r.h.s. of (5) automatically confine the solution trajectories to the domain $M_{FT}$ can be answered positively at least for the FTE in its exact form (i.e. without a closure approximation): If the exact 4th order FO tensor $\hat{a}^{(4)}$ is inserted into the r.h.s. of (5) and then $\hat{a}^{(2)}$ is computed as a solution of (5), the result is identical to the exact 2nd moment of the FO distribution which is obtained by evaluating the moment integral (3) using the solution $\Psi$ of the Fokker-Planck eqn. (2) with the same parameters $\hat{M}$ and $D_r$. By this argument it may be concluded that the solution of (5), using the exact 4th order FO tensor $\hat{a}^{(4)}$, may be written as a moment integral (3), and its trajectory therefore is necessarily confined to the domain $M_{FT}$.

However, this argument is no longer valid if a closure approximation is applied, which is always necessary if one has to solve the FTE numerically without any prior knowledge of the full distribution function. In this way, the problem of confinement of the solutions of the FTE to the phase space $M_{FT}$ always arises in all problems of practical interest.

The necessity to confine the solution trajectories of the FTE to the domain $M_{FT}$ imposes additional constraints on the dependent variable $\hat{a}^{(2)}$ which may be formulated in terms of algebraic inequalities of its invariants (see [12]). These constraints on the dependent variable turn the FTE into a differential algebraic system (DAS) and have to be taken care of in the procedure used for numerical integration.

3. Mathematical Characterization of the Phase Space of the FTE

The basic topological properties of the phase space $M_{FT}$ can be deduced directly from the special properties of FO matrices as summarized in Theorem 1: The phase space $M_{FT}$ is a bounded convex subset of the vector space of real symmetric 3×3 matrices confined to the five-dimensional hyperplane defined by the trace condition $\text{Tr}(\hat{a}) = 1$.

The convexity of $M_{FT}$ allows for the definition of a projection mapping onto $M_{FT}$ which may be combined with any suitable ODE integrator to construct a proper integration method for the FTE (see chapter IV.4 of [9]). An invariant algebraic characterization of FO matrices may be obtained by an analysis of the characteristic polynomial $$P_{\hat{a}}(\mu) = \det(\mu\hat{1} - \hat{a}) = \mu^3 - S_a \mu^2 + K_a \mu - D_a$$

of a real symmetric 3×3 matrix.

The coefficients $S_a = \text{Tr}(\hat{a})$, $$K_a = \frac{1}{2}[\text{Tr}(\hat{a})^2 - \text{Tr}(\hat{a} \cdot \hat{a})]$$

and $D_a = \det(\hat{a})$ are invariants of the matrix. (In the literature these invariants occasionally are denoted by $I_1 = S_a$, $I_2 = K_a$ and $I_3 = D_a$.) The algebraic characterization of FO matrices may be formulated in terms of these invariants according to Theorem 2: A real symmetric 3×3 matrix $\hat{a}$ is a FO matrix if and only if its trace $S_a$ equals 1 and its invariants $K_a$ and $D_a$ are nonnegative.

Figure 6:
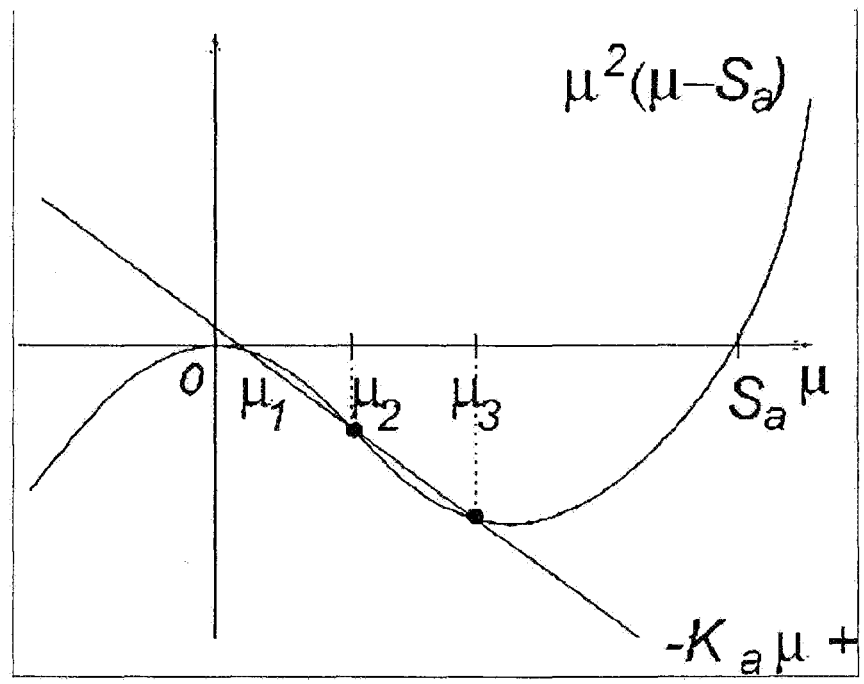
FIG. 6 is a graph illustrating the quadratic & cubic and the linear & constant terms of the characteristic polynomial.

FIG. 6 illustrates this statement by a separate analysis of the quadratic and cubic terms and the linear and constant terms of the characteristic polynomial $P_{\hat{a}}(\mu)$: a positive trace $S_a$ obviously provides the existence of positive eigenvalues $\mu_k$, while nonnegative values of the two invariants $K_a$ and $D_a$ prevent the existence of negative ones. Moreover, the conditions $S_a > 0$, $K_a \geq 0$ and $D_a \geq 0$ are not only necessary but also sufficient for all eigenvalues of $\hat{a}$ to be nonnegative, as the matrix $\hat{a}$ always has three real eigenvalues. Combined with the trace condition $S_a = 1$ this completes the proof of the above theorem.

Figure 7:
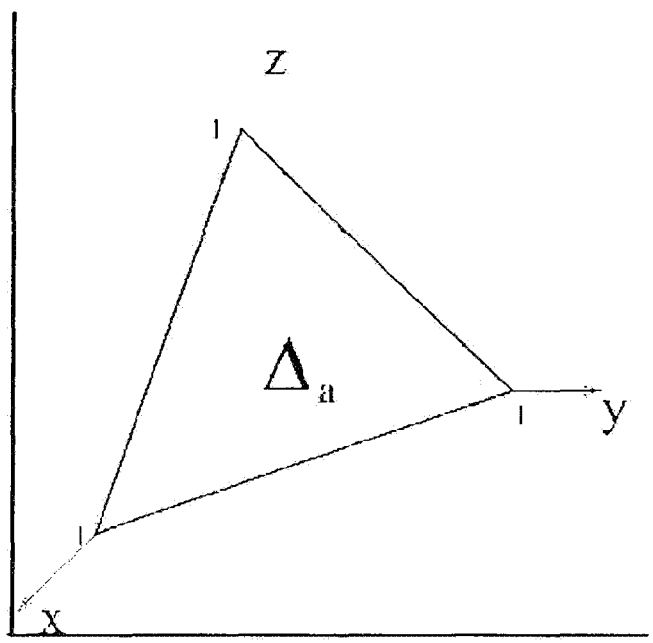
FIG. 7 is a graph illustrating the triple of eigenvalues of the matrix.

A notion of the geometry of the phase space $M_{FT}$, which is a 5D object according to theorem 1, can be obtained by looking at the diagonal and the off-diagonal elements of FO matrices separately. First we note that the diagonal elements given by $a_{jj} = \oint_{S^2} dS(p) \, p_j^2 \Psi(p)$ are always nonnegative and satisfy the trace condition $\Sigma_k a_{kk} = 1$. Therefore, independent of the choice of the coordinate system, they are confined to the triangle set (see FIG. 7)

$$\Delta_a := \{(x, y, z) \in \mathbb{R}^3 \mid 0 \leq x, y, z \leq 1, x + y + z = 1\}. \quad (7)$$

This provides a necessary condition which characterizes FO matrices w.r.t. their diagonal elements and yields an invariant representation of the "diagonal part" of the phase space set $M_{FT}$.

A formal description of the "off-diagonal" part of the domain $M_{FT}$ may be obtained by introducing the notation (x,y,z) and (u,v,w) for the triples of the diagonal and off-diagonal elements of a real symmetric 3×3 matrix, taking an arbitrary (but fixed) diagonal triple $(x,y,z) \in \Delta_a$ and formally define the set $$N_{(x,y,z)} := \left\{ (u, v, w) \in \mathbb{R}^3 \mid (x, y, z) \in \Delta_a, \begin{pmatrix} x & w & v \\ w & y & u \\ v & u & z \end{pmatrix} \in M_{FT} \right\} \quad (8)$$

of all "admissible" off-diagonal triples belonging to a fixed diagonal triple. Algebraically the set $N_{(x,y,z)}$ can be characterized as the set of all off-diagonal triples (u, v, simultaneously) satisfying the following pair of inequalities, as explained with respect to Theorem 2 above:

$$K_a \geq 0 \Leftrightarrow u^2 + v^2 + w^2 \leq xy + xy + zx, \quad (9)$$

$$D_a \geq 0 \Leftrightarrow u^2 x + v^2 y + w^2 z - 2uvw \leq xyz. \quad (10)$$

Figure 8:
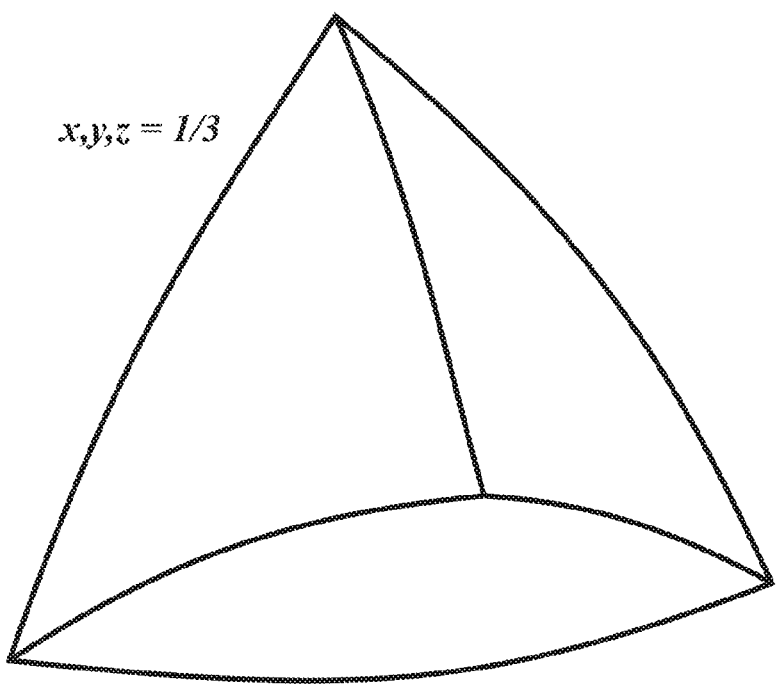
FIG. 8 shows a special example corresponding to a "maximally symmetric" case.
Figure 9:
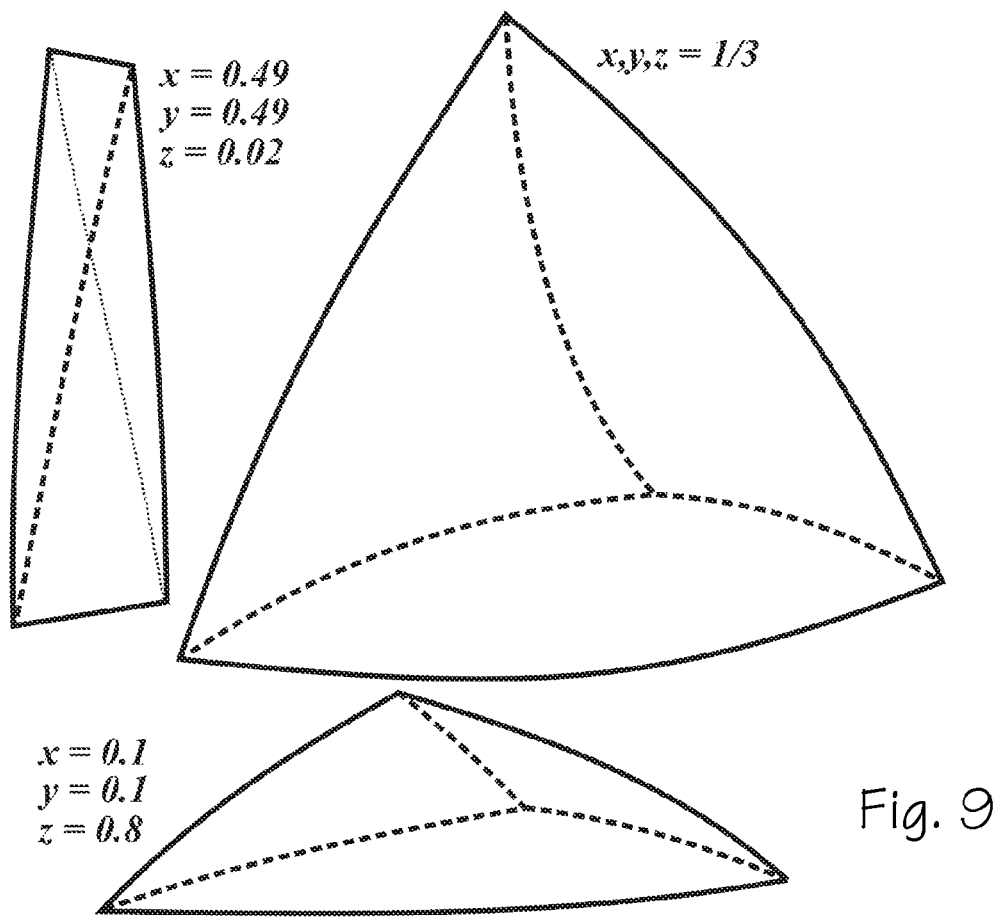
FIG. 9 shows distorted versions of the tetrahedron-shaped volume.

A special example corresponding to the "maximally symmetric" case $x=y=z=\frac{1}{3}$ is shown in FIG. 8, other cases (see FIG. 9) correspond to distorted versions of this tetrahedron-shaped volume.

To complement the restrictions (9) and (10) of the invariants $K_a$ and $D_a$ to nonnegative values, we note that for any real symmetric 3×3 matrix with positive trace $S_a > 0$ these invariants are restricted also from above by $K_a \leq \frac{1}{3} S_a^2$ and $D_a \leq \frac{1}{27} S_a^3$, such that for FO matrices ($S_a=1$) their values are always confined by $0 \leq K_a \leq \frac{1}{3}$ and $0 \leq D_a \leq \frac{1}{27}$.

Figure 10:
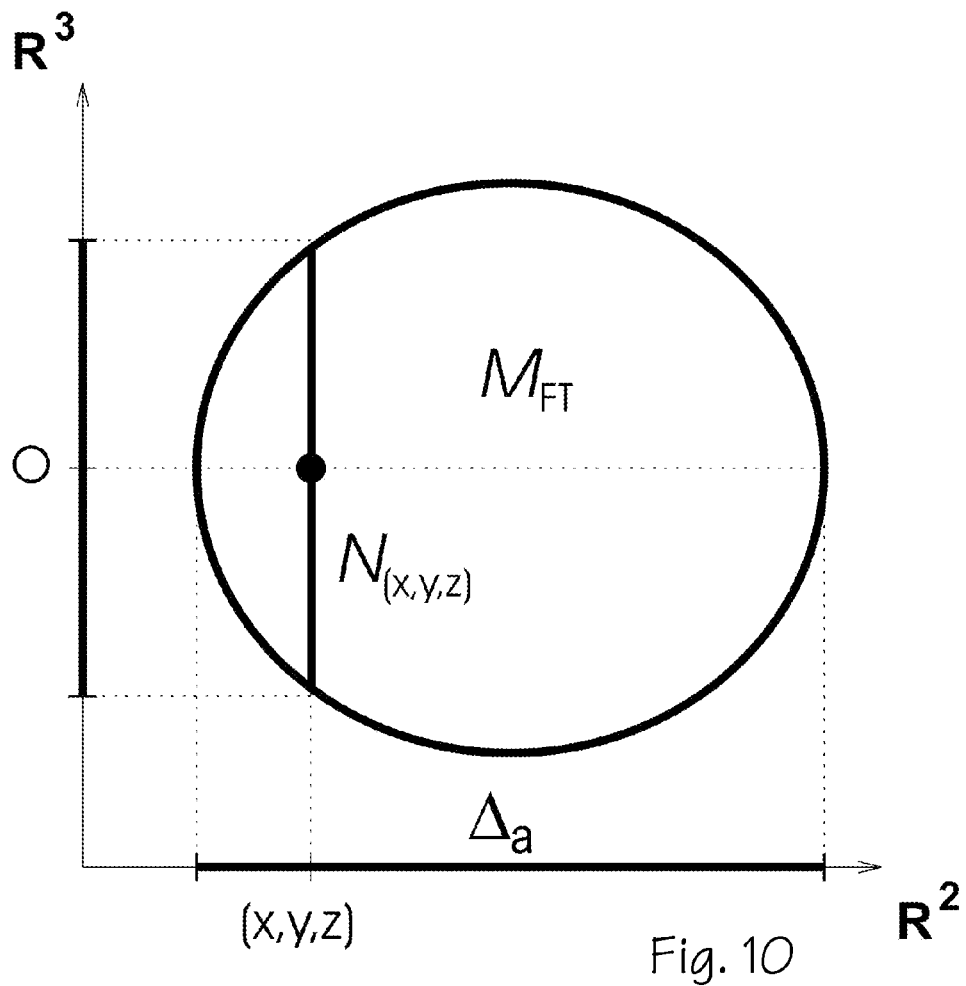
FIG. 10 shows a picture of the overall structure of the phase space set $M_{FT}$ of FO matrices (i.e. $2^{nd}$ order FO tensors) according to an embodiment of the invention.

The (formal) fibration $M_{FT} = \bigcup_{(x,y,z) \in \Delta_a} (x,y,z) \times N_{(x,y,z)}$ obtained by introducing the sets $\Delta_a$ and $N_{(x,y,z)}$ helps to get a picture of the overall structure of $M_{FT}$ (see FIG. 10): The individual "fibres" may be visualized by a procedure that locally attaches the set $N_{(x,y,z)}$ of admissible off-diagonal triples to its "base point" $(x,y,z) \in \Delta_a$, and the subsequent variation of this base point throughout the whole triangle set $\Delta_a$ covers the whole phase space.

The results summarized in this section clearly show that the phase space $M_{FT}$ is a complex mathematical object. According to the rigorous mathematical result stated in Theorem 2, the confinement of any solution trajectory $t \mapsto \hat{a}^{(2)}(t)$ of the FTE, which is naturally defined as an evolution equation in the real vector space of symmetric 3×3 matrices, to the phase space domain necessarily implies the fulfillment of the invariant inequalities (9) and (10) combined with the unit trace condition. This fact inevitably turns the FTE into a DAS. Unlike the unit trace condition, whose fulfillment is "built into" the exact FTE in the absence of any closure approximations for the $4^{th}$ order FO tensor and which is still valid under rather general prerequisites for a large class of closure approximations (see section 4.), the validity of the invariant inequalities (9) and (10) is generally not preserved in the presence of any of the presently known closure approximations. (Also, the validity of (9) and (10) in the case of the "exact" FTE may be rather deduced by indirect reasoning as given in section 2.6 than by means of the algebraic structure of the FTE itself.) These mathematical facts are commonly overlooked in the simple examples usually shown in academic work.

However, a closure approximation is necessarily contained as an essential element of any procedure that solves the FTE numerically. Therefore any simulation procedure suitable for handling more complex situations like the ones typically occurring in industrial applications must account for this by means of suitable control procedures that confine the solution trajectory to its theoretically admissible domain. Hence a proper treatment of the FTE as a differential algebraic system is mandatory for serious industrial applications.

In section 7.7 a procedure is presented that provides a suitable kind of invariant control. This procedure has been implemented in a preferred embodiment.

4. The Problem of Trace Conservation and Stability

Applying a closure approximation to the FTE means replacing the exact (but unknown) 4th order FO tensor $\hat{a}^{(4)}$ on the r.h.s. of (5) by some (in general nonlinear) tensor function $\hat{A}^{(4)}[\hat{a}^{(2)}]$ of the FO matrix (i.e.: $\hat{a}^{(4)} \leftarrow \hat{A}^{(4)}[\hat{a}^{(2)}]$ in mathematical notation, see the above section on the closure problem for further details). Depending on the choice of the closure, the 4th order tensor $\hat{A}^{(4)}$ possesses a smaller or larger amount of the properties of the exact tensor $\hat{a}^{(4)}$.

One special requirement concerning the symmetry properties of $\hat{A}^{(4)}$ which is fulfilled by all reasonable closure approximations is the so called orthotropic symmetry as given by the set of identities $$A_{ij\,kl}^{(4)} = A_{j\,ikl}^{(4)}, A_{ij\,kl}^{(4)} = A_{ij\,lk}^{(4)}, A_{ij\,kl}^{(4)} = A^{(4)}_{klij} \quad (11)$$

i.e. the 4th order tensor $\hat{A}^{(4)}$ is required to be symmetric w.r.t. the first and second index pairs (ij) and (kl) as well as the interchange (ij) ↔ (kl) of both pairs. If it is assumed that $\hat{a}^{(2)}$ is a solution of (5) augmented by a closure approximation $\hat{a}^{(4)} \leftarrow \hat{A}^{(4)}[\hat{a}^{(2)}]$ with orthotropic symmetry properties (11), we may formally derive the following differential equation (abbrev.: DE) for its trace (see [17]):

$$\frac{D}{Dt} Tr(\hat{a}^{(2)}) = \sum_{i,j} M_{ij} \left( a_{ij}^{(2)} - \sum_k A_{ij\,kk}^{(4)} \right) + 6 D_r [1 - Tr(\hat{a}^{(2)})] \quad (12)$$

The trace condition $Tr(\hat{a}^{(2)}) = 1$ was not yet used in the derivation of (12), as the stability and conservation of the trace for solutions of the FTE shall be investigated by an analysis of this equation. If the closure approximation is applied to the FTE, the latter additionally satisfies the normalization conditions $$a_{ij}^{(2)} = \sum_k A_{ij\,kk}^{(4)}, \quad (13)$$

and the DE (12) for the trace simplifies to $$\frac{D}{Dt} Tr(\hat{a}^{(2)}) = 6 D_r \cdot [1 - Tr(\hat{a}^{(2)})]. \quad (14)$$

As the diffusion parameter $D_r$ is by definition nonnegative, it may be concluded either that (in the case $D_r > 0$) the hyperplane defined by the trace condition is a stable integral manifold or that (in the case $D_r = 0$) the trace is a first integral of the FTE, provided the closure approximation $\hat{a}^{(4)} \leftarrow \hat{A}^{(4)}[\hat{a}^{(2)}]$ satisfies both conditions (11) and (13). (It should be noted that the exact 4th order FO tensor $\hat{a}^{(4)}$ is by definition totally symmetric and satisfies $\Sigma_k a_{ij\,kk}^{(4)} = a_{ij}^{(2)}$, and the exact FO matrix $\hat{a}^{(2)}$ is by definition symmetric and satisfies the trace condition.)

The above considerations show how the application of a closure approximation to the FTE may influence the validity of the trace condition, which is the simplest of the conditions imposed on the invariants of a FO matrix, depending on the amount of properties that the approximating tensor function $\hat{A}^{(4)}[\hat{a}^{(2)}]$ and the exact tensor $\hat{a}^{(4)}$ have in common.

The trace stability has to be carefully considered in the special case of the hybrid closure (6), which possesses only the symmetry properties (11) but fails to satisfy the normalization conditions (13). In the case of this closure approximation, the DE for the trace assumes the form (see also [17])

$$\frac{D}{Dt} Tr(\hat{a}^{(2)}) = \varphi_a \cdot [1 - Tr(\hat{a}^{(2)})] \qquad (15a)$$

with a prefactor $$\varphi_a = 6D_r + 2\lambda f_s(\hat{G}:\hat{a}^{(2)}) + 2\lambda/7(1-f_s)Tr(\hat{G}). \qquad (15b)$$

This prefactor deviates from the simpler expression $6D_r$ valid for all closures that satisfy (13), which reflects the fact that the hybrid closure fails to do so.

Hereinbelow it is shown that under certain conditions the additional terms appearing in the prefactor $\varphi_a$, may cause this term to become negative. This means that although the hyperplane $Tr(\hat{a}^{(2)})=1$ is still an integral manifold of the FTE with hybrid closure, it may become locally unstable.

The possibility of the prefactor $\varphi_a$ to become negative can be deduced by the following four stage procedure of arguments:

(i) In the special case of an incompressible flow field (i.e. $Tr(\hat{G})=\text{div } U=0$) the prefactor assumes the simplified form $\varphi_a = 6D_r + f_s 2\lambda(\hat{G}:\hat{a}^{(2)})$.

(ii) In the case of slender fibres it may always be assumed $\lambda=1$, and if the local orientation state described by $\hat{a}^{(2)}$ is approximately uniaxial (i.e. one of its eigenvalues $\mu_k$ is close to 1), the value of the scalar orientation factor $f_s = 1 - 27 \det(\hat{a}^{(2)})$ also is approximately 1 as the determinant of $\hat{a}^{(2)}$ is close to zero. In this way the simplified expression $\varphi_a \approx 6D_r + 2(\hat{G}:\hat{a}^{(2)})$ is obtained, which approximates the exact value of $\varphi_a$ under the specified assumptions.

(iii) By substitution of $D_r = C_I \dot{\gamma}_{eff}$ and insertion of the spectral representation $\hat{a}^{(2)} = \Sigma_k \mu_k E_k \otimes E_k$ into the contraction $\hat{G}:\hat{a}^{(2)} = \Sigma_{ij} G_{ij} a_{ij}^{(2)}$ a modified form of the approximate expression for the prefactor is obtained:

$$\varphi_a \approx 6C_I \dot{\gamma}_{eff} + 2\sum_k \mu_k (E_k^T \cdot \hat{G} \cdot E_k).$$

(iv) In the last step the components of shear rate tensor $\hat{G}$ to the effective shear rate $\dot{\gamma}_{eff} := \sqrt{2G_{ij}G_{ij}}$ are normalized. The normalized shear rate tensor $\hat{G}' := \dot{\gamma}_{eff}^{-1} \hat{G}$ has the same eigenvectors as $\hat{G}$, zero trace and therefore—just the same as $\hat{G}$—negative eigenvalues. As the components of $\hat{G}'$ are of order 1 by construction, the tensor $\hat{G}'$ necessarily has at least one negative eigenvalue with an absolute value of order 1.

This fact is the key to the desired estimate of $\varphi_a$ under the various circumstances assumed so far in the derivation of the approximate expression for the prefactor $\varphi_a$. Using the normalized shear rate tensor $\hat{G}'$ this approximate expression may be written in the form $$\varphi_a \approx 6\gamma_{eff}\left[C_I + 2\sum_k \mu_k(E_k^T \cdot \hat{G}' \cdot E_k)\right].$$

Taking into account that in practical simulations the interaction coefficient $C_I$ is a small positive number (typically $0 < C_I < 10^{-2}$, see also sec. 1.2), it can be seen that $\varphi_a$ will become negative if evaluated with an FO matrix which has a dominant eigenvalue $\mu_j \approx 1$ with corresponding eigenvector $E_k$ pointing along the eigendirection of the largest negative eigenvalue of the shear rate tensor, as in this case it may be estimated $$\sum_k \mu_k (E_k^T \cdot \hat{G}' \cdot E_k) \approx -\mu_j \approx -1$$

and therefore get $\varphi_a \approx 6\gamma_{eff}[C_I \pm 2] < 0$.

The above arguments, can be formulated in a rigorous manner. In this way it is possible to give a mathematical proof that for any incompressible flow and values $0 \leq C_I < \lambda$ of the interaction coefficient, the trace of a solution of the FTE with hybrid closure becomes locally unstable in certain regions of the phase space $M_{FT}$, as the expression (15b) for the prefactor $\varphi_a$ inevitably becomes negative in these regions. Thus, it is clearly necessary to take care of the trace stability problem during the numerical integration of the FTE.

5. Numerical Integration of the FTE: General Aspects

The choice of a suitable method for the numerical integration of the FTE (including any kind of closure approximation) depends on the mathematical classification of the equation type as well as aspects related to the specific algebraic form of the FTE. The general structure of the closed FTE shows that it constitutes a coupled system of hyperbolic partial differential equations (PDEs) of convection-reaction type for the elements $a_{ij}^{(2)}$ of the FO matrix as dependent variables, as explained in detail in the following paragraph.

Starting from the form of the FTE given in eq. (5), this equation can be rewritten by explicitly substituting the material derivative $$\frac{D}{Dt} \ldots = \left\{\frac{\partial}{\partial t} + U \cdot \nabla\right\} \ldots$$

on the l.h.s. and the mathematical notation $\hat{a}^{(4)} \leftarrow \hat{A}^{(4)}[\hat{a}^{(2)}]$ symbolizing a closure approximation on the r.h.s. of (5), which yields an equivalent formulation of the closed FTE:

$$\left\{\frac{\partial}{\partial t} + U \cdot \nabla\right\}\hat{a}^{(2)} = \qquad (16)$$
$$\hat{a}^{(2)} \cdot \hat{M} + \hat{M}^T \cdot \hat{a}^{(2)} - (\hat{M} + \hat{M}^T):\hat{A}^{(4)}[\hat{a}^{(2)}] + 2D_r[\hat{1} - 3\hat{a}^{(2)}]$$

This form of the FTE already reveals most of its mathematical structure: the l.h.s. consists of a simple first order partial differential operator of transport or convection type with the local flow velocity $U(r,t)$ governing the decoupled, purely convective transport of the elements $a_{ij}^{(2)}$ of the FO matrix that are the dependent variables of the eqn. (16). Moreover the algebraic structure of the various terms on the r.h.s. of (16) shows that the r.h.s.—just like the FO matrix itself, and as required by mathematical consistency—constitutes a symmetric tensor function of $2^{nd}$ order, which is denoted as $\hat{F}^{(2)}(\ldots)$ in the following abstract (but equivalent) form of eqn. (16):

$$\left\{\frac{\partial}{\partial t} + U \cdot \nabla\right\}\hat{a}^{(2)} = \hat{F}^{(2)}(\hat{a}^{(2)}, \hat{A}^{(4)}[\hat{a}^{(2)}], \hat{M}, D_r) \quad (17a)$$

Although the explicit dependence of the r.h.s. on the FO matrix $\hat{a}^{(2)}$ is linear, the nature of its implicit dependence, which is determined by the functional form $\hat{a}^{(4)} \leftarrow \hat{A}^{(4)}[\hat{a}^{(2)}]$ of the closure approximation, in general is a nonlinear one. Therefore the function $\hat{F}^{(2)}(\ldots)$ has to be considered as a nonlinear function of the dependent variable $\hat{a}^{(2)}$ unless a linear closure approximation is chosen. Furthermore it can be recognized that the r.h.s. function $\hat{F}^{(2)}(\ldots)$ inevitably leads to a mutual coupling of the individual equations for the FO elements $a_{ij}^{(2)}$ unless the effective velocity gradient $\hat{M}$ is a diagonal matrix and the closure function $\hat{A}^{(4)}[\hat{a}^{(2)}]$ has a very special algebraic structure.

After resolving the dependence of $\hat{M}$ on the actual velocity gradient tensor $\nabla \otimes U$ and the fibre geometry parameter $\lambda$ by eqn. (1a) and resubstituting the defining expression $D_r = C_I \gamma_{eff}$ for the rotational diffusion parameter in terms of the effective shear rate, eqn. (17a) can be rewritten in the form $$\left\{\frac{\partial}{\partial t} + U \cdot \nabla\right\}\hat{a}^{(2)} = \hat{F}^{(2)}(\hat{a}^{(2)}, \hat{A}^{(4)}[\hat{a}^{(2)}], \nabla \otimes U, \gamma_{eff}, C_I, \lambda). \quad (17b)$$

This form of the closed FTE explicitly reveals the dependence of the r.h.s. on the constant model parameters $\lambda$ and $C_I$, but still differentiates between the explicit and implicit dependence on the FO matrix as well as between the explicit dependence on the velocity gradient tensor $\nabla \otimes U$ and the implicit dependence on $\nabla \otimes U$ induced by the effective shear rate formula $\gamma_{eff} = \sqrt{2 G_{ij} G_{ij}}$ (see the section on the Fokker-Planck equation for details). In the literature eqn. (17b) is sometimes written in component form using index notation, i.e.

$$\left\{\frac{\partial}{\partial t} + U \cdot \nabla\right\}a_{ij}^{(2)} = F_{ij}^{(2)}(a_{ij}^{(2)}, A_{ijkl}^{(4)}[a_{ij}^{(2)}], (\nabla \otimes U)_{ij}, \gamma_{eff}, C_I, \lambda).$$

Frequently one finds a much simplified version $$\frac{D}{Dt}a_{ij}^{(2)} = F_{ij}^{(2)}(a_{ij}^{(2)}, (\nabla \otimes U)_{ij})$$

of this equation, using a condensed notation that hides all parameter dependencies and does not discriminate between explicit and implicit dependencies of the component functions $F_{ij}^{(2)}(\ldots)$ on the FO matrix or the velocity gradient. Reverting from index notation to the full tensor notation used in eqns. (17a/b), the simplified version $$\left\{\frac{\partial}{\partial t} + U \cdot \nabla\right\}\hat{a}^{(2)} = \hat{F}^{(2)}(\hat{a}^{(2)}, \nabla \otimes U) \quad (17c)$$

of these equations is obtained.

6. Numerical Integration of the FTE: "Operator Splitting"

There is a variety of approaches for the numerical integration of a coupled PDE system $$\left\{\frac{\partial}{\partial t} + U \cdot \nabla\right\}y = F(y)$$

of convection-reaction type. One approach that has proven to be robust and flexible especially in the case of nonlinear r.h.s. functions $F(\ldots)$ starts from an equivalent reformulation of the PDE as $$\frac{\partial}{\partial t}y = -U \cdot \nabla y + F(y)$$

and proceeds by a separate treatment of the two terms on the r.h.s. given by the linear differential operator $-U \cdot \nabla \ldots$ and the "operator" determined by the function $F(\ldots)$. In the mathematical literature this approach is known as [23-37] "method of fractional steps", "splitting method" or simply "operator splitting" (see [28-31] for alternative approaches). The numerical integration of an equation having the form $$\frac{\partial}{\partial t}y = -U \cdot \nabla y + F(y)$$

by "operator splitting" makes use of the numerical (or in some cases even analytical) solutions of the two separate equations $$\frac{\partial}{\partial t}y = -U \cdot \nabla y$$

and $$\frac{\partial}{\partial t}y = F(y)$$

obtained from the full equation by setting either of the two operators on the r.h.s. to zero. The first equation is equivalent to the homogeneous convection eqn.

$$\left\{\frac{\partial}{\partial t} + U \cdot \nabla\right\}y = 0,$$

the second one constitutes a system of ordinary differential equations (ODEs) which is in general coupled and nonlinear. This type of approach is used in the preferred embodiment. Using the notation of the eqns. (17a/b), the application of the splitting approach to the closed FTE leads to the partial equations $$\left\{\frac{\partial}{\partial t} + U \cdot \nabla\right\} \hat{a}^{(2)} = \hat{0} \; (\rightarrow \text{``convection step'' with a zero matrix } \hat{0} \text{ on the } r.h.s.) \quad (18a)$$

and $$\frac{\partial}{\partial t}\hat{a}^{(2)} = \hat{F}^{(2)}(\hat{a}^{(2)}, \hat{A}^{(4)}[\hat{a}^{(2)}], \nabla \otimes U, \gamma_{e\!f\!f}, C_I, \lambda) \; (\rightarrow \text{``rotation step''}) \quad (18b)$$

which are treated as separate subproblems within the framework of the "operator splitting" method. The physical effect modelled by eqn. (18a) is the spatial redistribution of the FO statistics (as encoded by the elements of the FO matrix) within the filled domain of the mould cavity due to a purely convective transport of the fluid mass according to the flow velocity, while eqn. (18b) completely neglects the effects of convective transport and solely accounts for the local rate of change of the FO distribution due to the rotational kinematics of the fibres driven by the local velocity gradient as well as the mutual interaction among the fibres. Hereinbelow several variants are described that show how the (numerical) solutions of both subproblems may be combined to yield an approximate solution of the full equation (16) (or its equivalent (17a/b) in abstract notation).

6.1 "Simple Operator Splitting"

Using the simplest way (usually denoted as "simple operator splitting") to obtain an approximate solution of the equation to be actually solved from the two partial equations, the latter is solved in consecutive order, taking the intermediate solution resulting from the first as input (i.e. initial value) for the second one. To explain this in detail, we simplify the notation by using the model equation $$\frac{D}{Dt} y = F(y)$$

with the identifications $y \leftrightarrow \hat{a}^{(2)}$ and $F(y) \leftrightarrow \hat{F}^{(2)}(\hat{a}^{(2)}, \ldots)$.

The flow solver, i.e. the software that models the flow of the suspension, yields the state variables of the fluid, among them the flow velocity $U(r,t)$ and its gradient tensor $\nabla \otimes U(r,t)$, by a solution of the discretized transport equations for mass, momentum and energy, at discrete instants of time $t_n$ in all computational cells located around discrete points $r_m$ in space which are contained in the filled part $\Omega^{(n)}$ of the overall computational domain covering the mould cavity, the gating system and the inlet. The flow solver starts at time $t_0=0$ and proceeds from time $t_n$ to $t_{n+1}$, using a step size $\Delta t_{n+1} := t_{n+1} - t_n$. The flow computations imply a computation of the domain $\Omega^{(n+1)}$ at time $t_{n+1}$ depending on its previous state $\Omega^{(n)}$ and the new velocity field $U^{(n+1)}$ This can be done by using a volume of fluid (VOF) method. Calculating the new flow front and the new domain $\Omega^{(n+1)}$ yields new values of all state variables in the cells of $\Omega^{(n+1)}$ at time $t_{n+1}$. In a corresponding step, the new values $y_m^{(n+1)} = y(r_m, t_{n+1})$ at time $t_{n+1}$ in all computational cells located around the points $r_m$ of the newly filled domain $\Omega^{(n+1)}$ shall be computed by a numerical solution of the PDE $$\left\{\frac{\partial}{\partial t} + U \cdot \nabla\right\} y = F(y),$$

starting from the values $y_m^{(n)} = y(r_m, t_n)$ defined in the "old" domain $\Omega^{(n)}$ which are already known from the previous computation step.

This is accomplished by the following three-step procedure, which constitutes one possible variant of "simple operator splitting":

1. Extension step: Starting from $y_m^{(n)} = y(r_m, t_n)$ in the cells of the domain $\Omega^{(n)}$, compute an initialization $\bar{y}_m^{(n)}$ in all cells of the new domain $\Omega^{(n+1)}$.

2. Convection step: Starting from the initial values $\bar{y}_m^{(n)}$ provided by the extension step, compute intermediate values $\tilde{y}_m^{(n+1)}$ by a numerical solution of the convection equation $$\left\{\frac{\partial}{\partial t} + U \cdot \nabla\right\} y = 0$$

with step size $\Delta t_{n+1}$, using the flow velocity $U(r_m, t_{n+1})$ computed by the flow solver in the domain $\Omega^{(n+1)}$.

3. Rotation step: Starting from the initial values $\tilde{y}_m^{(n+1)}$ provided by the preceding convection step, compute the final values $y_m^{(n+1)} = y(r_m, t_{n+1})$ by a numerical solution the ODE system $$\frac{\partial}{\partial t} y = F(y)$$

with step size $\Delta t_{n+1}$, using the velocity gradient $\nabla \otimes U$ $(r_m, t_{n+1})$ provided by the flow solver in the domain $\Omega^{(n+1)}$.

Figure 11:
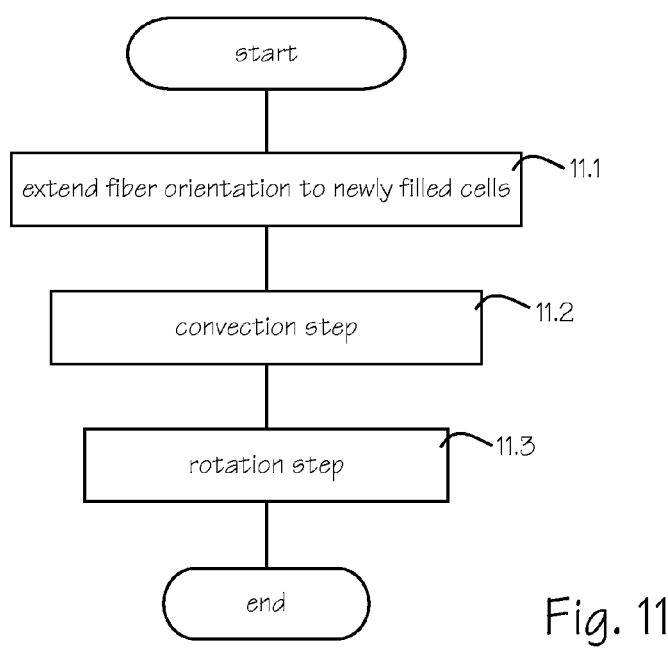
FIG. 11 is a flowchart illustrating the operator splitting process is in a simplified form according to an embodiment of the invention.

FIG. 11 illustrates this operator splitting variant.

The "simple splitting" variant as described above yields an approximate solution of the full equation $$\left\{\frac{\partial}{\partial t} + U \cdot \nabla\right\} y = F(y)$$

with a time discretization error of $1^{st}$ order—i.e. $O(\Delta t_{n+1})$—in the step size and is used in the method according to the preferred embodiment. Details on the three steps of this procedure will be explained in subsequent sections.

An alternative variant of "simple operator splitting"

(i) starts by a rotation step on $\Omega^{(n)}$ using the "old" velocity gradient $\nabla \otimes U$ at time $t_n$, then (ii) proceeds with an "intermediate" step to extend the results of (i) from $\Omega^{(n)}$ to $\Omega^{(n+1)}$ and (iii) finishes with a convection step using the flow velocity U at time $t_{n+1}$.

In this variant, the convection and rotation steps are executed in reversed order. Although the theoretical time discretization error is of the same order as in the case of the first variant described above, this alternative variant tends to be less consistent, as the flow velocity and the velocity gradient from different instants of time are used. This can be avoided by another variant (i) starting with an extension step of the known values $y_m^{(n)}$ from $\Omega^{(n)}$ to $\Omega^{(n+1)}$ as described above, then
(ii) performing a rotation step followed by
(iii) a convection step using the "new" values of U and $\nabla \otimes U$ provided by the flow solver at time $t_{n+1}$ in $\Omega^{(n+1)}$ for both steps (ii) and (iii).

6.2 "Symmetric Operator Splitting"

Theoretically a higher order accuracy w.r.t. the time discretization error can be obtained by means of a "symmetric operator splitting" approach. The basic idea of this approach is to bracket one intermediate step of one of the partial equations with the full step size in between to steps of the other equations with half step size. One possible variant of this approach results in the following four-step procedure:

1. Extension step: Starting from $y_m^{(n)}=y(r_m,t_n)$ in the cells of the domain $\Omega^{(n)}$, compute an initialization $\bar{y}_m^{(n)}$ in all cells of the new domain $\Omega^{(n+1)}$.
2. Pre-Rotation step: Starting from the extension $\bar{y}_m^{(n)}$ of the known values to $\Omega^{(n+1)}$ provided by the extension step, compute the pre-rotated values $\bar{y}_m^{(pre)}$ by a numerical solution of the ODE system $$\frac{\partial}{\partial t} y = F(y)$$

with half step size $\Delta t_{n+1}/2$, using the velocity gradient $\nabla \otimes U(r_m, t_{n+1})$ provided by the flow solver in the domain $\Omega^{(n+1)}$.

3. Convection step: Starting from $\bar{y}_m^{(pre)}$ as initial values provided by the pre-rotation step, compute intermediate values $\tilde{y}_m^{(n+1)}$ by a numerical solution of the convection equation $$\left\{\frac{\partial}{\partial t} + U \cdot \nabla\right\} y = 0$$

with full step size $\Delta t_{n+1}$, using the flow velocity $U(r_m, t_{n+1})$ computed by the flow solver in the domain $\Omega^{(n+1)}$.

4. Post-Rotation step: Starting from the initial values $\tilde{y}_m^{(n+1)}$ provided by the preceeding convection step, compute the final values $y_m^{(n+1)}=y(r_m, t_{n+1})$ by a numerical solution of the ODE system $$\frac{\partial}{\partial t} y = F(y)$$

with half step size $\Delta t_{n+1}/2$, using the velocity gradient $\nabla \otimes U(r_m, t_{n+1})$ provided by the flow solver in the domain $\Omega^{(n+1)}$.

The "symmetric splitting" variant as described above yields an approximate solution of the full equation $$\left\{\frac{\partial}{\partial t} + U \cdot \nabla\right\} y = F(y)$$

which has a time discretization error of $2^{nd}$ order—i.e. $O(\Delta t_{n+1}^2)$—in the step size.

Another "symmetric splitting" variant that is theoretically possible brackets a rotation step between two convection steps with half step size. It starts (i) with an extension of the known values $y_m^{(n)}$ to the new domain $\Omega^{(n+1)}$,
(ii) proceeds with a "pre-convection" step of half step size in the new domain using the flow velocity $U(r_m, t_{n+1})$, then
(iii) performs a full rotation step on $\Omega^{(n+1)}$ using the velocity gradient $\nabla \otimes U(r_m, t_{n+1})$ and
(iv) finishes with another half step size "post-convection" step using the flow velocity $U(r_m, t_{n+1})$, which finally results in an approximation of $y_m^{(n+1)}=y(r_m,t_{n+1})$ that is also of $2^{nd}$ order accuracy. As in the case of "simple splitting" there is yet a third variant that interchanges the initial extension step and the pre-rotation step, starting with the latter and thereby using the "old" values of the velocity gradient $\nabla \otimes U(r_m,t_n)$ on $\Omega^{(n)}$.

As the typical flow situations encountered in the mould filling frequently involve shear flow which leads to a significant rotation of the fibres, the "rotation operator" part always plays a significant—and in most situations dominant—role as compared to the effects of a purely convective transport. Therefore symmetric bracketing of the convection step by pre- and post-rotation steps as described in detail for the first of the symmetric splitting variants constitutes the preferred variant of the "symmetric splitting" approach [19]. However, in most practical cases the size of the time step provided by the fluid flow computation is sufficiently small, and the "simple splitting" variant as presented in section 6.1 works with sufficient accuracy in these cases.

6.3 Alternative Splitting Variants

Depending on the algebraic structure of r.h.s. function F (...), a variety of alternative splitting approaches is possible. If the function consists of a sum $F(\ldots)=\Sigma_k F_k(\ldots)$ of terms, it is possible to split the r.h.s. into a further set of subequations $$\frac{\partial}{\partial t} y = F_k(y)$$

determined by the partial functions $F_k(\ldots)$. Possibly some of the partial functions involve linear operators, i.e. $F_k(y)=\hat{L}_k \cdot y$. In this case one might consider some (or all) of these linear terms on the r.h.s. of the partial convection equation, i.e.

$$\left\{\frac{\partial}{\partial t} + U \cdot \nabla\right\} y = \sum_k \hat{L}_k \cdot y,$$

which thereby remains linear, and leave some (or all) of the genuinely nonlinear functions $F_j(\ldots)$ for treatment within a single ODE $$\frac{\partial}{\partial t} y = \sum_j F_j(y)$$

or a list $$\frac{\partial}{\partial t} y = F_j(y)$$

of separate ODEs as explained above.

Looking at the r.h.s. of eqn. (16) one recognizes a sum of three terms, the first and third one being linear, and the middle one involving the closure approximation possibly having a nonlinear dependence on the FO matrix. (Depending on the choice of the closure this middle term might be split into another sum of subterms.) According to the remarks above, the term structure of the r.h.s. function of (16) opens the possibility to construct a variety of additional splitting schemes. In contrast to the variants based on the splitting into eqns. (18a/b), these additional alternatives do not correspond to a clear distinction of mutually separable physical effects (as in the case of "convective transport" vs. local "rotation dynamics"). Therefore they may be regarded merely as "artificial mathematical splittings" which are hardly useful for a proper simulation of the physical FO phenomenom. The possibility of these "artificial" splitting variants is mentioned here for completeness only and will not be discussed here further.

6.4 Numerical Approach to the "Convection Step"

This section explains the numerical method used to integrate the convection equation (18a), which has to be solved as a subproblem within the "operator splitting" approach to the closed FTE. Based on the velocity $U^{(n+1)}$ calculated for the new time step the transport equation system matrix is assembled using a first order upwind scheme [32], and the resulting system of equations is solved for each component of the FO matrix on the domain $\Omega^{(n+1)}$.

6.5 Numerical Approach to the "Extension Step"

A numerical method is used to extend the known values of the FO matrix within the computational cells of the "old" domain $\Omega^{(n)}$ into the cells of the new domain $\Omega^{(n+1)}$. The computation of the "new" domain $\Omega^{(n+1)}$ is performed by a modified VOF method as one part of the algorithm applied in the method according to the preferred embodiment for the numerical solution of the flow equations (i.e. the conservation equations for mass, momentum and energy). The values of the FO matrix are left unchanged during the extension step in those cells that are common to both domains.

In general the domain $\Omega^{(n+1)}$ contains a number of "newly filled cells" where an initial assignment of reasonable values for the elements of the FO matrix is needed. In accordance with the preferred embodiment this is achieved by means of a weighted average corresponding to the mass transport within a computational cell from/into its neighbouring cells according to the previously computed mass flow.

As the particle concentration is assumed to be homogeneous and the FO matrix results from a volume averaging procedure on a macroscopic level, it is assumed that a cell will get a FO contribution from its neighbouring cells proportional to the net amount of fluid mass transported into it. According to the previously summarized mathematical characterization of the phase space—i.e. the set of all possible FO matrices—of the FTE, the latter is a bounded and convex subset of the six-dimensional vector space of real, symmetric 3×3 matrices confined to the (five-dimensional) $\text{Tr}[a_{ij}^{(2)}]=1$ hyperplane. As an average weighted according to mass transport constitutes in a convex combination of FO matrices and therefore always results in a valid FO matrix, the initialization procedure is compatible with the (theoretically required) topological structure of the phase space of the FT model, which is an important property of this procedure.

6.6 Treatment of the "Fountain Flow" effect

The term "fountain flow" characterizes the overall macroscopic flow pattern near the free surface at the front in the case of a large class of viscous, Non-Newtonian fluids. In a "fountain flow" particles upstream near the flow front are transferred from the core region to the wall boundaries. This effect actually happens "automatically" because of the material properties of the fluid and does not require any additional modelling, i.e.: "fountain flow" is an emergent phenomenon, at least in 3D flow computations based on the Navier-Stokes equations with appropriate Non-Newtonian constitutive laws. However, this is not the case if the flow calculations are based upon simplified models (e.g. of Hele-Shaw type as discussed in section 11.3 of Crochet's article in [1]). In simulations of channel flow with the method according to the preferred embodiment a "fountain flow" pattern can be clearly recognised in the particle traces, which shows that this phenomenon is accounted for by the flow solver.

Some special action needs to be taken in order to assure that the FO component normal to the free surface is zero (as required for consistency with the observed effects of "fountain flow" on fibre orientation) for the initialization procedure of the fibre orientation for the newly filled cells. The "required" vanishing of the normal FO component is (intentionally) not enforced by the "extension step" procedure described above for the following reasons: from the mathematical viewpoint, the FTE model is a system of hyperbolic transport equations coupled by their r.h.s. (i.e. a system of convection-reaction type with nonlinear reaction term, see above). Therefore it is not appropriate—i.e. mathematically speaking: impossible—to prescribe the vanishing of the component of the FO matrix in the direction of the free surface normal as a boundary condition for the FO matrix at the free surface cells. The vanishing of this FO component should in fact automatically emerge from the computed "fountain flow" behaviour of the flow.

However, due to numerical inaccuracies introduced by temporal and/or spatial discretization errors as well as the procedure used to calculate the motion of the free surface during mould filling, one possibly has to add some "corrections" to assure that the initialization procedure for the newly filled cells is consistent with the FO behaviour at the free surface as required by the "fountain flow" phenomenon. On all newly filled cells it is checked that the trace of the fibre orientation tensor differs not more than 1% from the theoretical value of 1. If the difference is too large the fibre orientation tensore is corrected by an orthogonal projection to the admissible triangle of the eigenvectors in its eigenspace.

6.7 Initialization of the FO Matrix at the Start of the Simulation

The hyperbolic structure of the (closed) FTE requires the initialization of the FO matrix in the computational cells in (as well as near) the inlet at every time step of the mould filling simulation as a boundary condition. Therefore an appropriate choice of this initial FO state has to be made. In the method according to the preferred embodiment an isotropic FO state $\hat{a}^{(2)}=\frac{1}{3}\hat{1}$ (corresponding to a random FO distribution) is chosen for this purpose as explained below.

In highly viscous shear flow, the FO state is strongly influenced by a high shear rate, as it is quickly driven to its "final" state of local quasi-equilibrium. Therefore the FO state observed at the ingates—this is where the melt actually enters the part—is completely determined by its flow history throughout the runner system and largely independent of its initial state assumed at the inlet. On the other hand an analysis of the analytical structure of the FTE as well as its kinematics (i.e. the possible states in the phase space) shows that the assumption of a random orientation at the inlet is the optimal choice in view of a subsequent adaption by the flow field in the runner system near the inlet, because a random orientation state yields full coupling of all components of the velocity gradient.

The above described operator splitting process is in a simplified form described with reference to FIG. 11:

Step 1: set initial conditions and boundary conditions on the newly filled cells, Step 2: move fibre orientation according to flow field, and Step 3: calculate fibre rotation according to velocity gradient.

7. Numerical Approach to the "Rotation Step" ODE System

A numerical method is used to integrate the coupled system (18b) of ODEs, which has to be solved as a part of the "operator splitting" approach to the closed FTE. This method has been specifically developed for the implementation of the FO module of the method according to the preferred embodiment. It encompasses various aspects that are relevant within the context of typical industrial applications of a 3D injection moulding simulation for short-fibre reinforced thermoplast materials, such as:

The formulation the FTE using the complete set of 6 independent elements of the FO matrix (opposed to the "standard procedure" of using the trace condition to eliminate one of the diagonal elements and reduce the number of dependent variables of the FTE by one);

The addition of a "penalty" control term to the r.h.s. of the FTE that transforms the hyperplane defined by the trace condition into a stable integral manifold of the FTE;

The exploitation of the specific scaling behaviour of the r.h.s. function of the FTE w.r.t. the components of the velocity gradient to construct an integration method which selects the time integration scheme according to the size of the local shear rate (max. component of the velocity gradient).

The implementation of a "stabilized hybrid closure" that contains a scalar orientation factor that is confined to the interval [0,1].

The implementation of an efficient procedure for the evaluation of the special r.h.s. function of the FTE with hybrid closure with a minimum number of operations.

These aspects are discussed in detail below.

7.1 Stabilization of the Hybrid Closure

Hybrid closure approximations as defined by eqns. (6) and (6a/b) experience stability problems especially in cases where the velocity gradient had a complicated structure—i.e. is not of simple shearing/stretching type but reflects a complex 3D flow pattern—and the size of the time step (as determined by the flow solver) becomes rather large. The deviation of the scalar orientation factor $f_s(\hat{a}^{(2)})$ to negative values is a primary source of these instabilities: once this factor becomes negative, the numerical solution quickly becomes unstable and diverges exponentially to values far away from the phase space set admissible for FO matrices.

Therefore a control of the values of $f_s(\hat{a}^{(2)})$ improves the numerical stability of the FO computation procedure.

As the determinant of an FO matrix is always confined to the interval [0, 1/27], the theoretically admissible values of the orientation factor as defined by eqn. (6c) are also restricted by $0 \leq f_s(\hat{a}^{(2)}) \leq 1$. Therefore, the standard definition (6) of the hybrid closure is modified in the following way:

$$\hat{A}_{hyb}^{(4)}[\hat{a}^{(2)}] := \tilde{f}_s(\hat{a}^{(2)}) \cdot \hat{A}_{qu}^{(4)}[\hat{a}^{(2)}] + (1 - \tilde{f}_s(\hat{a}^{(2)})) \cdot \hat{A}_{lin}^{(4)}[\hat{a}^{(2)}]$$

$$\tilde{f}_s(\hat{a}^{(2)}) := \min(1, \max(1 - 27 \det(\hat{a}^{(2)}), 0)) \in [0,1]. \quad (19)$$

The definitions of the linear and quadratic closure terms as given by eqns. (6a/b) remain unchanged, and the orientation factor $f_s(\hat{a}^{(2)})$ as defined by eqn. (6c) is replaced by the confined orientation factor $\tilde{f}_s(\hat{a}^{(2)})$ as defined in eqn. (19) above. This definition of $\tilde{f}_s(\hat{a}^{(2)})$ implies that $\tilde{f}_s(\hat{a}^{(2)}) = f_s(\hat{a}^{(2)})$ if the term $1 - 27 \det(\hat{a}^{(2)})$ is evaluated to a value within the interval [0,1] and takes 0 or 1 as minimum or maximum values otherwise.

The definition (19) is denoted as stabilized hybrid closure approximation. Numerical experiments have shown that the confinement of the values of $\tilde{f}_s(\hat{a}^{(2)})$ to the interval [0,1] prevents the development of severe instabilities in the considered test examples. The stabilized hybrid closure has been successfully tested in a variety of 3D injection moulding simulation.

7.2 Reduction of the Number of Variables Via the Trace Condition

The $2^{nd}$ order FO tensor $\hat{a}^{(2)}$, which is the dependent variable of the closed FTE as presented in eqn. (16), is a symmetric 3×3 matrix. As its elements $a_{ij}^{(2)} = a_{ji}^{(2)}$ a priori constitute a set of six mutually independent variables, the FTE is a coupled system of six PDEs. Although the algebraic structure of the FTE formally admits arbitrary symmetric 3×3 matrices, the matrices have to fulfil a number of additional conditions formulated as restrictions on their invariants that qualifies them as FO matrices.

The trace condition $\text{Tr}(\hat{a}) = \Sigma_{k=1}^{3} a_{kk}^{(2)} = 1$, which is the simplest of these invariant conditions, opens an obvious possibility to eliminate one of the diagonal elements $a_{kk}^{(2)}$ of the FO matrix and thereby reduce the number of variables by one. Most (if not all) published research articles that investigate fibre suspension flow under rather academic flow situations (like e.g. simple shearing or stretching flows) use this approach by making a fixed choice for the specific diagonal element to be eliminated. This elimination is then achieved by substituting e.g. $a_{33}^{(2)} = 1 - a_{11}^{(2)} - a_{22}^{(2)}$ into the r.h.s. of eqn. (16), which in this way becomes independent of $a_{33}^{(2)}$. As the FTE is formally compatible with the trace condition for all reasonable closure approximations by means of the eqns. (14) or (15a), both the trace condition and the PDE for the diagonal element $a_{33}^{(2)}$ are fulfilled identically (i.e. as formal algebraic identities), and it suffices to consider only the remaining set of five components of the FO matrix and the coupled system of their PDEs further on.

This procedure is purely formal. Whether the choice of the diagonal element to be eliminated in this way is a good one depends on the spatial properties of the local velocity field U of the flow and its gradient $\nabla \otimes U$. For simple types of flows that merely display plane variations of the flow velocity (e.g. in the $x_1$-$x_2$ plane) the elimination of $a_{33}^{(2)}$ as explained above is a reasonable choice, as in this case the dominant rotation dynamics of the fibres is restricted to the flow plane, as the special form of the velocity gradient induces only a "weak coupling" to the orthogonal $x_3$ direction in this case. By this argument it is also plausible that choosing either $a_{11}^{(2)}$ or $a_{22}^{(2)}$ for elimination would most probably lead to numerical problems (e.g. concerning the stability of the solution) and thus to less satisfactory results. However, the situation is very different in 3D injection moulding simulations within complex mould geometries, as both the flow velocity U and its gradient $\nabla \otimes U$ may vary in a complex manner in space as well as in time and therefore cannot be assumed to have any specifically simple form, so a fixed choice (like the one above) is very likely to be not an optimal one. Therefore the elimination of one of the diagonal elements of the FO matrix by means of the trace condition is considered to be inappropriate for the simulation of industrial suspension flows.

Another argument—related to numerical stability—against eliminating one of the diagonal elements by the unit trace condition is put forward in a series [34-36] of articles by Shampine, where ODE systems with special algebraic constraints ("conservation laws") are investigated. In [34-36] a coupled system of ODEs $\partial/\partial t \, c = F(c)$ is considered, where the n-dimensional vector $c = (c_1, \ldots, c_n)^T$ of "species concentrations" is restricted to a hyperplane of dimension n−1 by means of the condition $\Sigma_{k=1}^{n} c_k = 1$ of mass conservation. While this condition formally yields the possibility to eliminate one of the concentrations, e.g. by substituting the relation $c_n = 1 - \Sigma_{k=1}^{n-1} c_k$ into the r.h.s. function F( . . . ), and thereby fulfil the conservation law exactly at the same time, Shampine argues that using this "trick" within a numerical integration procedure merely leads to an accumulation of the numerical error of the concentrations $c_1, \ldots, c_{n-1}$ which are computed by numerical integration of the (reduced) ODE system within the remaining concentration $c_n$ obtained algebraically via the conservation law. Although the conservation law by construction is always exactly satisfied, the numerical solution computed in this way is by no means guaranteed to be accurate. In fact it is known that especially for stiff ODE systems the numerical solution may depart arbitrarily far from the true solution if this "straightforward elimination approach" is used carelessly. According to [34-36] these arguments remain valid also in the case of general linear conservation laws $w \cdot c = \Sigma_{k=1}^{n} w_k c_k = 1$ involving a vector $w = (w_1, \ldots, w_n)^T$ of weight factors and lead to the same conclusions even if more general nonlinear constraints of the form $g(c) = \text{const.}$ are considered.

As the Folgar-Tucker equation augmented by the "unit trace" constraint, which is a linear "conservation law", is a specific example of the mathematical equations presented in [34-36], Shampine's mathematical analysis shows that eliminating one of the diagonal elements by the unit trace condition very likely will lead to numerical instabilities while introducing uncontrollable inaccuracies in the diagonal elements of the FO matrix.

Because of the arguments given above, the method according to the preferred embodiment deviating from the "standard approach" of eliminating one of the diagonal elements via the unit trace condition—uses all six elements of the FO matrix and equations of the FTE system for FO computation.

7.3 Dynamical Trace Stabilization by a Penalty Term

If the closed FTE system and its "rotation step" part are considered as given by the eqns. (16) and (18b) and the trace condition is not used to eliminate one of the diagonal elements of the FO matrix from the set of dependent variables, some additional method is required in order to keep the trace of the numerically computed FO matrix as close as possible to its desired value 1.

In the articles [34-36] it is recommended to avoid any kind of elimination approach (as discussed in the preceding section 7.2) and treat the full system by a combination of usual ODE integration methods and some projection procedure that accounts for an (either exact or approximate) fulfillment of the required conservation laws or algebraic constraints. For each time step the numerical solution is first computed without consideration of the algebraic constraints and subsequently corrected by a projection mapping onto the nearest point of the algebraic manifold defined by the constraint equation (e.g. a hyperplane in the case of a linear constraint).

The principle alternative to this approach tries to account for the constraints by adding appropriate control terms to the r.h.s. of the model equations the trace of the numerically computed FO matrix can be kept as close as possible to its desired value 1. The presence of the control terms yield an approximate fulfillment of the constraints or conservation laws without any additional measures. In many cases it can be shown that a "hard" control effectively results in a kind of projection, while a "soft" control allows for small deviations from the required constraints.

In the method according to the preferred embodiment the control approach is used especially to keep the trace of the numerically computed FO matrix approximately at its required unit value. The stabilization is based on the concept of the transformation of the 5D hyperplane defined by the trace condition $\text{Tr}(\hat{a}) = 1$ into a stable integral manifold of the closed FTE system by addition of an appropriate control term to the r.h.s. function of eqn. (16) or (18b), respectively. From a different viewpoint this is equivalent to the situation where $\text{Tr}(\hat{a}) = 1$ becomes a stable fixed point of the differential eq. (12) of the trace.

General requirements to be met by any reasonable control term have been determined to be the following:

The control term has to vanish identically if the trace condition is already fulfilled.

If the numerical solution fails to fulfil the trace condition, the control term must drive the numerical solution back to the $\text{Tr}(\hat{a}) = 1$ hyperplane.

Apart from these two main requirements, a reasonable control term should be compatible with the scaling behaviour of the r.h.s. function of the FTE w.r.t. a rescaling of the velocity gradient (see section 7.4 on flow controlled time integration for further details on this point), and it should contain a tuning parameter that allows for an adjustment of a "soft" or "hard" control, the latter effectively resembling to a projection in the limit of "infinitely hard" control.

The special choice of an appropriate control term is to be adapted to the choice of a specific closure approximation, in this case of the hybrid closure approximation (both the standard and stabilized variant). Starting from the FTE $D/Dt\, \hat{a}^{(2)} = \hat{F}^{(2)}(\ldots)$ the DE for the trace is obtained via the identities $$D/Dt\, Tr(\hat{a}^{(2)}) = Tr(D/Dt\, \hat{a}^{(2)}) = Tr(\hat{F}^{(2)}(\ldots)) = \ldots$$

In the special case of the (standard) hybrid closure the trace of the r.h.s. function can be evaluated to $\text{Tr}(\hat{F}_{hyb}^{(2)}(\ldots)) = \phi_a \cdot [1 - \text{Tr}(\hat{a}^{(2)})]$, which yields the simple form (15a) of the DE of the trace with the variable prefactor $\phi_a$ as given by (15b). In the case of the stabilized hybrid closure the scalar orientation factor $f_s(\hat{a}^{(2)})$ is replaced by its restricted (stabilized) variant defined in eqn. (19), so formally exactly the same DE is obtained for the trace with a prefactor $\tilde{\phi}_a$ containing $\hat{f}_s(\hat{a}^{(2)})$ instead of $f_{as}(\hat{a}^{(2)})$).

The specific choice of the penalty term to be added to the r.h.s. function $\hat{F}_{hyb}^{(2)}(\ldots)$ in the special case of the (stabilized) hybrid closure is:

$$\hat{C}_{hyb}(\alpha, \hat{a}^{(2)}, \nabla \otimes U) = (\alpha - \tilde{\phi}_a) \cdot [1 - Tr(\hat{a}^{(2)})] \cdot \hat{b}, \alpha > 0, Tr(\hat{b}) = 1.$$

The parameter a is required to be positive, but not necessarily constant in time. The 3×3 matrix $\hat{b}$ is required to be symmetric with unit trace, but otherwise arbitrary. The matrix $\hat{b}$ defines the "direction" of the control term (20). It may be either a constant or variable in time. The latter includes the possibility to define $\hat{b}$ as a function of $\hat{a}^{(2)}$. Different choices of the matrix $\hat{b}$ correspond to different variants of the control term. The variant used in the method according to the preferred embodiment uses $\hat{b} = 1/3\, \hat{1}$ (i.e. $b_{ij} = 1/3\, \delta_{ij}$), which corresponds to a control term in the direction orthogonal to the $\text{Tr}(\hat{a}) = 1$ hyperplane. An alternative variant is given by the choice $\hat{b} = \hat{a}^{(2)}/\text{Tr}(\hat{a}^{(2)})$ (see [18]). After the addition of the control term (20) the generalized variant $$\frac{D}{Dt} \hat{a}^{(2)} = \hat{F}_{hyp}^{(2)}(\ldots) + \hat{C}_{hyb}(\alpha, \hat{a}^{(2)}, \nabla \otimes U) \qquad (21)$$

of the closed FTE with stabilized hybrid closure must also be considered. Likewise the control term enters on the r.h.s. of the ODE (18b), which thereby assumes the form of eqn. (21) with the material derivative D/Dt replaced by the partial derivative ∂/∂t. As the trace of the control term (20) evaluates to $Tr(\hat{C}_{hyb}(\ldots))=(\alpha-\hat{\phi}_a)\cdot[1-Tr(\hat{a}^{(2)})]$, the specific form of the control term is tailored to modify (15a/b) according to $$\frac{D}{Dt}Tr(\hat{a}^{(2)}) = Tr(\hat{F}^{(2)}_{hyb}(\ldots)) + Tr(\hat{C}_{hyb}(\ldots)) = \alpha \cdot [1 - Tr(\hat{a}^{(2)})]. \quad (22)$$

As $\alpha>0$, the value $Tr(\hat{a}^{(2)})=1$ corresponds to a stable fixed point of the DE (22), and the corresponding hyperplane therefore becomes a stable integral manifold of the modified ("controlled") form (21) of the FTE with hybrid closure. As a consequence, the trace of any numerical solution of (21) is kept close to the required value 1 by the control term (20), as this term forces all solutions having $Tr(\hat{a}^{(2)})>1$ in the direction of $\hat{b}$ towards lower trace values, and those solutions having $Tr(\hat{a}^{(2)})<1$ are correspondingly forced towards larger trace values (also in the direction of $\hat{b}$).

The "strength" of the control term (20) is adjustable by tuning the parameter $\alpha$ appropriately: while small values of the parameter $\alpha$ lead to relatively "soft" corrections of the trace values towards 1, large values of $\alpha$ result in a strong push (close to the effect of an instant projection) towards the Tr $(\hat{a}^{(2)})=1$ hyperplane. In practice large values of $\alpha$ may cause problems when used with explicit ODE integration methods, as in this case the large trace corrections push the numerical solution to either side of the hyperplane in an alternating way and thereby induce spurious oscillations. It has been shown [18] that a choice of $\alpha$ within a relatively wide range of intermediate values leads to proper numerical results without undesired artefacts induced by the control term.

For any specific choice of a closure approximation resulting in a corresponding r.h.s. function $\hat{F}_{cl}^{(2)}(\ldots)$ of the closed FTE, the generic definition $$\hat{C}_{cl}(\alpha, \hat{a}^{(2)}, \nabla \otimes U) = \left(\alpha - \frac{Tr(\hat{F}_{cl}^{(2)}(\ldots))}{1 - Tr(\hat{a}^{(2)})}\right) \cdot [1 - Tr(\hat{a}^{(2)})] \cdot \hat{b}, \quad (20a)$$

$$\alpha > 0, Tr(\hat{b}) = 1$$

of the control term identically leads to the trace DE (22) and thus to a stabilization of the $Tr(\hat{a}^{(2)})=1$ hyperplane as described above for the special case of the (stabilized) hybrid closure. If we allow the symmetric, unit trace 3×3 matrix $\hat{b}$ to be an arbitrary function of $\hat{a}^{(2)}$, eqn. (20a) constitutes the most general form of the control term.

7.4 Flow Controlled Time Integration

Using the "operator splitting" approach a numerical solution of the "Rotation Step" ODE system (18b) has to be computed in the time interval $[t_n,t_{n+1}]$ with the global step size $\Delta t_{n+1}=t_{n+1}-t_n$ provided by the flow solver within all computational cells (labelled by the space vector $r_m$) of the filled domain $\Omega^{(n+1)}$. In each cell the components of the local velocity gradient $\nabla \otimes U(r_m,t_{n+1})$ enter as a set of external coefficients into the r.h.s. of (18b). If these are large, it can be expected that the values of the FO matrix elements change significantly during the time interval, while a very small velocity gradient may results in a negligible change of the FO matrix elements from their initial values as provided by the preceding computational step.

In all practical cases of an injection moulding simulation the velocity gradient varies significantly over the filled domain within the mould cavity during the filling phase. While the values of the shear rate are typically high near the cavity walls, considerably lower values at the center region of the gap in between the walls have been observed. This results in a rather quick orientation of the fibres subject to the strong shear flow near the walls in the direction of the flow velocity, whereas fibres in the center region take a noticeably longer time for a change in their orientation state, which leads to the well known "sandwich structure" (consisting of a "core" center region with a relatively low degree of fibre orientation in between the highly oriented regions near the walls) which is typically observed in injection moulded parts made of short-fibre reinforced thermoplasts.

Numerical schemes for the integration of ODE systems account for the "strength" of the r.h.s. function by a proper (preferably adaptive) choice of the step size. In this way it is attempted to avoid inaccuracies occurring due to a coarse stepping across intervals of large values or a strong change of the r.h.s. function, as well as taking too small steps across the regions where the (absolute) values of the r.h.s. function are rather small. By a proper choice of the step size as well as the integration scheme one is able to control the numerical error of ODE integration up to a desired limit.

In the special case of the "Rotation Step" ODE system a numerical integration over the time interval $[t_n,t_{n+1}]$ with global step size $\Delta t_{n+1}$ as well as a global numerical error $\in_{FO}$ must be provided that must be uniform over all cells of the computational domain, despite of the variation of the r.h.s. function due to the variation of the velocity gradient. For this purpose a special numerical scheme has been devised that achieves this goal with a minimum number of evaluations of the r.h.s. function by choosing the "integration rule" (Euler, midpoint or $4^{th}$ order Runge Kutta) and the (dimensionless) local step size as well as the local number of steps of this size with the chosen rule adapted to the "strength" of the local r.h.s. function as determined by the values of the local velocity gradient. The scheme is different from known approaches of "adaptive step size control" for numerical ODE integration, as it exploits the scaling behaviour of the r.h.s. function of eqns. (16) or (18b) w.r.t. the components of the velocity gradient and is specifically adapted to the FTE system. The procedure of choice for the integration rule and the number and size of the local time steps inherent to the scheme is a heuristic approach that is based on the theoretical discretization error of the used integration rules. Both aspects of the scheme are explained in detail below.

The specific form of the r.h.s. function $\hat{F}^{(2)}(\ldots)$ of eqns. (17b) or (18b) may be obtained from eqn. (16) as $$\hat{F}^{(2)}(\ldots)=\hat{a}^{(2)}\cdot\hat{M}+\hat{M}^T\cdot\hat{a}^{(2)}-(\hat{M}+\hat{M}^T):\hat{A}^{(4)}[\hat{a}^{(2)}]+2D_r[\hat{1}-3\hat{a}^{(2)}].$$

In order to resolve all dependencies on the velocity gradient $\nabla \otimes U$ explicitly one has to substitute the definitions (1a/b) of the effective velocity gradient and the shear rate tensor, i.e.

$$\hat{M} = \frac{\lambda+1}{2}(\nabla\otimes U) + \frac{\lambda-1}{2}(\nabla\otimes U)^T,$$

$$\hat{G} = \frac{1}{2}[(\nabla\otimes U) + (\nabla\otimes U)^T]$$

as well as the identity $\hat{M}+\hat{M}^T=2\lambda\hat{G}$ and the formulas $D_r=C_{i\!\vec{N}\!eff}\gamma_{eff}=\sqrt{2\hat{G}:\hat{G}}$ defining the rotational diffusion parameter and the effective shear rate. For the following considerations it will be helpful to suppress the indirect dependencies of the function $\hat{F}^{(2)}(\ldots)$ on the FO matrix via the closure function $\hat{A}^{(4)}[\hat{a}^{(2)}]$ and on the velocity gradient via the effective shear rate as well as the dependence on the constant model parameters $C_I$ and $\lambda$ and thus to rewrite the algebraic expression of the r.h.s. function (as already done for the r.h.s. of eqn. (17c)) in a simplified form as $$\hat{F}^{(2)}(\hat{a}^{(2)}, \nabla \otimes U) = \hat{a}^{(2)} \cdot \hat{M} + \hat{M}^T \cdot \hat{a}^{(2)} - 2\lambda \hat{G} : \hat{A}^{(4)}[\hat{a}^{(2)}]$$
$$2C_I \hat{\gamma}_{\mathit{eff}}[\hat{1} - 3\hat{a}^{(2)}], \tag{23}$$

leaving only the dependence on the FO matrix $\hat{a}^{(2)}$ and the velocity gradient $\nabla \otimes U$ in the argument list of $\hat{F}^{(2)}(\ldots)$. An equivalent reformulation of the ODE system (18b) (corresponding to (17c)) using the r.h.s. function (23) can be written in the form $$\frac{\partial}{\partial t}\hat{a}^{(2)} = \hat{F}^{(2)}(\hat{a}^{(2)}, \nabla \otimes U) \tag{18c}$$

A multiplication $(\nabla \otimes U)_{ij} \mapsto \sigma(\nabla \otimes U)_{ij}$ of the components of $\nabla \otimes U$ by some factor $\sigma > 0$ induces corresponding multiplications $\hat{M} \mapsto \sigma\hat{M}$, $\hat{G} \mapsto \sigma\hat{G}$, $\gamma_{\mathit{eff}} \mapsto \sigma\gamma_{\mathit{eff}}$ that, due to the special algebraic structure of the r.h.s. of (23), lead to the algebraic identity $$\hat{F}^{(2)}(\hat{a}^{(2)}, \sigma \nabla \otimes U) = \sigma \hat{F}^{(2)}(\hat{a}^{(2)}, \nabla \otimes U), \tag{24}$$

expressing the scaling behaviour of the function $\hat{F}^{(2)}(\ldots)$ w.r.t. its $2^{nd}$ argument.

As mentioned before, the general task is a numerical integration of the coupled system (18c) of ODEs in the time interval $[t_n, t_{n+1}]$ with a global numerical error $\in_{FO}$ that is uniform over all cells of the domain of filled cells. This can be achieved by exploiting the special property (24) of the r.h.s. function $\hat{F}^{(2)}(\ldots)$ for a scaling of the velocity gradient, the r.h.s. function and the ODE system (18c) in the following way:

Determine the value of the component of the velocity gradient with the largest absolute value, i.e.:

$$\gamma_{max} := \|\nabla \otimes U\|_\infty = \max_{i,j=1,2,3} |(\nabla \otimes U)_{ij}|.$$

(Note that with $\nabla \otimes U$ also the parameter $\gamma_{max}$ depends on the spatial vector $r_m$ that labels the local computational cell as well as on the time coordinate $t_n$ or $t_{n+1}$ at which the velocity gradient enters the r.h.s. function.)

Introduce the scaled velocity gradient $\overline{\nabla \otimes U} := \gamma_{max}^{-1} \nabla \otimes U$ and the scaled time coordinate $\tau := \gamma_{max} t$—note that both are dimensionless quantities, and this scaling is applied only locally in the cell $r_m$, and in the time interval $[t_n, t_{n+1}]$—and transform the ODE (18c) to the scaled form:

$$\frac{\partial}{\partial \tau}\hat{a}^{(2)} = \gamma_{max}^{-1}\frac{\partial}{\partial t}\hat{a}^{(2)} \tag{25}$$
$$= \hat{F}^{(2)}(\hat{a}^{(2)}, \gamma_{max}^{-1}\nabla \otimes U)$$
$$= \hat{F}^{(2)}(\hat{a}^{(2)}, \overline{\nabla \otimes U})$$

using the scaled quantities and eqn. (24).

The original ODE (18c) has to be integrated over the "global" time interval $[t_n, t_{n+1}]$ with "physical" step size $\Delta t_{n+1} = t_{n+1} - t_n$ (measured e.g. in [s]), which are the same for all computational cells of the domain $\Omega^{(n+1)}$, and r.h.s. functions whose "strength" varies according to the variation of the velocity gradient $\nabla \otimes U$, as indicated by the different values of the parameter $\gamma_{max}$ for different cells in the domain. Different from that, the transformed ODE (25) has to be integrated over a "locally" scaled time interval $[\tau_n, \tau_{n+1}]$ of dimensionless size $$\Delta\tau_{n+1}^{(m)} := \gamma_{max}(r_m, t_{n+1}) \cdot \Delta t_{n+1}, \tag{26}$$

but with r.h.s. functions that, as the scaled velocity gradient $\overline{\nabla \otimes U}$ enters on the r.h.s. of (25), have an approximately uniform "unit strength" due to the following facts:

i. The scaled velocity $\overline{\nabla \otimes U}$ gradient is by construction a dimensionless quantity, with the absolute values of its components equal or smaller than 1.
ii. The values of the FO matrix elements as well as those of the $4^{th}$ order tensor elements supplied by the closure function $\hat{A}^{(4)}[\hat{a}^{(2)}]$ are also limited by 1.
iii. Therefore all components of the r.h.s. function $\hat{F}^{(2)}(\ldots)$ are of order $O(1)$ when evaluated with $\overline{\nabla \otimes U}$, while the largest components of $\hat{F}^{(2)}(\ldots)$ have absolute values comparable with $\gamma_{max}$ when evaluated with $\nabla \otimes U$ instead.

Using an arbitrary matrix norm $\|\ldots\|$ to measure the "strength" of $\hat{F}^{(2)}(\ldots)$, these statements may be put in a precise mathematical form:

$$\|\hat{F}^{(2)}(\hat{a}^{(2)}, \nabla \otimes U)\| = O(\gamma_{max}), \|\hat{F}^{(2)}(\hat{a}^{(2)}, \overline{\nabla \otimes U})\| = O(1) \tag{27}$$

As the scaled r.h.s. functions $\hat{F}^{(2)}(\hat{a}^{(2)}, \overline{\nabla \otimes U})$ of the transformed ODE (25) according to (27) have uniform "unit strength" for all cells in the domain $\Omega^{(n+1)}$, the numerical integration with uniform global error $\in_{FO}$ can be achieved over intervals of locally varying sizes $\Delta\tau_{n+1}^{(m)}$ by choice of i. an "integration rule" with sufficiently small discretization error as well as
ii. a suitable number of substeps to cover the scaled time interval.

The integration scheme used in the method according to the preferred embodiment uses a set of simple integration rules belonging to class of one step methods (see sections 16.1 of [38] and 7.2.1-7.2.3 of [39]) included herein by reference. The specific integration rules used within the FO module of the method according to the preferred embodiment are:

the simple forward Euler rule, which is a method of $1^{st}$ order accuracy and requires 1 evaluation of the r.h.s. function per step,
the "midpoint" or $2^{nd}$ order Runge-Kutta (RK2) rule, which is a method of $2^{nd}$ order accuracy and requires 2 evaluations of the r.h.s. function per step, and
the $4^{th}$ order Runge-Kutta (RK4) rule, which is a method of $4^{th}$ order accuracy and requires 4 evaluations of the r.h.s. function per step.

The following properties of these integration rules depending on their order p are used in the construction of the special scheme used in an embodiment of the present invention:

a) A method of order p requires p evaluations of the r.h.s. function per substep.
b) If an ODE (system) is integrated numerically over an interval of total size $\Delta\tau$ with N equidistant substeps of size $h = \Delta\tau/N$, the total error $\in_{tot}$ accumulated at the final substep of the interval may be estimated as: $\in_{tot} \sim \Delta\tau \cdot h^p$.
c) If this total error is required to be smaller than a preselected threshold value $\in_{max}$, the size of the substeps is bounded by $h < (\in_{max}/\Delta\tau)^{1/p}$. Likewise the number of substeps has to be larger than $N > \Delta\tau \cdot (\Delta\tau/\in_{max})^{1/p}$.
d) The integration over the total interval with a total error smaller than $\in_{max}$ may be performed taking N substeps with an order p method provided the interval size is bounded by $\Delta\tau < (\in_{max} \cdot N^p)^{1/(p+1)}$. This implies that a single substep (i.e. N=1) of size $h = \Delta\tau$ is sufficient if $\Delta\tau < \in_{max}^{1/(p+1)}$ holds.

Taking this into account, one may construct a "hybrid" integration scheme that yields a numerical integration of eqn. (25) over the scaled time interval of size $\Delta\tau_{n+1}^{(m)}$ defined in (26) with a global error smaller than $\epsilon_{max} = \epsilon_{FO}$ by choosing (i) either a single step with one of the three integration rules or (ii) multiple substeps of appropriate size using the RK4 rule, where the choice depends on the relative size of $\Delta\tau_{n+1}^{(m)}$ compared to the required error threshold $\epsilon_{FO}$ (see below). As this error bound is the same for all computational cells of the domain $\Omega^{(n+1)}$, the integration is performed with a uniform error $\epsilon_{FO}$ independent of the local values of $\Delta\tau_{n+1}^{(m)}$ (or likewise $\gamma_{max}(r_m, t_{n+1}) = \Delta\tau_{n+1}^{(m)}/\Delta t_{n+1}$).

The proposed method chooses specifically the integration rule which achieves the required error bound with the minimum number of r.h.s. function evaluations as estimated according to the relations presented in the points a) to d) above. Although the size of the time step $\Delta t_{n+1}$ as determined by the flow is typically rather small ($\Delta t_{n+1} \approx 10^{-2} \ldots 10^{-4}$ s) compared to the total mould filling time (which is of the order of seconds), the dimensionless quantity $\Delta\tau_{n+}^{(m)}$ can be of order O(1), as the values of $\gamma_{max}$ may become rather larger (of order $10 \ldots 100$ s$^{-1}$) because of the small gap size and the large viscosity of the polymer melt. As the updated values of the FO matrix are also of order O(1), a reasonable choice of the required error bound varies in the range $\epsilon_{FO} \approx 10^{-2} \ldots 10^{-4}$, so that one can assume a substep size of $h \leq 0.1$ in typical applications. It can be shown that for step sizes $h < \frac{1}{2}$ a single step of size h with the RK4 rule is more accurate than two steps of half size h/2 using the "midpoint" (RK2) rule or four Euler steps of quarter size h/4, although the numerical effort (4 evaluations of the r.h.s. function) is the same for all variants.

The choice of the integration rule as well as the number of (sub)steps is based on the size of $\Delta\tau_{n+}^{(m)}$ relative to the sequence of error bounds $\epsilon_p = {}^{p+1}\sqrt{\epsilon_{FO}}$ computed for the values $p \in \{1,2,4\}$ defining the order of accuracy of the various integration rules. As $0 < \epsilon_{FO} < 1$ (in fact typically $\epsilon_{FO} \ll 1$ holds), the size of the error bounds grows monotonically with increasing value of the order parameter p (we always have $0 < \epsilon_p < \epsilon_{p+1} < 1$), so the error bounds relevant to the formulation of the algorithm given below are always ordered according to $0 < \epsilon_{FO} < \epsilon_1 < \epsilon_2 < \epsilon_4 < 1$. (For a typical choice of e.g. $\epsilon_{FO} = 0.001$ the numerical values $\epsilon_1 \approx 0.032$, $\epsilon_2 = 0.1$ and $\epsilon_4 \approx 0.25$ are obtained.) Likewise there is a minimum threshold value $\epsilon_{min}$ for the size of the dimensionless scaled time span $\Delta\tau_{n+1}^{(m)}$ below which even a single Euler step of size $h = \Delta\tau_{n+1}^{(m)}$ merely yields an update of the FO matrix elements to the previous value that is negligibly small. This typically happens in all cells of the domain where the velocity gradient is very small, e.g. in the centre core region in the case of a relatively large gap size between two adjacent walls. A minimum threshold of e.g. $\epsilon_{min} = 10^{-6}$ is a reasonable choice for typical mould filling applications.

Figure 12:
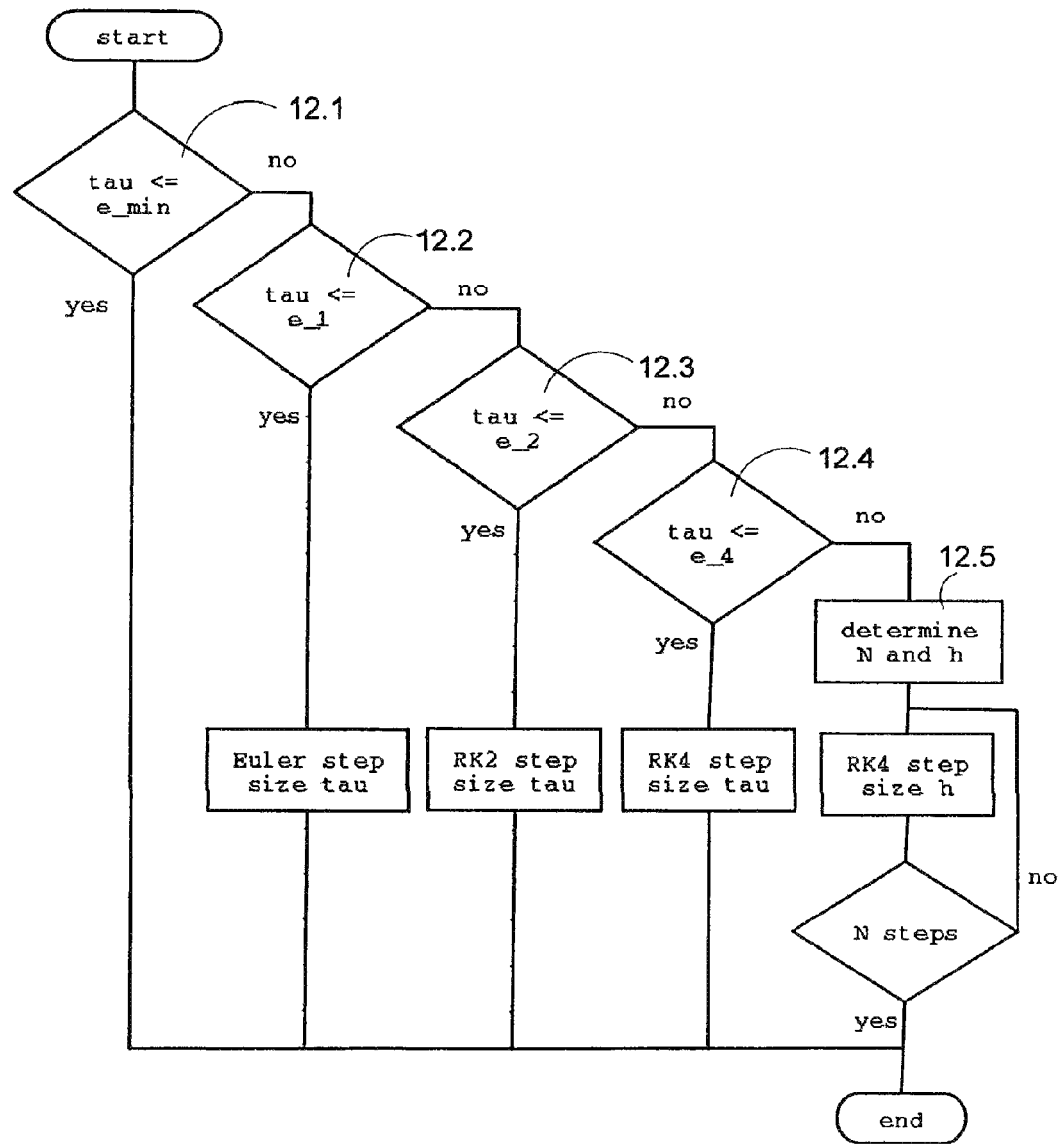
FIG. 12 is a flowchart illustrating the details of the time stepping method.

Taking all aspects as discussed above into account, the algorithm to perform within each cell of the domain and illustrated in the flowchart of FIG. 12. may be formulated in the following way:

1. First evaluate $\gamma_{max} := \|\nabla \otimes U\|_\infty$ and compute the scaled velocity gradient $\nabla \otimes \overline{U} := \gamma_{max}^{-1} \nabla \otimes U$ and the scaled interval size $\Delta\tau_{n+1}^{(m)} := \gamma_{max}(r_m, t_{n+1}) \cdot \Delta t_{n+1}$.
2. Check if $\Delta\tau_{n+1}^{(m)} \leq \epsilon_{min}$ step 12.1.
   a. If yes, then skip the ODE integration (i.e. do nothing), keep the previous value of the FO matrix in the cell as the new (updated) value and exit the procedure.
   b. If not, then go to step 12.2.
3. Check if $\epsilon_{min} < \Delta\tau_{n+1}^{(m)} \leq \epsilon_1$.
   a. If yes, then update the previous value of the FO matrix in the cell by a single Euler step of size $h = \Delta\tau_{n+1}^{(m)}$ using $\nabla \otimes \overline{U}$ for the evaluation of the r.h.s. function and exit the procedure.
   b. If not, then go to step 12.3.
4. Check if $\epsilon_1 < \Delta\tau_{n+1}^{(m)} \leq \epsilon_2$.
   a. If yes, then update the previous value of the FO matrix in the cell by a single "midpoint" (RK2) step of size $h = \Delta\tau_{n+1}^{(m)}$ using $\nabla \otimes \overline{U}$ and exit the procedure.
   b. If not, then go to step 12.4.
5. Check if $\epsilon_2 < \Delta\tau_{n+1}^{(m)} \leq \epsilon_4$.
   a. If yes, then update the previous value of the FO matrix in the cell by a single "$4^{th}$ order Runge-Kutta" (RK4) step of size $h = \Delta\tau_{n+1}^{(m)}$ using $\nabla \otimes \overline{U}$ and exit the procedure.
   b. If not, then go to step 12.5.
6. In the general case $\epsilon_4 < \Delta\tau_{n+1}^{(m)}$ the update of the FO matrix is computed by performing several RK4 steps with an appropriate step size.
   a. The minimum number of steps to achieve the required $\epsilon_{FO}$ accuracy is the smallest integer N that satisfies the inequality $N > \Delta\tau \cdot (\Delta\tau/\epsilon_{FO})^{1/p}$. Using the functions int( ... ), returning the integer part of a floating point number, and max( ..., ... ), returning the larger of two numbers, the integer $N \geq 1$ may be computed by the formula:

$$N = \max(\text{int}(\Delta\tau \cdot (\Delta\tau/\epsilon_{FO})^{1/p}) + 1, 1).$$

b. The required step size is then computed by $h = \Delta\tau_{n+1}^{(m)}/N$.
   c. Once N and h are computed, update the previous value of the FO matrix in the cell by N steps of the RK4 rule with step size h (using $\nabla \otimes \overline{U}$ on the r.h.s.) and exit the procedure.

The algorithm described above is used in a preferred embodiment. It defines a "hybrid" integration rule for the "Rotation Step" ODE system (18b) in all cells of the domain $\Omega_{n+1}$ over the time interval $[t_n, t_{n+1}]$ with a uniform global error smaller than $\epsilon_{FO}$ and a minimum number of evaluations of the r.h.s. function of (18b). The application of the integration rules to the scaled version (25) of (18b) is done "in place" by using the scaled velocity gradient in the evaluation of the r.h.s. function and the computation of the step size h based on the size of the scaled interval length $\Delta\tau_{n+1}^{(m)}$.

In typical applications of this algorithm (with error bound parameters $\epsilon_{FO} = 0.001$ and $\epsilon_{min} = 10^{-6}$) one observes that in the majority of the cells (i.e. about 80%) in the domain $\Omega_{n+1}$ the "Rotation Step" update of the FO matrix is performed by a single Euler step, a smaller number of cells is merely "stepped over" because of $\Delta\tau_{n+1}^{(m)} \leq \epsilon_{min}$ (i.e. small values of $\gamma_{max}$), and a reasonable number of cells, which are presumably located near the walls of the mould cavity and therefore have high shear rate value, are updated with one or several (typically not more than 20) "$4^{th}$ order Runge-Kutta" steps.

7.5 "Rotation Step" Ode Integration with Dynamical Trace Stabilization

If the r.h.s. function contains a control term—either of the special type (20) in the case of the hybrid closure or of the general type as given by eqn. (20a)—to achieve dynamical trace stabilization, the scaling behaviour of the r.h.s. function is still compatible to the "hybrid" integration algorithm described in this section provided the control parameter of eqns. (20) or (20a) is defined as $\alpha = \alpha_0 \cdot \gamma_{max}$ with a dimensionless control parameter of typical size $\alpha_0 \sim O(1)$.

We illustrate this by looking at the control term in its general form (20a). Using the scaling property (24) of the r.h.s. function $\hat{F}_{cl}^{(2)}(\ldots)$ containing any closure approximation, we may rewrite its trace according to the sequence of identities $$Tr(\hat{F}_{cl}^{(2)}(\hat{a}^{(2)}, \nabla \otimes U)) = Tr(\gamma_{max}\hat{F}_{cl}^{(2)}(\hat{a}^{(2)}, \gamma_{max}^{-1}\nabla \otimes U)) = \gamma_{max} Tr(\hat{F}_{cl}^{(2)}, \overline{\nabla \otimes U})$$

and, using the control factor $\alpha = \alpha_0 \cdot \gamma_{max}$, obtain the equivalent expression $$\hat{C}_{cl}(\alpha, \hat{a}^{(2)}, \nabla \otimes U) = \gamma_{max} \cdot \left( \alpha_0 - \frac{Tr(\hat{F}_{cl}^{(2)}(\hat{a}^{(2)}, \overline{\nabla \otimes U}))}{1 - Tr(\hat{a}^{(2)})} \right) \cdot [1 - Tr(\hat{a}^{(2)})] \cdot \hat{b}$$

for the control term (20a). The expression on the r.h.s. now contains $\gamma_{max}$ as a separate factor and a term depending on $\hat{F}_{cl}^{(2)}(\ldots)$ that is evaluated with the scaled velocity gradient $\overline{\nabla \otimes U}$ in place of $\nabla \otimes U$, but is otherwise formally identical to (20a). This may be expressed by the identity $$\hat{C}_{cl}(\alpha, \hat{a}^{(2)}, \nabla \otimes U) = \gamma_{max} \cdot \hat{C}_{cl}(\alpha_0, \hat{a}^{(2)}, \overline{\nabla \otimes U}),$$

which also shows that the control term in its general form (20a) has exactly the same scaling behaviour as the "uncontrolled" r.h.s. function $\hat{F}_{cl}^{(2)}(\ldots)$ w.r.t. a scaling of the velocity gradient by $\gamma_{max}$ if the control parameter is chosen as $\alpha = \alpha_0 \cdot \gamma_{max}$.

In the special case of the (stabilized) hybrid closure one can extract $\gamma_{max}$ from the prefactor $\tilde{\phi}_a$ in the same way by rewriting the term (20) as $$\hat{C}_{hyb}(\alpha, \hat{a}^{(2)}, \nabla \otimes U) = \gamma_{max} \cdot (\alpha_0 - \overline{\phi}_a) \cdot [1 - Tr(\hat{a}^{(2)})] \cdot \hat{b} = \gamma_{max} \cdot \hat{C}_{hyb}(\alpha_0, \hat{a}^{(2)}, \overline{\nabla \otimes U}),$$

where the "rescaled" prefactor $\overline{\phi}_a = \tilde{\phi}_a / \gamma_{max}$ is computed by the same formula as $\tilde{\phi}_a$ using $\overline{\nabla \otimes U}$ in place of $\nabla \otimes U$. This explicitly shows that (28) is valid also for the special form of the control term assumed in the hybrid closure case.

The considerations above show that the "hybrid" integration algorithm for the "Rotation Step" ODE system can be applied without change also in the presence of a control term, provided that $\alpha_0$ is used as control parameter and the terms depending on the r.h.s. function are evaluated with the scaled velocity gradient. The scaled version of the ODE corresponding to eqn. (21) is obtained simply by adding the scaled control term to the r.h.s. of eqn. (25), i.e. the ODE $$\frac{\partial}{\partial \tau}\hat{a}^{(2)} = \hat{F}^{(2)}(\hat{a}^{(2)}, \overline{\nabla \otimes U}) + \hat{C}_{hyb}(\alpha_0, \hat{a}^{(2)}, \overline{\nabla \otimes U}) \quad (29)$$

has to be considered in place of (25) as a basis for the discrete time steps of the integration algorithm.

The time integration scheme implemented in the FO module of the method according to the preferred embodiment performs the numerical integration of the "Rotation Step" ODE system by application of the "hybrid" integration algorithm as defined in this section to the ODE system (29) including dynamical trace stabilization by means of the control term (20).

7.6 Efficient Evaluation of the FTE with Stabilized Hybrid Closure

The evaluation of the r.h.s. function is the most costly part within the FO computation procedure, therefore the method evaluates in the most efficient manner.

The efficiency aspect has been addressed in part by the algorithmic approach of "flow controlled time integration" (FCTI) as proposed in section 7.4. Using this approach, uniform accuracy can be achieved with a minimum of evaluations of the r.h.s. function of the FTE (possibly including a control term).

The most important factor which directly affects the computational cost of FO computation is the choice of the closure approximation. The stabilized hybrid closure yields reasonable accuracy at low computational cost and is used by the method.

Algebraic Reformulation of the FTE with Hybrid Closure

The first step in improving the efficiency is the substitution of the algebraic definition (6) of the hybrid closure into the r.h.s. function (23) of the FTE yields (after a couple of algebraic transformations) the r.h.s. function in a specific algebraic form:

$$\hat{F}(\hat{a}^{(2)}, \nabla \otimes U) = \hat{a}^{(2)} \cdot \hat{N} + \hat{N}^T \cdot \hat{a}^{(2)} - \phi_a \hat{a}^{(2)} + \phi_1 \hat{1} + \phi_g \hat{G}_M \quad (30)$$

The sum of the first two terms of the r.h.s. of (30) is formally identical to the expression $\hat{a}^{(2)} \cdot \hat{M} + \hat{M}^T \cdot \hat{a}^{(2)}$, but contains the matrix $$\hat{N} := \hat{M} - 2/7(1-f_s)\hat{G}_M, \quad \hat{G}_M := \hat{M} + \hat{M}^T = 2\lambda \hat{G} \quad (31)$$

in place of the effective velocity gradient matrix $\hat{M}$ given by 1(a). The remaining three terms on the r.h.s. all have the form $\phi_X \hat{X}$ of a product of a scalar prefactor $\phi_X$ that multiplies a matrix quantity $\hat{X}$. The prefactors are given by the set of formulas $$\varphi_a = 6D_r + f_s(\hat{G}_M : \hat{a}^{(2)}) - \frac{1-f_s}{7} Tr(\hat{G}_M) \quad (32)$$

$$\varphi_1 = 2D_r - \frac{1-f_s}{7}(\hat{G}_M : \hat{a}^{(2)}) + \frac{1-f_s}{35} Tr(\hat{G}_M)$$

$$\varphi_g = \frac{2}{35}(1-f_s)$$

The formula given above for the prefactor $\phi_a$ is identical to the one given in (15b), as $\hat{G}_M = 2\lambda \hat{G}$ and $Tr(\hat{G}_M) = 2\lambda Tr(\hat{G})$, where $Tr(\hat{G}) = \text{div } U$.

The formulas (32) are valid in the case of either compressible or incompressible flow velocity fields. Here it is emphasized that although theoretically divU=0 should hold when the flow is assumed to be incompressible, this is not used explicitly, but rather all terms containing $Tr(\hat{G}) = \text{div}U$ are kept in the formulas (32). If $Tr(\hat{G}_M) \neq 0$ due to numerical errors (which inevitably occur during the flow computation), it is found that (32) still leads to a stable behaviour, whereas instabilities occur in the case that the terms proportional to $Tr(\hat{G}_M)$ are a priori assumed to be zero in the prefactor formulas (32).

The use of the r.h.s. function in the form (30) with the quantities (31) and (32) is the basic step towards efficient evaluation, since the algebraic structure of the r.h.s. function (30) is organized in a way such that a variety of computations have to be done only once (when computing the prefactors), which saves many operations.

Several algebraic operations arise within frequently appearing common subexpressions (e.g. the terms $2D_r$ or $(1-f_s)/7$ in (31) and (32)), and computing them only once and storing their values in auxiliary variables for later usage significantly reduces the computational work. A few more operations are saved by the next step of redefining the matrix $\hat{N}$ according to $$\hat{N}_a := \hat{N} - 1/2\phi_a \hat{1} = \hat{M} - 2/7(1-f_s)\hat{G}_M - 1/2\phi_a \hat{1} \quad (31a)$$

and use the matrix $\hat{N}_a$ instead of $\hat{N}$ for the evaluation of the r.h.s. function. Making use of the algebraic identity $$\hat{a}^{(2)} \cdot \hat{N}_a + \hat{N}_a^T \cdot \hat{a}^{(2)} = \hat{a}^{(2)} \cdot \hat{N} + \hat{N}^T \cdot \hat{a}^{(2)} - \phi_a \hat{a}^{(2)}$$

the explicit computation of the term $\phi_a \hat{a}^{(2)}$ is omitted, and the r.h.s. function is redefined according to $$\hat{F}^{(2)}(\hat{a}^{(2)}, \nabla \otimes U) = \hat{a}^{(2)} \cdot \hat{N}_a + \hat{N}_a^T \cdot \hat{a}^{(2)} + \phi_1 \hat{1} + \phi_g \hat{G}_M. \quad (30a)$$

The additional operations to compute $\hat{N}_a$ by eqn. (31a) are (i) 1 multiplication to get $\frac{1}{2}\phi_a$ and (ii) 3 "adds" to subtract $\frac{1}{2}\phi_a$ from the diagonal elements of the matrix $\hat{N}$. The number of operations saved amounts to a multiplication of all components of the FO matrix by the prefactor $\phi_a$ and the subtraction operations for $-\phi_a \hat{a}^{(2)}$. Therefore the total number of operations is smaller if eqns. (30a) & (31a) are used for the evaluation of the r.h.s. function instead of (30) & (31).

In the case of the stabilized hybrid closure the restricted scalar orientation factor $\hat{f}_s$ is computed according to (19). Substituting $\hat{f}_s$ for $f_s$ in (32) then results in "stabilized prefactors" $\tilde{\phi}_a$, $\tilde{\phi}_1$ and $\tilde{\phi}_g$ without affecting the computational costs.

The addition of a control term (see eqn. (20))

$$\hat{C}_{hyb}(\alpha, \hat{a}^{(2)}, \nabla \otimes U) = (\alpha - \tilde{\phi}_a) \cdot [1 - Tr(\hat{a}^{(2)})] \cdot \hat{b}, \alpha >$$
$$0, Tr(\hat{b}) = 1$$

leads to further operations necessary for the evaluation of the r.h.s. The general structure of this control term is given by $\hat{C}_{hyb}(\ldots) = \tilde{\phi}_b \hat{b}$ with a prefactor $\tilde{\phi}_b = (\alpha - \tilde{\phi}_a) \cdot [1 - Tr(\hat{a}^{(2)})]$ and therefore is of the same form $\phi_X \tilde{X}$ as discussed above. The prefactor $\tilde{\phi}_b$ is absorbed into the one of the prefactors $\tilde{\phi}_1$ or $\tilde{\phi}_a$ if either $\hat{b} = \frac{1}{3}\hat{1}$ or $\hat{b} = \hat{a}^{(2)}/Tr(\hat{a}^{(2)})$ are chosen for the projection matrix. In the first case the term $$\phi_1 = \frac{1}{3}(\alpha - \tilde{\phi}_a) \cdot [1 - Tr(\hat{a}^{(2)})] \quad (33)$$

is added to the prefactor $\tilde{\phi}_1$ which leads to a modified r.h.s. function $$\hat{F}^{(2)}(\hat{a}^{(2)}, \nabla \otimes U) = \hat{a}^{(2)} \cdot \hat{N}_a + \hat{N}_a^T \cdot \hat{a}^{(2)} + (\tilde{\phi}_1 + \phi_1)\hat{1} + \tilde{\phi}_g \hat{G}_M. \quad (30b)$$

The second choice leads to an additional term $\phi_a = (\alpha - \tilde{\phi}_a) \cdot [1 - Tr(\hat{a}^{(2)})]/Tr(\hat{a}^{(2)})$ that has to be added to the prefactor $\tilde{\phi}_a$.

Efficient Algorithm for the r.h.s. Evaluation

Making use of the above steps, a scheme is presented that evaluates (30b) with a minimum number of algebraic operations according to the following sequence of computations:

1. Input: $(\hat{a}^{(2)}, \nabla \otimes U)$ & Parameters: $\lambda$, $C_I$, $\alpha$
   Auxiliary variables: $\hat{F}$, $\hat{N}_a$, $\hat{G}_M$, $\lambda_+$, $\lambda_-$, $f_s$, $\hat{f}_s$, $\tilde{\phi}_a$, $\tilde{\phi}_1$, $\tilde{\phi}_g$, $\phi_1$, $\zeta$, $\xi_1$, ..., $\xi_6$
2. Initialize $\hat{N}_a$ with the effective velocity gradient matrix computed by (1a):

$\hat{N}_a \leftarrow \lambda_+ (\nabla \otimes U) + \lambda_- (\nabla \otimes U)^T = \hat{M}$, $\lambda_\pm := \frac{1}{2}(\lambda \pm 1)$ 3. Compute the symmetric matrix $\hat{G}_M \leftarrow \hat{N}_a + \hat{N}_a^T$ and its trace $\xi_1 \leftarrow Tr(\hat{G}_M)$.
4. Compute $\xi_2 = 2D_r$ from the contraction $\zeta \leftarrow \hat{G}_M : \hat{G}_M$ by $\xi_2 \leftarrow (C_I/\lambda)\sqrt{2\zeta}$.
5. Compute the scalar orientation factor $f_s \leftarrow 1 - 27 \det(\hat{a}^{(2)})$, its bracketed version $\hat{f}_s \leftarrow \min(1, \max(f_s, 0)) \in [0, 1]$ and the term $\xi_3 \leftarrow (1 - \hat{f}_s)/7$.
6. Compute the contraction $\xi_4 \leftarrow \hat{G}_M : \hat{a}^{(2)}$.
7. Compute the prefactors according to (32) using the values stored in the auxiliary variables $\xi_k$ by the following formulas:

$\tilde{\phi}_a \leftarrow 3\xi_2 + \hat{f}_s \xi_4 - \xi_3 \xi_1, \tilde{\phi}_1 \leftarrow -\xi_2 + \xi_3(\frac{1}{3}\xi_1 - \xi_4), \tilde{\phi}_g \leftarrow -\frac{2}{3}\xi_3$ 8. Compute the term $\phi_1 \leftarrow \frac{1}{3}(\alpha - \tilde{\phi}_a) \cdot [1 - Tr(\hat{a}^{(2)})]$, then compute $\tilde{\phi}_1 \leftarrow \tilde{\phi}_1 + \phi_1$.
9. Compute the matrix $\hat{N}_a$ using the aux. variables $\xi_5 \leftarrow 2\xi_3$ and $\xi_6 \leftarrow -\frac{1}{2}\tilde{\phi}_a$. The computation is supposed to be done by the following sequence of operations:

$\hat{N}_a \leftarrow \hat{N}_a - \xi_5 \hat{G}_M \Rightarrow \hat{N}_a \leftarrow \hat{N}_a - \xi_6 \hat{1}$.

10. Initialize the r.h.s. result matrix by computing $\hat{F} \leftarrow \hat{a}^{(2)} \cdot \hat{N}_a + \hat{N}_a^T \cdot \hat{a}^{(2)}$. a Then successively complete the evaluation of the r.h.s. function (30b):

$\hat{F} \leftarrow \hat{F} + \tilde{\phi}_1 \hat{1} \Rightarrow \hat{F} \leftarrow \hat{F} + \tilde{\phi}_g \hat{G}_M$ 11. Result: $\hat{F}^{(2)}(\hat{a}^{(2)}, \nabla \otimes U) \leftarrow \hat{F}$ Reformulation of the FTE in Vector Form Using "Contracted Notation" (CN)

Another element in the construction of an efficient evaluation procedure for the r.h.s. function is based on the fact that the FO matrix $\hat{a}^{(2)}$ as well as the r.h.s. function $\hat{F}^{(2)}(\ldots)$ both are symmetric matrices and possess only 6 independent matrix elements. Therefore it is impractical to store them as general 3×3 matrices and inefficient to implement the operations that have to be performed for the evaluation of $\hat{F}^{(2)}(\ldots)$ as operations on matrices. According to the invention symmetric 3×3 matrices are treated as real 6 component vectors using the following identification scheme $\mu \leftrightarrow (ij)$ of vector indices $\mu \in \{1, \ldots, 6\}$ and index pairs $(ij) = (j\,i)$ of symmetric matrices known as "contracted notation" (CN, see e.g. [22])(In structural mechanics, this is known also as "Voigt notation"):

| | | | $\mu$ | | | |
|---|---|---|---|---|---|---|
| | 1 | 2 | 3 | 4 | 5 | 6 |
| (ij) = (ji) | (11) | (22) | (33) | (23) = (32) | (13) = (31) | (12) = (21) |

This special choice of a $\mu \leftrightarrow (ij)$ scheme is of course only one of 6! = 720 equivalent schemes. The table above displays the usual choice that is also adopted in the FO module of the preferred embodiment. (Alternative variants usually choose a different assignment of the off-diagonal matrix elements to the vector indices $\mu \in \{4, 5, 6\}$.)

Using the CN scheme yields a bijective mapping $a_{ij} = a_{ji} \mapsto a_\mu$ of the elements of a symmetric 3×3 matrix onto the components of a corresponding 6-vector (i.e. a vector of $R^6$) as illustrated by $$a = (a_1, a_2, a_3, a_4, a_5, a_6)^T \stackrel{CN}{\longleftrightarrow} \hat{a} = \begin{pmatrix} a_1 & a_6 & a_5 \\ a_6 & a_2 & a_4 \\ a_5 & a_4 & a_3 \end{pmatrix}. \quad (34)$$

In this way the FO-Matrix, the matrix $\hat{G}_M$ and the matrix $\hat{F}$ storing the result of the evaluation of the r.h.s. function $\hat{F}^{(2)}(\hat{a}^{(2)}, \nabla \otimes U)$ are assigned to corresponding vector quantities. In the same way the components of a $4^{th}$ order tensor $\hat{A}^{(4)}$ are assigned to the elements $A_{\mu\nu}$ of a 6×6 matrix if the tensor is symmetric w.r.t. the first and second index pairs (i.e. if $A_{ij\,kl}^{(4)} = A_{j\,ikl}^{(4)}$, $A_{ij\,kl}^{(4)} = A_{ij\,lk}^{(4)}$ holds). If in addition to that the tensor is also symmetric w.r.t. an interchange $(ij) \leftrightarrow (kl)$ of both index pairs and thereby possesses orthotropic symmetry (see eqn. (11)), $A_{\mu\nu} = A_{\nu\mu}$, holds, i.e. the matrix $\hat{A}$ is itself symmetric and possesses $\Sigma_{\mu=1}^6 \mu = 21$ independent elements. The number of independent elements may be reduced by the presence of further symmetries and algebraic relations between the tensor components. In the case of a fully symmetric $4^{th}$ order tensor there exist the 6 additional identities $A_{44} = A_{23}, A_{55} = A_{13}, A_{66} = A_{12}, A_{25} = A_{46}, A_{14} = A_{56},$
$A_{45} = A_{36},$ that reduce the number of independent elements of $\hat{A}$ to 15. The normalization conditions $a_{ij}^{(2)} = \Sigma_{k=1}^3 A_{ij\,kk}^{(4)} = \Sigma_{k=1}^3$ $A_{ikj\ k}^{(4)}$ and the trace condition $\Sigma_{k=1}^{3} a_{kk}^{(2)}=1$ yield a set of algebraic relations that reduces the number of independent matrix elements to an even smaller value (see [22] for details).

Introducing the CN approach leads to the FTE in "vector form" as given by $$\frac{D}{Dt} a = \hat{M} \cdot a - \bar{A}[a] \cdot G_M + 2D_r(1 - 3a). \tag{35}$$

For an arbitrary matrix 3×3 matrix $\hat{M}$ the mapping $\hat{a} \mapsto \hat{a} \cdot \hat{M} + \hat{M}^T \cdot \hat{a}$ defines a linear mapping in the six-dimensional vector space of real symmetric 3×3 matrices, which can be formally written as a matrix-vector product $\hat{M} \cdot a$ in $R^6$ described by the real 6×6 matrix $\hat{M}$, whose elements are either zero or given by simple algebraic terms of the elements of $\hat{M}$. In this sense the CN scheme yields the identification $$\hat{M} \cdot a \quad \xleftarrow{\quad CN \quad} \quad \hat{a} \cdot \hat{M} + \hat{M}^T \cdot \hat{a}$$

with $$\hat{M} = \begin{pmatrix} 2M_{11} & 0 & 0 & 0 & 2M_{31} & 2M_{21} \\ 0 & 2M_{22} & 0 & 2M_{32} & 0 & 2M_{12} \\ 0 & 0 & 2M_{33} & 2M_{23} & 2M_{13} & 0 \\ 0 & M_{23} & M_{32} & M_{22}+M_{33} & M_{12} & M_{13} \\ M_{13} & 0 & M_{31} & M_{21} & M_{11}+M_{33} & M_{23} \\ M_{12} & M_{21} & 0 & M_{31} & M_{32} & M_{11}+M_{22} \end{pmatrix}. \tag{35a}$$

Likewise the contraction operation $\hat{A}^{(4)}:\hat{G}_M$ is defined element wise by the formula $$(\hat{A}^{(4)}:\hat{G}_M)_{ij} = \Sigma_{k,l=1}^{3} A_{ij\ kl}^{(4)} (G_M)_{kl} = \Sigma_{\nu=1}^{3} A_{\mu\nu} (G_M)_\nu 2 \cdot \Sigma_{\nu=4}^{6} A_{\mu\nu} (G_M)_{84}$$

using the index assignments $\mu \leftrightarrow (ij), \nu \leftrightarrow (kl)$ as given by the CN scheme. This operation can also be written as a matrix-vector product $\bar{A} \cdot G_M$, where the matrix elements of $\bar{A}$ are related to the elements of $\hat{A}$ via $$\bar{A}_{\mu\nu} = \begin{cases} A_{\mu\nu}, \nu \in \{1, 2, 3\} \\ 2A_{\mu\nu}, \nu \in \{4, 5, 6\} \end{cases} \text{ for } \mu \in \{1, \ldots, 6\}. \tag{35b}$$

This reveals that the matrix $\bar{A}$ (unlike $\hat{A}$) is not symmetric! The matrix $\hat{A}$ results from assigning the elements of the tensor $\hat{A}^{(4)}[\hat{a}^{(2)}]$, which itself is computed from the FO matrix by a closure approximation, according to the CN scheme $$(\text{i.e. } \hat{A} \quad \xleftarrow{\quad CN \quad} \quad \hat{A}^{(4)}[\hat{a}^{(2)}]),$$

so the term $\bar{A}[a]$ represents the closure approximation in CN.

Computational Cost of the Proposed Algorithm

The most efficient implementation of the computational operations performed in the steps 2. to 10. of the procedure proposed for an efficient evaluation of the r.h.s. function results from applying the CN scheme to this procedure. The following table gives an overview over number of operations (#⊗: number of multiplications & divisions, #⊕: number of additions & subtractions) and function calls that are needed to perform the individual steps of the procedure using the CN approach:

| Step | Quantity | #⊗ | #⊕ | Function |
|---|---|---|---|---|
| 2 | $\lambda_{\pm}, \hat{N}_a \leftarrow \hat{M}$ | 17 | 8 | — |
| 3 | $\hat{G}_M, \text{Tr}(\hat{G}_M)$ | — | 8 | — |
| 4 | $\zeta \leftarrow \hat{G}_M:\hat{G}_M, \xi_2$ | 10 | 5 | $\sqrt{\ldots}$ |
| 5 | $\det(\hat{a}^{(2)}), f_s, \hat{f}_s, \xi_3$ | 13 | 7 | $\min(\ldots)$ $\max(\ldots)$ |
| 6 | $\xi_4 \leftarrow \hat{G}_M \cdot \hat{a}^{(2)}$ | 7 | 5 | — |
| 7 | $\phi_a, \phi_1, \phi_{g_s}$ | 6 | 4 | — |
| 8 | $\phi_1, \phi_1 \leftarrow \phi_1 + \phi_1$ | 2 | 5 | — |
| 9 | $\xi_5, \xi_6, \hat{N}_a \leftarrow \hat{N}_a \cdots$ | 8 | 12 | — |
| 10 | $\hat{F} \leftarrow \hat{a}^{(2)} \cdot \hat{N}_a + \hat{N}_a^T \cdot \hat{a}^{(2)}$ | 33 | 30 | — |
|  | $\hat{F} \leftarrow \hat{F} + \ldots$ |  |  |  |
| Σ | $\hat{F}^{(2)}(\hat{a}^{(2)}, \nabla \otimes U) \leftarrow \hat{F}$ | 96 | 84 | 3 |

The following points comment on aspects of implementation as well as on the operation counts given in the table for various steps of the algorithm presented above:

- As the matrix $\hat{N}_a$ is not symmetric, it is stored as a 3×3 matrix. An extra storage of $\hat{M}$ is not necessary if $\hat{N}_Q$ is initialized with the computation of $\hat{M}$.
- The symmetric matrix $\hat{G}_M$ is needed in matrix form for the computation of $\hat{N}_a$ (→step 9.), but also appears as a 6-vector in the final step 10.
- Storage and assignment operations are not counted, as they their contribution to the overall computational costs is negligible.
- The number of auxiliary variables is reduced by reusing already existing variables once their value is no longer needed. This has not been done in the version of the algorithm proposed above, since this would reduce the clarity of presentation of the algorithm.
- The contraction operation of a pair of symmetric matrices (as occurring in steps 4. and 6.) is implemented with 7⊗- and 5⊕-operations using CN. (In matrix notation it is defined by in $\hat{m}:\hat{n}=\text{Tr}(\hat{m}^T \cdot \hat{n}) = \Sigma_{i,j=1}^{3} m_{ij} n_{ij}$.)
- The determinant of a real symmetric 3×3 matrix (→step 5.) is computed with 11 ⊗- and 5 ⊕-operations using CN.
- The assembly of the matrix $\hat{N}_a$ performed in step 9. requires 6 ⊗- and 12 ⊕-operations if an auxiliary variable storing $\hat{G}_M$ as a symmetric 3×3 matrix is used, plus 2 multiplications to compute the variables $\xi_5$ and $\xi_6$.
- The matrix operation $\hat{F} \leftarrow \hat{a}^{(2)} \cdot \hat{N}_a + \hat{N}_a^T \cdot \hat{a}^{(2)}$ requires 27 ⊗- and 21 ⊕-operations using CN.
- Any operation of the type $\ldots + \beta \hat{I}$ that adds (or subtracts) a multiple of the unit matrix requires only three additions of $\beta$ to the diagonal elements.

The final row of the table shows that a single evaluation of the r.h.s. function is obtained at the computational cost of 96 ⊗-operations, 84 ⊕-operations and 3 function calls to compute the square root of a (double precision) floating point number as well as the minimum and maximum of a pair of such numbers. On modern computer hardware the computational cost of addition and multiplication operations is about the same, a call to a min- or max-function costs about 1.5-2 operations, and the cost of a square root computation amounts approximately to 6-10 operations (i.e. on average 8 operations, depending on the required accuracy).

Altogether a single evaluation of (30b) is achieved by the algorithm proposed above at a computational cost of about 190 operations. This is the most efficient approach to evaluate the r.h.s. of the FTE with (stabilized) hybrid closure including dynamic trace stabilization.

Assessment of the Computational Efficiency

An assessment of the computational efficiency of the proposed procedure results from a comparison with a "standard" approach that evaluates the r.h.s. function as given in vector form by eqn. (35). Such an approach would have to be adopted e.g. if the code is intended to have a certain modular structure such that (i) all operations that are independent of the closure approximation are performed in a "generic" routine which takes the real 6×6 matrix $\overline{A}$ as input, and (ii) the matrix elements of $\overline{A}$ are computed in a separate routine according to the specific choice of a closure function $\hat{A}^{(4)}[\hat{a}^{(2)}]$ using the CN scheme and (35b) as explained above. The computational costs of such a "standard" approach can be evaluated by the following considerations:

- The "standard" procedure would start with the computation of the matrix $\hat{M}$, the 6-vector $$G_M \xleftarrow{CN} \hat{M} + \hat{M}^T$$

and the scalar parameter $2D_r$ (see steps 2. to 4.), which in sum requires 46 operations plus a square root computation.

- The operation $\hat{a} \mapsto \hat{a} \cdot \hat{M} + \hat{M}^T \cdot \hat{a}$ corresponding to $\hat{M} \cdot a$ requires 48 operations if the matrix-vector product is carried out analytically in advance and only the resulting formulas for the six components are evaluated numerically.

- The computation of the matrix-vector product $\overline{A} \cdot G_M$ and its subtraction from the r.h.s. requires 66+6=72 operations.

- The addition of $2D_r \cdot 1$ and the subtraction of $6D_r \cdot a$ (using $6D_r = 3/2 \cdot 2D_r$) require another 3+12+1=16 operations.

Counting 8 operations for the square root computation, the computational costs for this approach to evaluate the r.h.s. of (35) add up to 190 operations up to this point. The inclusion of a control term for trace stabilization adds some more operations (see step 8.), but about the same amount of operations could be saved by replacing the explicit subtraction of $6D_r \cdot a$ from the r.h.s. by a subtraction of the term $3D_r = 3/2 \cdot 2D_r$ from the diagonal of $\hat{M}$.

These "fixed costs" are independent of the closure approximation required to compute the elements of the matrix $\overline{A}$, which has to be done in a separate procedure.

In the case of the hybrid closure the matrix $\hat{A}$ has 21 independent elements, as the tensor function $\hat{A}_{hyb}^{(4)}[\hat{a}^{(2)}]$ defined by (6) and (6a/b/c) has orthotropic symmetry, but is not totally symmetric because of the quadratic term (6a). Translating the definition of $\hat{A}_{hyb}^{(4)}[\hat{a}^{(2)}]$ to CN yields the following set of expressions which have to be used to compute the matrix elements $A_{\mu\nu}$:

$$A_{\mu\nu} = \tilde{f}_s a_\mu a_\nu - \zeta_1 D_{\mu\nu} + \zeta_2 E_{\mu\nu} \tag{36}$$

$$a_\mu \xleftarrow{CN} a_{ij}^{(2)}, \quad \zeta_2 = \frac{1-\tilde{f}_s}{7} = 5\zeta_1$$

$$D_{\mu\nu} \xleftarrow{CN} (\delta_{ij}\delta_{kl} + \delta_{ik}\delta_{jl} + \delta_{il}\delta_{jk})$$

$$E_{\mu\nu} \xleftarrow{CN} (\delta_{ij}a_{kl}^{(2)} + \delta_{kl}a_{ij}^{(2)} + \delta_{ik}a_{jl}^{(2)} + \delta_{jl}a_{ik}^{(2)} + \delta_{il}a_{jk}^{(2)} + \delta_{jk}a_{il}^{(2)})$$

The symmetric matrices $\hat{D}$ and $\hat{E}$ both contain the components of totally symmetric 4$^{th}$ order tensor expressions which have to be computed analytically in advance.

While the matrix elements $D_{\mu\nu}$, are constants, the matrix elements $E_{\mu\nu}$ are linear expressions in the vector components $a_\mu$. The analytical computation of the matrix elements $D_{\mu\nu}$ and $E_{\mu\nu}$ yields the following pair of real symmetric 6×6 matrices:

$$\hat{D} = \begin{pmatrix} 3 & 1 & 1 & 0 & 0 & 0 \\ 1 & 3 & 1 & 0 & 0 & 0 \\ 1 & 1 & 3 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix},$$

$$\hat{E} = \begin{pmatrix} 6a_1 & a_1+a_2 & a_1+a_3 & a_4 & 3a_5 & 3a_6 \\ a_1+a_2 & 6a_1 & a_2+a_3 & 3a_4 & a_5 & 3a_6 \\ a_1+a_3 & a_2+a_3 & 6a_1 & 3a_4 & 3a_5 & a_6 \\ a_4 & 3a_4 & 3a_4 & a_2+a_3 & a_6 & a_5 \\ 3a_5 & a_5 & 3a_5 & a_6 & a_1+a_3 & a_4 \\ 3a_6 & 3a_6 & a_6 & a_5 & a_4 & a_1+a_2 \end{pmatrix}$$

Using these matrices, the computational costs to assemble the matrix $\hat{A}$ are determined according to the following procedure:

- The computation of the restricted scalar orientation factor $\tilde{f}_s$ and the auxiliary variable $\zeta_2$ are done by step 5. of the effective algorithm and requires 23 operations (counting 3 operations for the nested min(0, max(..., 1)) calls). The auxiliary variable $\zeta_1 = \zeta_2/5$ is computed by one additional division, so the amount of operations required to compute $\tilde{f}_s$ and $\zeta_{1/2}$ is 24.

- The matrix $\hat{A}$ is initialized by $A_{\mu\nu} \leftarrow \tilde{f}_s a_\mu a_\nu$, which takes 2 multiplications for each of the 21 independent matrix elements of the upper triangle, or 42 operations in sum. (The remaining matrix elements are assigned by symmetry.)

- The matrix elements of $\zeta_1 \hat{D}$ are computed by a single operation (i.e. the computation of $3\zeta_1$) and a number of assignments of either $\zeta_1$ or $3\zeta_1$ to the corresponding nonzero matrix elements. Likewise the entire update operation $\hat{A} \leftarrow \hat{A} - \zeta_1 \hat{D}$ requires only the subtraction of either $\zeta_1$ or $3\zeta_1$ from the corresponding entries of $\hat{A}$. As it is only necessary to perform these subtractions on the upper triangular elements of $\hat{A}$, the total operation count for the update operation reduces to 10 (i.e. 9 subtractions plus 1 operation to compute $3\zeta_1$).

- The matrix $\hat{E}$ contains 12 different expressions, of which only 9 have to be computed by a single addition or multiplication. (The rest is obtained by assignments.) As none of the 12 expressions can a priori be assumed to be zero, the computation of $\zeta_2 \hat{E}$ needs 12 multiplications, so the total amount of operations to compute $\zeta_2 \hat{E}$ is 21 for the independent elements of this matrix. The remaining matrix elements are subsequently obtained by assignment.

- The final step in the assembly procedure for $\hat{A}$ consists of the update operation $\hat{A} \leftarrow \hat{A} + \zeta_2 \hat{E}$, which requires 21 operations that add the upper triangles of the matrices $\hat{A}$ and $\zeta_2 \hat{E}$ and the assignments to obtain the remaining matrix elements of the lower triangle.

The complete procedure to assemble the matrix $\hat{A}$ according to (36) performs the steps described above in sequence, which requires 24+42+10+21+21=118 operations. (It should be noted that this procedure is set up also in a very efficient way!) As the non-symmetric matrix $\overline{A}$ is computed from the symmetric matrix $\hat{A}$ according to (35b) by 18 multiplications, the total amount of operations for the above procedure to compute the matrix $\bar{A}$ is 118+18=136.

Altogether the "standard procedure" sketched above requires about 326 operations when applied to the hybrid closure. This exceeds the computational costs of the proposed efficient procedure roughly by a factor of 1.72 (i.e. about 70%). Using the efficient procedure yields the result of a single evaluation of the r.h.s. function of the FTE with stabilized hybrid closure (including dynamical trace stabilization) at roughly 60% of the computational costs of the "standard" approach.

This improvement in computational efficiency is achieved mainly by a smart reorganisation of the specific algebraic structure of the r.h.s. function based on the preceding analytic computation of $\hat{A}_{hyb}{}^{(4)}[\hat{a}^{(2)}]:\hat{G}_M$, where the optimal efficiency level is finally reached by a reduction of the equations via the CN scheme.

7.7 Trace Rescaling, Invariant Monitoring and Phase Space Projection

Any FO matrix is required to have nonnegative eigenvalues and unit trace (→section 2.4). This implies a set of algebraic constraints on the solutions of the FTE, which thereby becomes a DAS (→section 2.6). Apart from the equality $S_a=Tr(\hat{a})=1$ for the trace, the nonnegativity constraints for the eigenvalues can be formulated equivalently in terms of a pair of inequalities $K_a \geq 0$ and $D_a \geq 0$ (→eqns. (9), (10)) for the $2^{nd}$ and $3^{rd}$ invariants $$K_a = \frac{1}{2}[Tr(\hat{a})^2 - Tr(\hat{a} \cdot \hat{a})]$$

and $D_a=\det(\hat{a})$ of the matrix.

The trace condition is accounted for in an "active" and computationally inexpensive way via dynamical trace stabilization (DTS) by a suitable penalty term added to the r.h.s. of the FTE (→section 7.3) that automatically keeps the trace of the numerical solution close to the required value $S_a=1$. Using this technique one obtains a numerical solution of the FTE that fulfils the trace condition only approximately (i.e. $S_a \approx 1$). From a practical point of view this hardly affects the correctness of the solution, as it is always possible to rescale the matrix elements by multiplication with a factor $1/S_a$. This trace rescaling operation is mathematically described by $$\hat{a} | \rightarrow \hat{a}' = 1/S_a \hat{a}(\text{i.e.}: a'_{ij}=a_{ij}/S_a) \Rightarrow Tr(\hat{a}')=1 \quad (37)$$

and has several favourable properties:

If $\lambda_k$ are the eigenvalues of the matrix $\hat{a}$, the eigenvalues of the rescaled matrix $\hat{a}'$ are given by $\mu'_k=\mu_k/S_a$, so
  (i) they do not change their sign if $S_a>0$, and
  (ii) their numerical values are only slightly rescaled if $S_a \approx 1$
(as guaranteed by DTS).

The corresponding eigenvectors are not affected by the rescaling operation.

Therefore the operation of trace rescaling induces no qualitative changes to the computed numerical solution, but slightly corrects the solution while preserving all essentials properties of the matrix. From this point of view, any numerical solution of the FTE having nonnegative eigenvalues $\mu_k$ (or equivalently: nonnegative $2^{nd}$ and $3^{rd}$ invariants $K_a$ and $D_a$) and $S_a \approx 1$ can be interpreted as an FO matrix in practice.

General Aspects of Invariant Control for the FTE

According to the results of [12] (→section 3.), the normegativity of the eigenvalues of a real symmetric 3×3 matrix is guaranteed if its trace is positive and the $2^{nd}$ and $3^{rd}$ invariants $K_a$ and $D_a$ are nonnegative.

As the trace of a matrix is a simple linear function of the matrix elements and the material derivative operator $$\frac{D}{Dt} = \frac{\partial}{\partial t} + U \cdot \nabla$$

commutes with the trace operation, it is possible to derive an evolution equation for the trace in a straightforward manner (→section 4.). Due to the special algebraic structure of the r.h.s. of the FTE this evolution equation takes a closed form, in the "exact" case as well as in the cases of either the hybrid or general orthotropic closure approximations (see eqns. (14) and (15a/b)). Due to these special algebraic properties of the FTE it is possible to add a penalty term to the r.h.s. of the FTE itself which affects the evolution equation for the trace in a special (intended) way (→DTS).

However, unlike the trace the $2^{nd}$ and $3^{rd}$ invariants $K_a$ and $D_a$ are nonlinear functions of the matrix elements. Therefore it is impossible to apply the same (or a similar) procedure in order to obtain closed form evolution equations for these invariants (in general the r.h.s. of the evolution equations of the invariants is a function of all matrix elements, not only invariant combinations of them, and is not independent of the directional properties of the matrix that is encoded in the eigenvectors). Likewise it is rather difficult (if not impossible) to add any specific terms to the r.h.s. of the FTE that influence the evolution of the nonlinear invariants in a predetermined way. Therefore an "active" control of the $2^{nd}$ and $3^{rd}$ invariant by means of suitable penalty terms on the r.h.s. of the FTE to keep the invariants within the nonnegative domain is not available.

An alternative procedure consists of a combination of an "uncontrolled" (or partially controlled) integration procedure with a projection operation that maps the numerical solution back to its admissible domain. Such a "passive" procedure results in a valid integration scheme that preserves the accuracy of the "uncontrolled" scheme if the operations of numerical integration and subsequent projection are applied in every time step (see ch. IV.4 of [9] on projection methods for a detailed discussion).

Applied to the FTE this combined procedure consists of
1. an integration step using the methods described in sections 5, 6. and 7. (up to the preceding subsection 7.6) followed by
2. an invariant monitoring step to determine if the matrix computed in the preceding integration step is still an FO matrix, and
3. a phase space projection step which maps the matrix back to the phase space set $M_{FT}$ if the result of the monitoring step has been negative (i.e. the invariant conditions have been violated).

As the phase space $M_{FT}$ is a convex set (→Theorem 1 in section 3.), for each real, symmetric 3×3 matrix there exists a unique matrix in $M_{FT}$ at "minimum distance" (measured in a suitable metric, see below). This defines the projection mapping required for the third step of the above procedure. Further details of phase space projection are discussed below.

Efficient Invariant Monitoring and Eigenvalue Computation

According to the procedure described above, a monitoring of the invariants has to be performed in each time step and each (filled) cell of the computational domain. Therefore the computation of the invariants—either the $2^{nd}$ and $3^{rd}$ invariant or the eigenvalues, which themselves are invariant quantities also—has to be carried out in the most efficient way to avoid any unnecessary computational overhead.

Using the notation (x,y,z) and (u,v,w) for the diagonal and off-diagonal elements of the matrix $\hat{a}$ as introduced in section 3, the invariants are given as polynomial expressions of the matrix elements by the formulas $$\left.\begin{array}{l} S_a = x+y+z \\ K_a = xy+yz+zx-(u^2+v^2+w^2) \\ D_a = xyz+2uvw-(u^2x+v^2y+w^2z) \end{array}\right\} \text{ for } \hat{a} = \begin{pmatrix} x & w & v \\ w & y & u \\ v & u & z \end{pmatrix}, \quad (38)$$

which altogether can be evaluated with 11 additions and 13 multiplications. As the trace $S_a$ is computed in every time step during the numerical integration of the FTE, a monitoring of the invariants by checking the inequalities $K_a \geq 0$ and $D_a \geq 0$ can be done at the cost of additional 22 operations per time step for each cell.

A check of the invariants $K_a$ and $D_a$ is the most efficient way to determine whether a real, symmetric 3×3 matrix belongs to the set $M_{FT}$ of FO matrices, as a check of the conditions $\mu_k \geq 0$ on the eigenvalues requires an explicit computation of the latter.

A detailed analysis shows that a numerical computation of the eigenvalues of the matrix $\hat{a}$ may be done most efficiently by computing the roots of its characteristic polynomial $P_a(\mu)$, which costs about 100 operations on top of the 24 operations needed to compute the invariants as coefficients of $P_a(\mu)$ and therefore is about 5 times more expensive. This quantifies the computational overhead of using the eigenvalues instead of the invariants for monitoring the FO matrix properties and emphasizes that using the invariants (38) is the method of choice for an efficient monitoring of the spectral properties of $\hat{a}$. A numerical diagonalization of the matrix is the most expensive method to compute the eigenvalues. Therefore such a procedure is not recommended unless the eigenvectors are also of interest (e.g. as a part of the phase space projection procedure discussed below).

Phase Space Projection

If invariant monitoring indicates that the numerical solution of the FTE moves outside the phase space set $M_{FT}$ (i.e. either one or both of the inequalities $K_a \geq 0$ and $D_a \geq 0$ are violated) within the current time step, the solution has to be corrected by means of a projection onto the phase space $M_{FT}$.

For any real 3×3 matrix $\hat{m}$ this projection mapping yields by definition the "nearest" matrix $\hat{a} \in M_{FT}$, where the distance $d_F(\hat{m},\hat{n}) = \|\hat{m}-\hat{n}\|_F$ of two real 3×3 matrices is measured in the Frobenius norm $$\|\hat{m}\|_F = \sqrt{Tr(\hat{m}^T \cdot \hat{m})},$$

which is itself induced by the scalar product $\langle \hat{m}|\hat{n}\rangle = Tr(\hat{m}^T \cdot \hat{n})$ in the vector space of real 3×3 matrices. The restriction of these quantities to the six-dimensional subspace of symmetric matrices is straightforward. It can be shown [18] that for any real 3×3 matrix $\hat{m}$ there exists a unique matrix $\hat{a}^* \in M_{FT}$ such that the distance $d_F(\hat{m},\hat{a})$ between $\hat{m}$ and the elements $\hat{a}$ of $M_{FT}$ is minimized precisely by $\hat{a} = \hat{a}^*$.

This minimum distance solution is given by a matrix $\hat{a}^* \in M_{FT}$ that is uniquely defined by the following properties (see [18] for a formal proof):

The eigenvectors of $\hat{a}^*$ are the same as those of the matrix $\hat{m}$.

The triple of eigenvalues $(\mu^*_1, \mu^*_2, \mu^*_3)$ of $\hat{a}^*$ is the unique point of the triangle set (see eqn. (7) in section 3 and FIG. 7)

$$\Delta_a := \{(x,y,z) \in \mathbb{R}^3 \mid 0 \leq x,y,z \leq 1, x+y+z=1\}$$

that has the smallest Euclidian distance in $\mathbb{R}^3$ to the point $(\mu_1, \mu_2, \mu_3)$ given by the triple of eigenvalues of the matrix $\hat{m}$.

The projection mapping $\hat{P}_{FT}: R_s^6 \to M_{FT}$ defined on the six-dimensional real vector space $R_s^6$ of symmetric 3×3 matrices and having values in $M_{FT}$ is given in compact mathematical notation by the formula $$\hat{a} \in R_s^6 \mapsto \hat{a}^* = \hat{P}_{FT}[\hat{a}] = \arg\min_{\hat{a}' \in M_{FT}} \|\hat{a}' - \hat{a}\|_F, \quad (39)$$

and the algorithm to actually compute the value of the projection mapping consists of the following steps:

1. Given a real symmetric 3×3 matrix $\hat{a} \in R_s^6$ as input, compute its invariants $S_a$, $K_a$ and $D_a$.
2. Check the conditions $S_a=1$, $K_a \geq 0$ and $D_a \geq 0$. If all conditions are fulfilled, then $\hat{a} \in M_{FT}$ already, and the projection mapping is just the identity:

$$\hat{a} \in M_{FT} \Leftrightarrow \hat{P}_{FT}[\hat{a}] = \hat{a}. \quad (39a)$$

In this case assign the input matrix $\hat{a}$ to output and exit. Otherwise (i.e. if either $K_a<0$ or $D_a<0$) execute the following steps:

3. Compute the eigenvalues $\mu_k$ and corresponding eigenvectors $E_k$ of the matrix (i.e. $\hat{a} \cdot E_k = \mu_k E_k$). This step may be formally represented as:

$$\{\mu_k, E_k\}_{k=1,2,3} \leftarrow \hat{a} = \sum_{k=1}^{3} \mu_k E_k \otimes E_k, \quad (39b)$$

$$\hat{R}^T \cdot \hat{a} \cdot \hat{R} = \text{diag}(\mu_1, \mu_2, \mu_3),$$

$$R_{jk} = (E_k)_j \Leftrightarrow \hat{R} = (E_1, E_2, E_3).$$

4. Next find the unique point $\mu^* = (\mu^*_1, \mu^*_2, \mu^*_3) \in \Delta_a$ having minimal Euclidean distance to $\mu=(\mu_1, \mu_2, \mu_3)$ in $\mathbb{R}^3$, i.e.:

$$\mu^* = \arg\min_{\mu' \in \Delta_a} \|\mu' - \mu\|_2, \|\mu' - \mu\|_2 \quad (39c)$$

$$= \left[\sum_{k=1}^{3} (\mu'_k - \mu_k)^2\right]^{\frac{1}{2}}$$

5. Finally compose the value $\hat{a}^* = \hat{P}_{FT}[\hat{a}]$ of the projection mapping by $$\hat{P}_{FT}[\hat{a}] = \hat{a}^* = \Sigma_{k=1}^3 \mu^*_k E_k \otimes E_k \Leftrightarrow a^*_{ij} = \Sigma_{k=1}^3 \mu^*_k (E_k)_i (E_k)_j. \quad (39d)$$

Note that (39c) yields $\mu^*=\mu$ if $\hat{a} \in M_{FT}$, so (39d) coincides with (39a) in this case. In this sense (39b/c/d) already encode the general definition of the projection mapping. The individual steps to compute the results of (39b/c/d) have to be carried out only for $\hat{a} \notin M_{FT}$, whereas (39a) formally completes the definition in the case $\hat{a} \in M_{FT}$.

Figure 13:
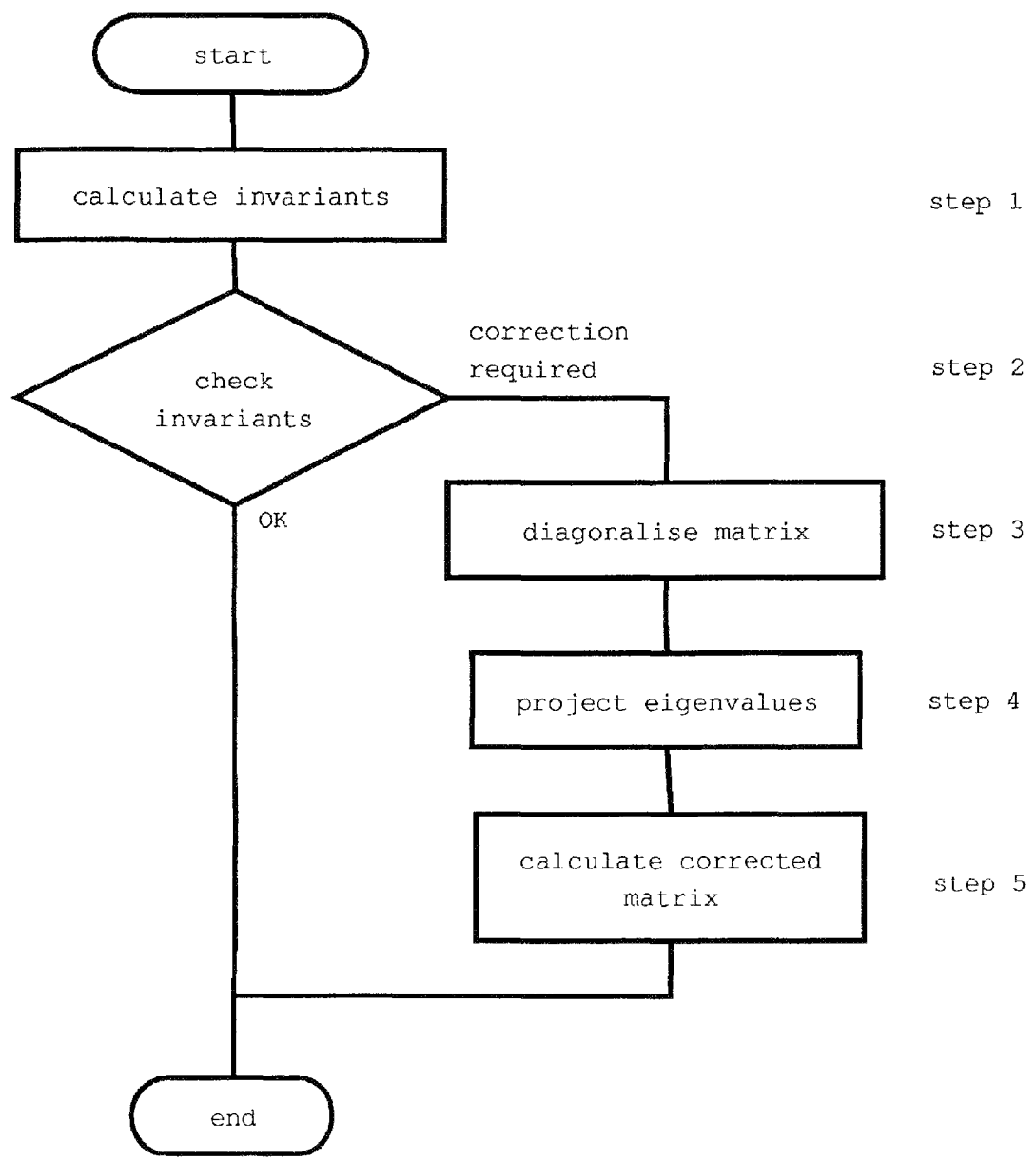
FIG. 13 is a flowchart illustrating a phase space projection process using trace rescaling according to an embodiment of the invention.

While the description of the algorithm to compute $\hat{P}_{FT}[\hat{a}]$ given above is mathematically precise, a practical implementation of this algorithm taking input matrices with trace $S_a \approx 1$ (as supplied by a FTE time integration scheme with DTS) would skip an additional evaluation of the trace in Step 1. of the procedure. Moreover a practical implementation would incorporate the following variations and/or specifications of the various algorithmic steps, see FIG. 13:

In Step 1. the invariants $K_a$ and $D_a$ of the input matrix are computed by (38).

In Step 2. only the conditions $K_a \geq 0$ and $D_a \geq 0$ are checked, and the input matrix is left unchanged and assigned to output if both conditions are fulfilled.

The results of Step 3. are obtained by numerical matrix diagonalization, e.g. by iterative cyclic Jacobi rotations (see [38], ch. 11.1 or [39], ch. 6.5.2) or a single Givens/Householder reduction step and subsequent QR iterations (see [42] or [38], ch. 11.2).

Actually Step 4. is carried out only if at least one of the input eigenvalues $\mu_k$ is negative, so the solution point $\mu^* = (\mu_1^*, \mu_2^*, \mu_3^*) \in \Delta_a$ is always located on the edges (including the cornerpoints) of the triangle set $\Delta_a$.

Using the "trace rescaled" eigenvalues $\tilde{\mu}_k = \mu_k/S_a$ (see eqn. (37) and the subsequent remarks on this subject) confines the minimization problem that has to be solved to determine $\mu^*$ according to (39c) to the plane $S_a = 1$ fixed by the three cornerpoints (1,0,0), (0,1,0) and (0,0,1) of the triangle $\Delta_a$. This "plane" minimization problem can be solved equivalently in $R^2$, e.g. in the $(\mu_1, \mu_2)$—plane, by finding the unique pair $(\mu_1^*, \mu_2^*)$ located on the edges of the projected triangle $$\tilde{\Delta}_a := \{(\mu_1, \mu_2) \in \mathbb{R}^2 \mid 0 \leq \mu_1, \mu_2 \leq 1, \mu_1 + \mu_2 \leq 1\}$$

(i.e. the orthogonal projection of $\Delta_a$ to the $(\mu_1, \mu_2)$—plane) that has the smallest Euclidian distance to the pair $(\tilde{\mu}_1, \tilde{\mu}_2)$. The third coordinate of $\mu^*$ is then given by $$\mu_3^* = 1 - (\mu_1^* + \mu_2^*).$$

Since $S_a \approx 1$ by DTS, the algorithm that solves the "plane" minimization problem yields a very good approximation to the exact solution of (39c), while it is much simpler and can be implemented more efficiently than an algorithm that computes $\mu^*$ directly from (39c) in $R^3$.

In Step 5. the formula to compute the individual elements of the matrix $\hat{a}^*$ is given by $a^*_{ij} = \Sigma_{k=1}^3 \mu^*_k R_{ik} R_{jk}$ in terms of the matrix elements $R_{ij}$ of the rotation matrix $\hat{R} = (E_1, E_2, E_3)$ that has been computed previously in Step 3.

8. Implementation

The result of the process, which is a distribution function that describes the likeliness of the orientation of the fibres in a given area of the article is presented in graphical or numerical form on a display of a computer workstation (not shown). This could be the display of the computer or workstation on which the calculations are performed, or this could be on a display of a computer that is networked to the computer on which the simulation is performed.

A mould or product designer will use the results of the simulation to improve and the quality of the article that results from the injection moulding process. The results of the simulation may also be used by engineers to reduce the cost for manufacturing the article concerned. The advantage of a reliable information about the fibre information allows engineers to have a better understanding and information before determining the strength, rigidity and stability characteristics of the article, since the orientation of the fibres, which fibres typically have much higher strength characteristics than the polymer material, have a decisive influence on the strength, rigidity and stability characteristics of the article. Further, the fibre orientation has an influence on warping effects that may occur when injection moulding a polymer masses with fibres suspended therein. By knowing the fibre orientation, the warping and other stress creating the commission to effect can be better predicted or to design changes be avoided.

The results of the simulation can also be transmitted to other applications such as CAD software. Thus, the results of the simulation can be used in interactive process between the design software and the simulation software.

The invention has numerous advantages. Different embodiments or implementations may yield one or more of the following advantages. It should be noted that this is not an exhaustive list and there may be other advantages which are not described herein. One advantage of the invention is that the distribution of the fibre orientation fibre reinforced articles of manufacture can be determined at a significantly reduced computational effort. Advantage of the present invention is that the distribution of the fibre orientation in fibre reinforced articles of manufacture can be determined with an increased accuracy. Another advantage of the present invention is that the distribution of the fibre orientation in fibre reinforced articles of manufacture can be determined faster.

Although the present invention has been described in detail for purpose of illustration, it is understood that such detail is solely for that purpose, and variations can be made therein by those skilled in the art without departing from the scope of the invention.

The term "comprising" as used in the claims does not exclude other elements or steps. The term "a" or "an" as used in the claims does not exclude a plurality.

REFERENCES

[1] S. G. Advani (Ed.): *Flow and Rheology in Polymer Composites Manufacturing*, Elsevier, Amsterdam (1994)

[2] G. B. Jeffery: The motion of ellipsoidal particles immersed in a viscous fluid, *Proc. R. Soc. A* 102, 161-179 (1922)

[3] M. Junk and R. Illner: A new derivation of Jeffery's equation, *J. Math. Fluid Mech.* 8, 1-34 (2006)

[4] F. Folgar and C. L. Tucker III: Orientation behaviour of fibers in concentrated suspensions, *J. Reinf. Plast. Compos.* 3, 98-119 (1984)

[5] C. L. Tucker and S. G. Advani: Processing of shortfiber systems, ch. 6, pp. 147 in S. G. Advani (Ed.): *Flow and Rheology in Polymer Composites Manufacturing* (see ref. [1] above)

[6] S. G. Advani and C. L. Tucker III: The use of tensors to describe and predict fiber orientation in short fiber composites, *J. Rheol.*, 751-784 (1987)

[7] S. G. Advani and C. L. Tucker III: Closure approximations for three-dimensional structure tensors, *J. Rheol.*, 367-386 (1990)

[8] J. S. Cintra and C. L. Tucker III: Orthotropic closure approximations for flow-induced fiber orientation, *J. Rheol.* 39, 1095-1122 (1995)

[9] E. Hairer, C. Lubich and G. Wanner: *Geometric numerical integration*, Springer, Berlin (2002)

[10] J. Linn, J. Steinbach, A. Reinhardt: Calculation of the 3D fiber orientation in the simulation of the injection molding process for shortfiber reinforced thermoplasts, *ECMI 2000 Conference*, Palermo (2000)

[11] J. Linn: Exploring the phase space of the Folgar-Tucker equation, *SIAM-EMS Conference*, Berlin (2001)

[12] J. Linn: On the frame-invariant description of the phase space of the Folgar-Tucker equation, p. 327-332 in A. Buikis, R. Čiegis, A. D. Fitt (Eds.): *Progress in Industrial Mathematics at ECMI* 2002, Springer (2004)

[13] S. Hess: FokkerPlanck equation approach to flow alignment in liquid crystals, *Z. Naturforsch.* 31A, 1034 ff. (1976)

[14] M. Doi: Molecular dynamics and rheological properties of concentrated solutions of rodlike polymers in isotropic and liquid cristalline phases, *J. Polym. Sci., Polym. Phys. Ed.* 19, 229-243 (1981)

[15] M. Grosso, P. L. Maffetone, F. Dupret: A closure approximation for nematic liquid crystals based on the canonical distribution subspace theory, *Rheol. Acta* 39, 301-310 (2000)

[16] M. Kröger: Simple models for complex nonequilibrium fluids, *Phys. Rep.* 390, 453-551 (2004)

[17] J. Linn: The Folgar-Tucker Model as a Differential Algebraic System for Fiber Orientation Calculation, pp. 215-224 in Y. Wang, K. Hutter: *Trends in Applications of Mathematics to Mechanics*, proceedings of the STAMM 2004 conference in Seeheim (Germany), Shaker (2005)

[18] U. Strautins: *Investigation of fiber orientation dynamics within the Folgar-Tucker model with hybrid closure*, master thesis, Dept. of Mathematics, Univerity of Kaiserslautern (2004)

[19] J. Linn: *Dreidimensionale Vorausberechnung der anisotropen Materialeigen-schaften in thermoplastischen Spritzgusserzeugnissen* (AnIso-3D), Projekt-bericht für die MAGMA GmbH, Teil IIa (2002)

[20] J. Linn: *Dreidimensionale Vorausberechnung der anisotropen Materialeigen-schaften in thermoplastischen Spritzgusserzeugnissen* (AnIso-3D), Projekt-bericht für die MAGMA GmbH, Teil IIb (2002)

[21] B. E. VerWeyst, C. L. Tucker, P. H. Foss, J. F. O'Gara: Fiber orientation in 3D injection moulded features: prediction and experiment, *Internat. Polymer Processing* 14, 409-420 (1999);

[22] B. E. VerWeyst: *Numerical predictions of flow-induced fiber orientation in three-dimensional geometries*, Ph.D thesis, Univ. of Illinois at Urbana Champaign (1998)

[23] G. I. Marchuk: *Splitting and Alternating Direction Methods*, pp. 197-462 in P. G. Ciaret & J. L Lions (Eds.): *Handbook of Numerical Analysis, Volume I*, North-Holland, Elsevier (1990)

[24] K. W. Morton: *Numerical solution of convection-diffusion problems*, Chapman & Hall, London (1996)

[25] R. J. LeVeque, *Numerical Methods for Conservation Laws*, Birkhäuser (1992)

[26] G. Strang: "On the construction and comparison of difference schemes", *SIAM Journ. Num. Anal.* 5, 506-517 (1968)

[27] M. G. Crandall and A. Majda: "The method of fractional steps for conservation laws", *Math. Comp.* 34, 285-314 (1980)

[28] H. V. Kojouharov, B. M. Chen: "Nonstandard methods for the convective transport equation with nonlinear reactions", *Numer. Meth. Partial Diff. Eq.* 14, 467-485 (1998); "Nonstandard methods for the convective-dispersive transport equation with nonlinear reactions" in R. E. Mickens (ed.): *Applications of non-standard finite difference schemes*, minisymposium on *non-standard finite difference schemes: theory and applications*, SIAM annual meeting, Atlanta Ga., USA 1999, publ. by Singapore: World Scientific (2000)

[29] H. Wang, X. Shi and R. E. Ewing: "An ELLEM scheme for multidimensional advection-reaction equations and its optimal-order error estimate", *SIAM J. Numer. Anal.* 38, 1846-1885 (2001)

[30] P. J. van der Houwen: "Note on the time integration of 3D advection-reaction equations", *J. Comput. Appl. Math.* 116, 275-278 (2000)

[31] W. Hunsdorfer, J. G. Verwer: "A note on splitting errors for advection-reaction equations", *Appl. Numer. Math.* 18, 191-199 (1995)

[32] S. V. Patankar: *Numerical heat transfer and fluid flow*, Hemisphere Publ. Corp. (1980)

[33] C. A. J. Fletcher: *Computational techniques for Fluid Dynamics, Volume I: Fundamental and General Techniques* ($2^{nd}$ edition), Springer (1991)

[34] L. F. Shampine: "Conservation laws and the numerical solution of ODEs", *Comp. Math. Applic.* 12B, 1287-1296 (1986)

[35] L. F. Shampine: "Linear conservation laws for ODEs", *Comp. Math. Applic.* 35, 45-53 (1998)

[36] L. F. Shampine: "Conservation laws and the numerical solution of ODEs, part II", *Comp. Math. Applic.* 38, 61-72 (1999)

[37] J. Linn: "Entwicklung eines Software-Moduls zur Berechnung der Faserorientierung in der Spritzgießsimulation mit SIGMASOFT", technical Report for the MAGMA GmbH (2001)

[38] W. H. Press, S. A. Teukolsky, W. T. Vetterling, B. P. Flannery: *Numerical Recipes in Fortran 77: The Art of Scientific Computing* ($2^{nd}$ Edition), Cambridge University Press (1992)

[39] J. Stoer, R. Bulirsch: *Introduction to Numerical Analysis* ($3^{rd}$ Edition), Springer (2002)

[40] D. H. Chung, T. H. Kwon: "An invariant-based optimal fitting closure approximation for the numerical prediction of flow-induced fibre orientation", *J. Rheol.* 46, 169-194 (2002)

[41] F. Dupret, V. Verleye, B. Languilier: "Numerical prediction of moulding of short-fibre composite parts", Proc. 1st ESAFORM Conf., 291-294 (1998)

[42] G. H. Golub, H. A. van der Vorst: "Eigenvalue Computation in the 20th Century", *J. Comp. Appl. Math.* 123, 35-65 (2000)

The invention claimed is:

1. A method for optimizing injection molding by calculating orientation statistics of non-spherical particles on a macroscopic level for simulating an injection molding process with a suspension that is formed by a solvent containing a large number of non-spherical particles comprising the steps:

specifying a mold cavity, which forms at least part of a simulation domain;

providing a digital representation of the simulation domain;

forming a mesh with a plurality of computational cells by subdividing or discretizing at least part of the digital representation of the simulation domain;

specifying boundary conditions for the simulation;

setting initial conditions for the simulation;

solving the balance equations for mass, momentum and energy for at least a portion of the cells of the simulation domain to obtain fluid flow, heat flow and mass transfer of cells of the solution domain at a macroscopic level;

solving nonspherical particle orientation equations based at least partly on the results of the solved balance equations to thereby determine changes in the nonspherical particle orientation at a macroscopic level as function of space and time, wherein the non-spherical particle orientation is described statistically by a distribution function;

wherein the distribution function is approximated by non-spherical particle orientation tensors of increasing order including a $2^{nd}$ order orientation tensor and a $4^{th}$ order orientation tensor and the 4th order orientation tensor is computed as a function of the 2nd order orientation tensor using a stabilized hybrid closure approximation; and simulating the formation of one or more injection molded parts with solvent and a plurality of nonspherical particles based on the simulation model.

2. A method according to claim 1, wherein the distribution function is a nonlinear coupled system of convection-reaction type hyperbolic partial differential equations that is reformulated in vector form using contracted notation (CN).

3. A method according to claim 2, wherein the algebraic structure of the right hand side of a system of hyperbolic partial differential equations of reaction-convection type is used to achieve a stabilized hybrid closure with a minimum number of algebraic operations.

4. A method according to claim 3, wherein the number of algebraic operations required to determine the non-spherical particle orientation is minimized by identifying common subexpressions in the right hand of the system of hyperbolic partial differential equations.

5. A method according to claim 1, wherein the distribution function is approximated by non-spherical particle orientation tensors of increasing order, which is a nonlinear coupled system of convection-reaction type hyperbolic partial differential equations, and wherein said nonlinear coupled system of hyperbolic partial differential equations is split using operator splitting into a pure orientation transport component and a rotational orientation dynamics.

6. A method according to claim 5, wherein the operator splitting is performed using either simple operator splitting or symmetric operator splitting.

7. A method according to claim 6, wherein the operator splitting is performed by symmetric operator splitting and by simple operator splitting in an alternating way.

8. A method according to claim 1, wherein the distribution function is approximated by non-spherical particle orientation tensors of increasing order, which is a nonlinear coupled system of convection-reaction type hyperbolic partial differential equations, and wherein solving of the coupled system of hyperbolic partial differential equations comprises the use of flow controlled time integration combined with dynamical trace stabilization by means of a control term.

9. A method according to claim 8, wherein the control term is included in coupled system of hyperbolic partial differential equations for dynamical trace stabilization.

10. A method according to claim 9, wherein said non-spherical particle orientation tensors of increasing order include a $2^{nd}$ order orientation tensor and wherein the trace of the 2nd order orientation tensor, is dynamically stabilized by a modification of the coupled system of hyperbolic partial differential equations via the addition of a penalty term.

11. A method according to claim 10, wherein the functional form of the penalty term is specifically selected such that the trace of the 2nd order orientation tensor is kept approximately at its required value 1.

12. A method according to claim 11, wherein the second order orientation sensor is kept approximately at its required value 1 by a selecting the penalty term such that a set of all symmetric matrices with unit trace becomes a stable integral manifold of the coupled system of hyperbolic partial differential equations.

13. A method according to claim 1, wherein the distribution function is approximated by non-spherical particle orientation tensors of increasing order, which is a nonlinear coupled system of convection-reaction type hyperbolic partial differential equations, further comprising using the specific scaling behavior of the right hand side function of the coupled system of hyperbolic partial differential equations with respect to components of a local velocity gradient of the suspension to construct an integration method which selects the time integration scheme according to the size of the local shear rate of the suspension.

14. A method according to claim 1, wherein the distribution function is approximated by non-spherical particle orientation tensors of increasing order, which is a nonlinear coupled system of convection-reaction type hyperbolic partial differential equations, wherein solving of the nonlinear coupled system of hyperbolic partial differential equations comprises a monitoring step to determine if a proposed solution of a fibre orientation tensor or matrix is an allowed solution in that the tensor or matrix is positive semi-definite and has unit trace, and if not then performing a phase space projection step, wherein the proposed solution is projected onto an admissible phase space or a trace rescaling step.

15. Apparatus for optimizing injection molding by simulating an injection molding process with a suspension that is formed by a solvent containing a large number of non-spherical particles and calculating orientation statistics of non-spherical particles on a macroscopic level comprising:

a digital computer;

means for specifying a mold cavity, which forms at least part of a simulation domain;

means for providing a digital representation of the simulation domain;

means for forming a mesh with a plurality of computational cells by subdividing or discretizing at least part of the digital representation of the simulation domain;

means for specifying boundary conditions for the simulation;

means for setting initial conditions for the simulation;

means for solving the balance equations for mass, momentum and energy for at least a portion of the cells of the simulation domain to obtain fluid flow, heat flow and mass transfer of cells of the solution domain at a macroscopic level;

means for solving nonspherical particle orientation equations based at least partly on the results of the solved balance equations to thereby determine changes in the nonspherical particle orientation at a macroscopic level as function of space and time, wherein the non-spherical particle orientation is described statistically by a distribution function;

wherein the distribution function is approximated by non-spherical particle orientation tensors of increasing order including a $2^{nd}$ order orientation tensor and a $4^{th}$ order orientation tensor and the 4th order orientation tensor is computed as a function of the 2nd order orientation tensor using a stabilized hybrid closure approximation; and means for presenting data in human readable form corresponding to characteristics of the simulated molded part.

16. A method for optimizing injection molding by calculating orientation statistics of non-spherical particles on a macroscopic level for simulating an injection molding process with a suspension that is formed by a solvent containing a large number of non-spherical particles comprising the steps:

specifying a mold cavity, which forms at least part of a simulation domain providing a digital representation of the simulation domain;

forming a mesh with a plurality of computational cells by subdividing or discretizing at least part of the digital representation of the simulation domain;

specifying boundary conditions for the simulation;
setting initial conditions for the simulation;
solving the balance equations for mass, momentum and energy for at least a portion of the cells of the simulation domain to obtain fluid flow, heat flow and mass transfer of cells of the solution domain at a macroscopic level;
solving nonspherical particle orientation equations based at least partly on the results of the solved balance equations to thereby determine changes in the nonspherical particle orientation at a macroscopic level as function of space and time, wherein the non-spherical particle orientation is described statistically by a distribution function;
wherein the distribution function is approximated by nonspherical particle orientation tensors of increasing order including a $2^{nd}$ order orientation tensor and a $4^{th}$ order orientation tensor and the 4th order orientation tensor is computed as a function of the 2nd order orientation tensor using a stabilized hybrid closure approximation; and
presenting data in human readable form corresponding to characteristics of the simulated molded part.

17. A method according to claim 16, wherein the distribution function is a nonlinear coupled system of convection-reaction type hyperbolic partial differential equations that is reformulated in vector form using contracted notation (CN).

18. A method according to claim 17, wherein the algebraic structure of the right hand side of a system of hyperbolic partial differential equations of reaction-convection type is exploited to achieve a stabilized hybrid closure with few algebraic operations.

19. A method according to claim 18, wherein the number of algebraic operations required to determine the non-spherical particle orientation is minimized by identifying common subexpressions in the right hand of the system of hyperbolic partial differential equations.

20. A method according to claim 16, wherein the distribution function is approximated by non-spherical particle orientation tensors of increasing order, which is a nonlinear coupled system of convection-reaction type hyperbolic partial differential equations, and wherein said nonlinear coupled system of hyperbolic partial differential equations is split into a pure orientation transport component and a rotational orientation dynamics.

* * * * *